(12) United States Patent
Howard et al.

(10) Patent No.: US 8,352,347 B2
(45) Date of Patent: Jan. 8, 2013

(54) INVESTMENT CLASSIFICATION AND TRACKING SYSTEM USING DIAMOND RATINGS

(75) Inventors: C. Thomas Howard, Littleton, CO (US); Andrew Howard, Castle Rock, CO (US)

(73) Assignee: AthenaInvest, Inc., Greenwood Village, CO (US)

( * ) Notice: Subject to any disclaimer, the term of this patent is extended or adjusted under 35 U.S.C. 154(b) by 79 days.

(21) Appl. No.: 12/648,615

(22) Filed: Dec. 29, 2009

(65) Prior Publication Data
US 2010/0169237 A1    Jul. 1, 2010

Related U.S. Application Data

(60) Provisional application No. 61/141,185, filed on Dec. 29, 2008, provisional application No. 61/146,931, filed on Jan. 23, 2009, provisional application No. 61/237,981, filed on Aug. 28, 2009.

(51) Int. Cl.
*G06Q 40/00* (2012.01)

(52) U.S. Cl. ............................ 705/36 R; 705/35; 705/37

(58) Field of Classification Search ............... 705/35–37
See application file for complete search history.

(56) References Cited

U.S. PATENT DOCUMENTS

| | | | |
|---|---|---|---|
| 5,371,807 A | 12/1994 | Register et al. | |
| 5,806,048 A | 9/1998 | Kiron et al. | |
| 5,812,987 A | 9/1998 | Luskin et al. | |
| 5,941,945 A | 8/1999 | Aditham et al. | |
| 6,055,517 A * | 4/2000 | Friend et al. | 705/36 R |
| 6,282,520 B1 | 8/2001 | Schirripa | |
| 6,370,516 B1 | 4/2002 | Reese | |
| 6,484,151 B1 | 11/2002 | O'Shaughnessy | |
| 6,968,317 B1 | 11/2005 | Wallace et al. | |
| 6,983,257 B2 * | 1/2006 | Gatto | 705/36 R |
| 7,590,582 B2 * | 9/2009 | Dunne | 705/36 R |
| 7,610,230 B2 * | 10/2009 | Festog et al. | 705/36 R |
| 7,644,011 B2 * | 1/2010 | Shkedy | 705/7.38 |
| 7,668,773 B1 * | 2/2010 | Pruitt | 705/36 T |
| 7,734,526 B2 | 6/2010 | Howard et al. | |
| 7,783,547 B1 * | 8/2010 | Gorer | 705/36 R |
| 7,877,309 B2 * | 1/2011 | Gatto et al. | 705/36 R |
| 7,941,359 B2 | 5/2011 | Tanner | |
| 2003/0046209 A1 * | 3/2003 | Brandenberger et al. | 705/36 |
| 2005/0021465 A1 * | 1/2005 | Segerstrom | 705/42 |
| 2005/0075962 A1 * | 4/2005 | Dunne | 705/36 |
| 2006/0074785 A1 * | 4/2006 | Festog et al. | 705/35 |
| 2006/0080227 A1 | 4/2006 | Boglaev | |
| 2006/0085247 A1 * | 4/2006 | Gatto et al. | 705/10 |
| 2008/0288386 A1 * | 11/2008 | Ferris | 705/35 |
| 2009/0186689 A1 * | 7/2009 | Hughes et al. | 463/25 |

(Continued)

OTHER PUBLICATIONS

Soter, D. (2000). Implementing an effective financial strategy. AFP Exchange, 20(1), 36-40. Retrieved from http://search.proquest.com/docview/225974310?accountid=14753.*

(Continued)

*Primary Examiner* — Olabode Akintola
*Assistant Examiner* — Abhishek Vyas
(74) *Attorney, Agent, or Firm* — Sheridan Ross PC

(57) ABSTRACT

The present invention is directed to an asset classification system based on investment strategy. The system determines a number for performance measures and strategy classifications. These measures indicate, in one configuration, an extent to which a security or manager is outperforming or attempting to outperform a benchmark and how successful the security or manager has been based on historic performance data.

23 Claims, 42 Drawing Sheets

U.S. PATENT DOCUMENTS

2009/0198633 A1     8/2009    Howard et al.
2009/0271332 A1    10/2009    Lo et al.

OTHER PUBLICATIONS

Holdings-Based and Returns-Based Style Models Jun. 2003 Paul D. Kaplan, Ph.D., CFA Director of Research Morningstar, Inc.*
Soter, D. (2000). Implementing an effective financial strategy. AFP Exchange, 20(1), 36-40.*
Generalised Style Analysis of Hedge Funds Vikas Agarwal; Narayan Y. Naik; Version accepted for publication in the Journal of Asset; Management (2000), vol. 1, No. 1, pp. 93-109; JEL Classification: G11, G15, G24.*
"Boxes are not Classes" by Howard and Callahan, Investment Advisor Magazine, Jan. 2006, pp. 1-5.
"Fact Sheet: The New Morningstar Style Box Methodology" Morningstar, 2002, pp. 1-2.
"Risky Business" by Callahan and Howard, Investment Advisor Magazine, Feb. 2006, pp. 1-8.
"Schwab Introduced New Online Mutual Fund Selection and Screener Tools", Dec. 22, 1999, PR Newswire.
"Types of funds/fund objectives", Oct. 6, 2004, USA Today's Stock Mutual Fund Report.
Albertson, Joshua "Large-Cap Growth is Back", Nov. 18, 2005. SmartMoney.com.
Brown, Stephen J. and Goetzmann, William N., "Mutual fund styles", Journal of Financial Economics 43 (1997) 373-399.
Callahan et al., "Outside the Box", Investment Advisor, Sep. 2005, pp. 84-88.
Cremers et al., "How Active Is Your Fund Manager? A New Measure That Predicts Performance", available at http://ssrn.com.abstract=891719. Jan. 15, 2007, 57 pages.
Hedge Fund Research, Inc., HFR Strategy Definitions, Oct. 11, 2003, <http://www.hedgefundresearch.com/pdf/HFR_Strategy_Definitions.pdf> accessed via Internet Archive Wayback Machine <http://www.archive.org>.
Howard "Study Conducted by Tom Howard using Apr. 2007 SBI and Zephyr Databases", published Sep. 2007, 33 pages.
Howard et al., "The Problematic "Style" Grid", Journal of Investment Consulting, vol. 8, No. 1, Winter 2005-06, pp. 44-56.
Kacperczyk et al., "On the Industry Concentration of Actively Managed Equity Mutual Funds," 2005, pp. 1-49.
Rekenthaler "In Defense of Style Boxes", Investment Advisor, Jun. 2006, 6 pages.
Surz, "What Good are Style Indexes? (Hint: Think Blend)," PPCA Inc., Jun. 2001, pp. 1-4.
Teo et al., "Style effects in the cross-section of stock returns", Journal of Financial Economics 74 (2004) 367-398.
Wermers "A Matter of Style: The Causes and Consequences of Style Drift in Institutional Portfolios", Jul. 2002, 30 pages.
Brown et al., "Analysts can forecast accurately!" The Journal of Portfolio Management, Spring 1990, pp. 31-34.
BulldogResearch.com—Investment Research for Smart investors, at http://www.bulldogresearch.com/, printed Feb. 5, 2001, 31 pages.
International Search Report for International (PCT) Patent Application No. PCT/US07/78556, mailed Sep. 24, 2008.
Written Opinion for International (PCT) Patent Application No. PCT/US07/78556, mailed Sep. 24, 2008.
International Search Report for International (PCT) Patent Application No. PCT/US07/78556, mailed Oct. 6, 2008.
Written Opinion for International (PCT) Patent Application No. PCT/US07/78556, mailed Oct. 6, 2008.
International Preliminary Report on Patentability for International (PCT) Patent Application No. PCT/US07/78556, mailed Mar. 26, 2009.
Written Opinion for Singapore Patent Application No. 200901600-7, mailed Mar. 18, 2010.
Official Action for U.S. Appl. No. 11/854,978, mailed Dec. 10, 2008.
Official Action for U.S. Appl. No. 11/854,978, mailed Aug. 6, 2009.
Notice of Allowance for U.S. Appl. No. 11/854,978, mailed Jan. 26, 2010.
Official Action for U.S. Appl. No. 12/362,824, mailed Jun. 21, 2011.

* cited by examiner

Trading Report

Portfolio Information
Wes Schrader
Wes Schrader

| NASDAQ | Fund Name | Current | What If | Change |
|---|---|---|---|---|
| UNEAQX | Blended Equity Fund | 104,000 | 0 | -104,000 |
| FCECX | Fidelity Advisor Consumer Discretionary Fund | 0 | 200,000 | 200,000 |
| FCNAX | Fidelity Advisor Consumer Discretionary Fund | 208,000 | 200,000 | -8,000 |
| FCLBX | Fidelity Advisor Industrials Fund | 0 | 200,000 | 200,000 |
| GABCX | Gabelli ABC Fund | 72,000 | 0 | -72,000 |
| TEWAX | Large Cap Core Equity Fund | 104,000 | 200,000 | 96,000 |
| LKEQX | LKCM Equity Fund | 80,000 | 0 | -80,000 |
| PVEAX | Phoenix Value Equity Fund | 72,000 | 0 | -72,000 |
| VALSX | Value Line Premier Growth Fund Inc | 160,000 | 0 | -160,000 |
| | Fund Total | 800,000 | 800,000 | 0 |

FIG.12

| Primary Strategy | Secondary Strategy | | | | | | | | | |
|---|---|---|---|---|---|---|---|---|---|---|
| | Quant | Risk | Opportunity | Valuation | Economic Conditions | Market Conditions | Competitive Position | Profitability | Social Considerations | Future Growth |
| Valuation | 24 | 14 | 33 | | 40 | 50 | 211 | 24 | 3 | 87 |
| Market Conditions | 5 | 2 | 1 | 9 | 5 | | 11 | 2 | 2 | 6 |
| Quantative | | 7 | | 6 | 10 | 4 | 12 | 1 | 1 | 4 |
| Risk | 3 | | 3 | 8 | 2 | 2 | 5 | | | 3 |
| Social Considerations | 1 | 1 | | 10 | 2 | 5 | 9 | | | 7 |
| Complete Position | 12 | 11 | 12 | 131 | 128 | 28 | | 37 | 3 | 172 |
| Economic Conditions | 5 | 7 | | 7 | | 15 | 33 | 3 | 5 | 20 |
| Profitability | 1 | 1 | 3 | 7 | 7 | 3 | 8 | | 1 | 6 |
| Opportunity | 7 | 5 | | 12 | 5 | 1 | 4 | 2 | | 3 |
| Future Growth | 12 | 9 | 6 | 71 | 28 | 24 | 143 | 17 | 3 | |

FIG. 20

| Fund Return | |
|---|---|
| Universe return | 14.25% |
| Validation Index alpha | -10.25% |
| | -1.23% |
| Fund alpha | 2.77% |
| Element 1 return | -0.35% |
| Element 2 return | -0.76% |
| ... | ... |
| Unexplained alpha | 1.13% |

FIG. 21

INVESTMENT CLASSIFICATION AND TRACKING SYSTEM USING DIAMOND RATINGS

CROSS REFERENCE TO RELATED APPLICATION

The present application claims the benefits of U.S. Provisional Application Ser. Nos. 61/141,185, filed Dec. 29, 2008, 61/146,931, filed Jan. 23, 2009; and 61/237,981, filed Aug. 28, 2009; each of which is incorporated herein by this reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

FIELD OF THE INVENTION

The invention relates generally to investment management classification and tracking systems and particularly to equity investment management classification and tracking systems.

BACKGROUND OF THE INVENTION

Equity management classification systems are well established in the investment community. In 1988, William Sharpe presented the concept of Returns Based Style Analysis (RBSA) and, in 1992, Morningstar introduced the nine box size/value-growth characteristic grid. This grid described equity funds using the following labels: growth, value, blend, small-capitalization, large-capitalization, and mid-capitalization. Others soon followed with their own variation of the grid, designed to provide an alternative classification to aggressive growth, growth, and growth-and-income mutual fund classifications. Today, the industry uses the grid and the RBSA to categorize and select equity managers and as a result, investment performance began to suffer.

The asset management industry's over-reliance on the size/value-growth characteristic grid and Sharpe's RBSA is detrimental and misleading to investors, advisors, consultants, and planners alike and constrains asset managers. The widespread acceptance and entrenchment of this system lowers investor returns. Constraining asset managers from pursuing a specific investment strategy causes a myriad of problems.

Constraining equity managers hurts performance. Constraining equity managers to any of the nine characteristic boxes handicaps performance by an estimated average 300 basis points annually for US equities. When managers are boxed in, the available universe of equities reduces to a fraction, and the resulting subset of equities from which a manager may choose results in suboptimal equity selection. Rather than adding top-ranked stocks to a portfolio, a constrained manager is forced to pick stocks much further down the list of optimal choices.

Constraining equity manager's forces managers to strategy drift. By reducing the available universe of equities to a fraction, a manager pursuing any particular equity strategy is inhibited from choosing their best stocks. Investment Strategy is the way a manager goes about analyzing, buying and selling investment assets and liabilities. When a manager is not allowed to pick the best stocks, that manager is forced to strategy drift. Thus, a manager must choose between being box consistent or being strategy consistent. They cannot be both box and strategy consistent. Our research shows that it is better to be strategy consistent rather than box consistent.

The foregoing problems arise from the fact that characteristic boxes are not asset classes. Although treated as such, characteristic boxes do not provide the diversification and risk reduction benefits which define asset classes. Asset classes should be compositionally unique, have low correlations, and have a consistent classification over the long-term. Boxes are not asset classes. Instead, the universe of US equities is just one asset class, not nine, and classification guided by the nine box grid does not provide the diversification or risk reduction benefits which should be expected by dissimilar asset classes.

Characteristic boxes give no insight into how a manager makes decisions. Using the grid to categorize managers only gives investors information about the characteristics of the resulting portfolio. It does nothing to help the investor understand equity strategy; that is, it does nothing to help investors understand how the manager goes about analyzing, buying and selling stocks, what we call equity strategy.

Contrary to common perceptions, boxes wipe out alpha and provide no incremental risk reduction benefits. A random selection of mutual funds performs as well as knowing the mutual fund's box. Even selecting all funds from the same box can have acceptable risk features. Simply put, a consistent strategy, without regard to the box, performs best.

There is a need for a system to categorize and evaluate managers based on their investment strategies.

SUMMARY OF THE INVENTION

The following presents a simplified summary of the invention to provide an understanding of some aspects of the invention. This summary is not an extensive overview of the invention and its various embodiments. It is intended neither to identify key or critical elements of the invention nor to delineate the scope of the invention but to present selected concepts of the invention in a simplified form as an introduction to the more detailed description presented below.

These and other needs are addressed by the various embodiments and configurations of the present invention. The present invention is directed generally to a system of asset manager categorization and portfolio selection based on investment strategies.

In a first embodiment, a method and system are provided that includes the steps/operations of:

(a) receiving, from a user, a selected return and risk;

(b) based on the selected return and risk, determining automatically a risk-return efficient frontier;

(c) based on the selected level of risk, determining automatically a tangency portfolio, the tangency portfolio having allocation weightings among members of a set of asset classes and/or set of investment strategies;

(d) determining automatically differences between the tangency portfolio and a user selected Portfolio; and (e) providing the differences to the user.

In a second embodiment, a method and system are provided that include the steps/operations of:

(a) providing to a user a plurality of investment strategies, each investment strategy comprising a set of managed securities; and (b) for each security in the sets of managed security, providing the user with a consistency measure indicating a degree to which the respective manager adheres to the corresponding investment strategy.

In a third embodiment, a method and system are provided that include the steps/operations of:

(a) providing a user with a plurality of investment strategies, each investment strategy comprising a set of managed securities;

(b) receiving, from the user, at least one selected investment strategy; and (c) determining, for the at least one selected investment strategy, at least one dissimilar investment strategy; and (d) providing at least one dissimilar investment strategy to the user.

In a fourth embodiment, a method and system are provided that include the steps/operations of:

(a) determining for a plurality of security managers a plurality of sets of security descriptions, each manager having a corresponding set of security descriptions and each security description describing a security managed by the respective manager; and (b) based on the security descriptions, categorizing the securities by investment strategy.

In a fifth embodiment, a method and system are provided that include the steps/operations of:

(a) determining, for each of a number of managed securities and/or security managers, one or more investment strategies employed by the managed security and/or security manager in buying and selling securities;

(b) categorizing each of the managed securities and/or security managers based on the set of investment strategies employed by the manager;

(c) receiving a request from a user for managed securities and/or security managers adhering to a selected set of investment strategies; and (d) providing to the user a subset of the managed securities and/or security managers adhering primarily to the set of investment strategies.

Using selected return and risk measures and the efficient frontier and tangency portfolio, users can effectively and efficiently configure a planned portfolio having a likelihood of meeting selected risk and return objectives.

The tangency portfolio and user selected portfolio are typically allocated among a set of investment strategies. The investment strategies, in one application, include competitive position strategy, economic conditions strategy, future growth investment strategy, market condition strategy, opportunity strategy, profitability strategy, quantitative strategy, risk strategy, social considerations strategy, and valuation strategy. As will be appreciated, other strategies are possible for differing kinds of securities and assets. In that event, a security or asset-type identifier can be used in search queries to confirm that the correct set of investment strategies is employed. These investment strategies are commonly selected based on historical equity manager behavior and/or manager input. The strategies are believed to be compositionally unique, have lower correlations, have consistent classification over the long-term, and provide insight into how equity managers make investment decisions. Accordingly, the strategies do not constrain managers and can provide enhanced equity performance and inhibit strategy drift. An equity manager can have both primary and secondary investment strategies.

In one configuration, the algorithm for determining the efficient frontier and the tangency portfolio is:

determining, based on the selected return and risk, corner asset portfolios;

determining, for selected points along the efficient frontier, allocation weightings among members of the set of asset classes and/or set of investment strategies and expected return and risk;

identifying the point along the efficient frontier corresponding to the tangency portfolio; and determining, for the tangency portfolio, allocation weightings among members of the set of asset classes and/or set of investment strategies, expected return, and risk.

A diversification measure can be determined for the selected asset portfolio and provided to the user.

For each investment strategy, a set of security managers can be found for selection by the user. Each manager has a corresponding consistency measure, which indicates a degree of consistency of the security manager in adhering to the associated primary and/or secondary investment strategies.

When the user changes asset allocation weightings for one or more investment strategies in the selected portfolio, the changes propagated automatically among the various investment strategies, differences between the altered portfolio and the tangency portfolio determined, and the output provided to the user.

To enrich the user interface, the relative positions of the efficient frontier, tangency portfolio, selected (current or existing) portfolio, and altered portfolio can be illustrated graphically for the user.

To enhance risk diversification, one or more investment strategies dissimilar to a selected strategy can be identified and provided to the user. By identifying dissimilar strategies for asset weightings in a portfolio, the strategies can provide diversification and risk reduction benefits.

Each asset manager can determine the pertinent investment strategies for his or her security. This can ensure that securities are properly categorized, encourage managers to have higher levels of strategy consistency, and discourage users from having to choose between box consistency and strategy consistency.

It will also be possible to classify individual investments, such as individual stocks, by the strategies of the managers that hold them and not the other way around.

In a sixth embodiment, a method is provided that, for a selected investment strategy and at least one of a first manager and first set of assets within the investment strategy, includes the steps:

(a) determining a first rating component indicating a degree to which the at least one of first manager and first set of assets is attempting to be consistently pursuing the strategy;

(b) determining a second rating component indicating a degree of best investment idea concentration within the portfolio of the at least one of a first manager and first set of assets; and (c) determining a diamond rating as a function of the first and second rating components.

In one configuration, the first rating component is a function of the number of own strategy stocks held or the number of own strategy elements included in the statement of principal investment strategies.

The second rating component is commonly a function of a degree of deviation and/or difference of the first set of assets from an index set of assets. In one configuration, the first rating component is a function of at least one of R-squared, style drift, tracking error, information ratio, sector bets, beta, number of securities, and active share.

The diamond rating can provide a more reliable indicator of future success of a manager or collection of assets. The diamond rating can reflect the surprising discovery that the managers who drift most from accepted styles, such as small-cap value, generally have greater investment success. Such managers are characterized as Successful Active Managers pursuing successful Strategy ("SAMS"). Conventional investment wisdom is directly opposite to this discovery and would expect the most successful managers to be those who drift the least from an accepted style.

In a seventh embodiment, a method and system are provided that:
(i) assign, by a processor executable strategy categorizing module, a first strategy to a selected investment based upon strategy profiles of a set of the managers and/or funds holding the selected investment;
(ii) assign, by a processor executable consistency measure module, a strategy consistency measure to a selected manager and/or fund;
(iii) assign, by a processor executable performance analysis module, to a selected manager and/or fund, and based on a strategy consistency measure and best idea concentration, a diamond rating;
(iv) assign, by a processor executable rating module, a first diamond rating to a selected investment based upon diamond rating profiles of a set of the managers and/or funds holding the selected investment;
(v) assign, by a processor executable consistency measure module, a diamond rating consistency measure to a selected manager and/or fund; and/or
(vi) assign, by a processor executable AlphaIQ module, an AlphaIQ to a selected manager and/or fund.

Regarding (i), strategy categorizing investments, such as stocks, is contrary to conventional wisdom. Instead of categorizing funds by the stocks they hold, step/operation (i) does just the opposite, namely categorizes stocks by the strategies that hold them. This can have the advantage of associating manager skill with a specific set of stocks and can make it possible to track a strategy's preferred stocks over time. Organizing the equity world in this way can allow equity managers the freedom to move about the equity universe while pursuing their strategy and can also provide investor tools to determine diamond ratings and the level of consistency, such as the strategy and diamond rating consistency measure and AlphaIQ.

The present invention can provide a number of advantages depending on the particular configuration. For example, a strategy-based system can allow managers to be categorized and evaluated without affecting performance. Managers are preferably categorized by strategy rather than by stock characteristic style boxes.

These and other advantages will be apparent from the disclosure of the invention(s) contained herein.

Selected words and phrases used herein are defined below.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably "Active share" is defined as the percent of holdings that differ from the holdings of the stated index. For a more complete definition, see Martijn Cremers, and Antti Petajisto, 2009. How Active Is Your Fund Manager? A New Measure That Predicts Performance. Review of Financial Studies, September, pp 3329-3365.

"Alpha" is a measure of a mutual fund's excess risk adjusted return risk relative to the overall market. It reflects the difference between a mutual fund's actual performance and the performance expected based on risk level taken by the fund's manager. A fund that produced the expected return for the level of risk assumed has an Alpha of zero. A positive Alpha shows that the manager produced a return greater than expected for the risk taken. A negative Alpha indicates that the manager has produced a return smaller than expected relative to the risk taken. The formula for alpha is the following:

$$[(\text{sum of } y) - ((b)(\text{sum of } x))]/n$$

where n=number of observations, b=beta of the fund, x=rate of return for the market, and y=rate of return for the fund.

"AlphaIQ" is a measure associated with a specific investment that captures the extent to which that investment is held by the top managers within the top strategies. A high value indicates the investment is held mostly by such top managers while a low value indicates that it is held by below average managers.

The term "automatic" and variations thereof refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

"Best idea concentration" describes the extent to which a manager of a plurality of securities concentrates the funds available in a small number of investment securities. The extent of concentration can be measured by the number of securities held, the portfolio weighting of the top securities, the correlation with the benchmark index, active share, style drift, and/or tracking error.

"Beta" is a measure of the degree of change in value one can expect in a portfolio given a change in value in a benchmark index. A portfolio with a beta greater than one is generally more volatile than its benchmark index, and a portfolio with a beta of less than one is generally less volatile than its benchmark index.

"Competitive position investment strategy" is a strategy in which the manager focuses on business principles, including quality of management, market power, product reputation, and competitive advantage. Important considerations include the sustainability of the business model and a history of adapting to market changes. Strategy elements of this strategy include strength of fundamentals, defensibility of market position, management quality, and strength of innovation.

"Determine", "calculate" and "compute," and variations thereof, are used interchangeably and include any type of methodology, process, mathematical operation or technique.

"Diamond Rating" is associated with the manager of the group of securities and indicates the extent to which the manager is superior (higher value) or inferior (lower rating) with in a strategy.

"Diamond Rating Profile" portrays the relative Diamond Rating holdings with an group of managed securities. It can also portray the relative Diamond Rating holdings for an individual security.

"Downside capture" is the average ratio of the return on the fund to the return on the market for those periods in which the market return was negative.

"Downside risk" is a statistical measure of volatility that includes only the negative deviations from its mean.

"Economic conditions investment strategy" is a strategy in which the manager follows a top down approach based on economic fundamentals. These fundamentals can include employment, productivity, inflation, and industrial output. The manager gauges the overall health of the economy, trying to ascertain where it is in the business cycle, the resulting supply and demand situation in various industries, and ultimately the best stocks to purchase. Strategy elements of this strategy include Gross Domestic Product, interest rates, and monetary policy.

"Efficient frontier" is a concept of Modern Portfolio Theory (MPT). MPT proposes how rational investors will use diversification to optimize their portfolios, and how a risky asset should be priced. The basic concepts of the theory are Markowitz diversification, the efficient frontier, capital asset pricing model, the alpha and beta coefficients, the Capital Market Line and the Securities Market Line. MPT generally models an asset's return as a random variable, and models a portfolio as a weighted combination of assets; the return of a portfolio is thus the weighted combination of the assets' returns. Moreover, a portfolio's return is a random variable, and consequently has an expected value and a variance. Risk, in this model, is the standard deviation of the portfolio's return. Every possible asset combination can be plotted in risk-return space, and the collection of all such possible portfolios defines a region in this space. The line along the upper edge of this region is known as the efficient frontier (sometimes "the Markowitz frontier"). Combinations along this line represent portfolios for which there is lowest risk for a given level of return. Conversely, for a given amount of risk, the portfolio lying on the efficient frontier represents the combination offering the best possible return. Mathematically the efficient frontier is the intersection of the set of portfolios with minimum variance and the set of portfolios with maximum return. The efficient frontier is illustrated in FIG. 1, with return $\mu_p$ on the y axis, and risk $\sigma_p$ on the x axis. The efficient frontier is normally convex because the risk-return characteristics of a portfolio change in a non-linear fashion as its component weightings are changed. As will be appreciated, portfolio risk is a function of the correlation of the component assets and changes in a non-linear fashion as the weighting of component assets changes. The efficient frontier is a parabola (hyperbola) (only with short sales allowed, otherwise is only approximately a parabola), when expected return is plotted against variance (standard deviation). The region above the frontier is unachievable by holding risky assets alone. No portfolios can be constructed corresponding to the points in this region. Points below the frontier are suboptimal. A rational investor will hold a portfolio only on the frontier. Strategy and asset class frontiers are each a type of efficient frontier. They each represent the set of investment strategy-optimized portfolios producing the highest expected return for a given level of risk.

"Future growth investment strategy" is a strategy in which the manager focuses on companies poised to grow rapidly relative to others. The future growth and valuation strategies are not mutually exclusive, and it is plausible for a manager to deem both important in the investment process. Strategy elements of future growth include, over a selected time period, rate of overall company growth, rate of earnings growth, sustainable growth rate, and accelerated growth rate.

"Information ratio" is quotient of portfolio active return divided by portfolio tracking error. The information ratio is a risk adjusted performance metric.

"Investment strategy" is the manner in which a manager analyzes buys and/or sells investment assets and liabilities. Investment strategy is sometimes also referred to as investment style, investment methodology, investment process, or investment technique. Investment strategy can be described in both quantitative and qualitative terms.

"Market condition investment strategy" is a strategy in which the manager considers the equity's recent price and volume history relative to the market and similar stocks. The manager may consider overall stock market conditions as well. Strategy elements of this strategy include technical analysis, charting, and momentum.

"Module" refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

"Opportunity investment strategy" is a strategy in which the manager focuses on unique opportunities that may exist for a small number of stocks or at different points in time. This strategy may involve combining stocks and derivatives and may also involve use of considerable leverage. Many hedge fund managers are characterized as following an opportunity strategy, but a mutual fund manager may also be so classified. Strategy elements of this strategy include earnings surprise and price modeling.

"Own strategy stocks" are those stocks held by a manager which are categorized as the same strategy as the primary strategy of the fund. For example, the competitive position stocks held by a competitive position manager are own strategy stocks.

"Primary strategy" refers to the investment strategy primarily, or most frequently or consistently, followed by a manager.

"Profitability investment strategy" is a strategy in which the manager focuses on company profitability, as measured in a variety of ways, such as gross margin, operating margin, net margin, and return on equity. Strategy elements of this investment strategy include strength of margins, strength of financials, return on equity, and return on invested capital.

"Quantitative investment strategy" is a strategy in which the manager focuses on mathematical and statistical inefficiencies in the market and individual stock pricing. Typically, this strategy involves mathematical and statistical modeling with little or no regard to company and market fundamentals. Strategy elements of this strategy include stochastic modeling, quantitative methods, and statistical modeling.

"Risk investment strategy" is a strategy in which the manager focuses on controlling overall risk, with increasing returns a secondary consideration. A wide range of risk measures may be considered including beta, volatility, company financials, industry and sector exposures, country exposures, and economic and market risk factors. Strategy elements of this strategy include business risk, controlling risk, and market risk.

"R squared" is used to measure the extent to which an investment, such as a mutual fund, follows a given index. It is a percentage of a portfolio's movements that are explained by movements in its benchmark index. An R squared measure of 0.85 means that 85% of the movement in the fund is attributable to the index which it most closely follows. An index fund or ETF should have an R squared of 1.00 or very close to that.

If an actively managed fund has an R squared of higher than 0.85, that fund falls into the category of a closet index fund. The index is a broad-based index or narrower style index.

"Sector bet" refers to taking a position in the stocks of a particular industry sector of the economy that differs from the sector weight in the given index.

"Secondary strategy" refers to the investment strategy secondarily, or, as compared to the primary strategy, next most frequently or consistently, followed by a manager.

"Security" refers to an instrument which (i) is issued in bearer or registration form; (ii) is of a type commonly dealt in upon securities exchanges or markets or commonly recognized in any area in which it is issued or dealt in as a medium for investment; (iii) is either one of a class or series or by its terms is divisible into a class or series of instruments; and (iv) evidences a share, participation or other interest in property or in an enterprise or evidences an obligation of the issuer. Examples of securities include notes, stocks, treasury stocks, bonds, debentures, evidence of indebtedness, certificates of interest or participation in an oil or mineral title or lease, collateral trust certificate, transferable share, voting trust certificate, any other interest or instrument commonly known as a security, any other certificate of interest or participation, and any temporary or interim certificate, receipt or certificate of deposit, for, or any warrant or right to subscribe or purchase any of the foregoing.

"Sharpe ratio" is a measure of the performance of an investment, that uses a portfolio's standard deviation and return net of the risk free rate to determine reward per unit of risk. In one example, it is computed by dividing the excess return (that is over the return on a risk-free investment such as on Treasury bills) by the amount of risk taken to generate the excess (the standard deviation of the rate of return). A ratio of 1 indicates one unit of return per unit of risk, 2 indicates two units of return per unit of risk, and negative values indicate loss or that a disproportionate amount of risk was taken to generate a positive return. The Sharpe ratio was invented by the Nobel laureate William Sharpe "Social considerations investment strategy" is a strategy in which the manager focuses on social considerations, including the company's ethical, environmental, and business practices as well as an evaluation of the company's business lines in view of the current social and political climate. Strategy elements of this strategy include social responsibility, political issues, and religious issues.

"Sortino ratio" is a measure of the risk-adjusted return of an investment asset, portfolio or strategy. It uses a portfolio's beta and return net of the risk free rate to determine reward per unit of risk. It is a modification of the Sharpe ratio but penalizes only those returns falling below a user-specified target, or required rate of return, while the Sharpe ratio penalizes both upside and downside volatility equally. The Sortino ratio is thus a more realistic measure of risk-adjusted returns than the Sharpe.

"Standard deviation" is a statistical measure of the volatility of a portfolio's returns around its mean.

"Strategy consistency" refers to the degree of consistency of a manager's asset transactions to the manager's stated strategy. In one configuration, strategy consistency of a security or manager is expressed as an objective measure based on quantitative measures, such as the existence of portfolio constraints (e.g., market capitalization of security or manager, sector/industry weightings of security or manager), number of stocks held by security or manager, number of strategy elements selected by security or manager, and strategy fit of security or manager. These are combined into an index that captures the degree of strategy consistency by the security or manager. In another configuration, strategy consistency is a function of the number of own strategy stocks held or the number of own strategy elements included in the statement of principal investment strategies. The components upon which this index is based may change over time. As will be appreciated, strategy consistency can be measured by other techniques, including directly interviewing the manager. "Strategy element" or "element" refers to a specific item upon which the manager focuses in implementing an investment strategy. Examples are quality company management, successful innovation, Gross Domestic Product, and price momentum. The specific ways in which the element is used is not specified, just that the manager focuses on this aspect which implementing the strategy. For example, the manager focuses on the stock's price-to-earnings ratio, but the specific PE cutoff value is not specified.

"Strategy outline" lists the self declared primary and secondary strategies being pursued by the manager as well as strategy elements.

"Strategy profile" portrays the relative strategy holdings of a manager relative to a group of managers or of a managed security/fund within a group of managed securities/funds. It can also portray the relative strategy holdings for an individual security.

"Style drift" is an intentional or unintentional departure from the original market-cap, price-to-earnings (or price-to-sales or price-to-book style box classification) style box to a new market cap/PE style box or benchmark index. At their inception, all funds have an objective or specific style box, usually determined by the management of that fund. Style drift indicates a change in the style box, which could occur for many reasons, such as a change in the management team or a decision made by the team because of a change of circumstance in the market or the consistent pursuit of an investment strategy. See Russ Wermers. "*A Matter of Style: The Causes and Consequences of Style Drift in Institutional Portfolios*", University of Maryland working paper published in July 2002.

"Tracking error" is a measure of how closely a portfolio follows the index to which it is benchmarked. It measures the standard deviation of the difference between the portfolio and index returns. Many portfolios are managed to a benchmark, normally an index. Some portfolios are expected to replicate the returns of an index exactly (an index fund), while others are expected to 'actively manage' the portfolio by deviating slightly from the index in order to generate active returns or to lower transaction costs. Tracking error (also called active risk) is a measure of the deviation from the benchmark; the aforementioned index fund would have a tracking error close to zero, while an actively managed portfolio would normally have a higher tracking error. If tracking error is measured historically, it is called 'realized' or 'ex post' tracking error. If a model is used to predict tracking error, it is called 'ex ante' tracking error. The former is more useful for reporting performance, whereas ex ante is generally used by portfolio managers to control risk. Various types of ex-ante tracking error models exist, from simple equity models which use beta as a primary determinant to more complicated multi-factor models.

"Treynor ratio" is a measure of risk-adjusted portfolio performance that uses a portfolio's beta and total return to determine reward per unit of risk. The measure is calculated by dividing the portfolio beta (a measure of market, or systematic risk) into the average difference between the portfolio's returns and returns on a risk-free asset. A higher number represents better performance by the portfolio manager.

"Upside capture" is the average ratio of the return on the fund to the return on the market for those periods in which the market return was positive.

"Valuation investment strategy" is a strategy in which the manager focuses on stocks selling cheaply compared to peer stocks based on accounting ratios and valuation techniques. The valuation and future growth strategies are not mutually exclusive. It is plausible for a manager to deem both an opportunity strategy, but a mutual fund manager may also be so classified. Strategy elements of this strategy include price ratios, contrarian, and cash flow valuation.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 4 is a screenshot according to an embodiment;
FIG. 7 is a screenshot according to an embodiment;
FIG. 12 is a trading report according to an embodiment;
FIG. 20 is a screenshot according to an embodiment;
FIG. 21 is an algorithm according to an embodiment.

DETAILED DESCRIPTION

The Strategy-Based Investment (SBI) system categorizes investment managers and can also be used to categorize the investments they hold based on the strategy being pursued by the manager. It is based on the self-described investment strategy or strategies of investment management. Complementary investment strategies provide at least a selected degree of risk diversification while uncomplimentary investment strategies provide less than the selected degree of risk diversification. They may also provide increased portfolio returns as well as less volatility as measured by standard deviation.

Figure 1:
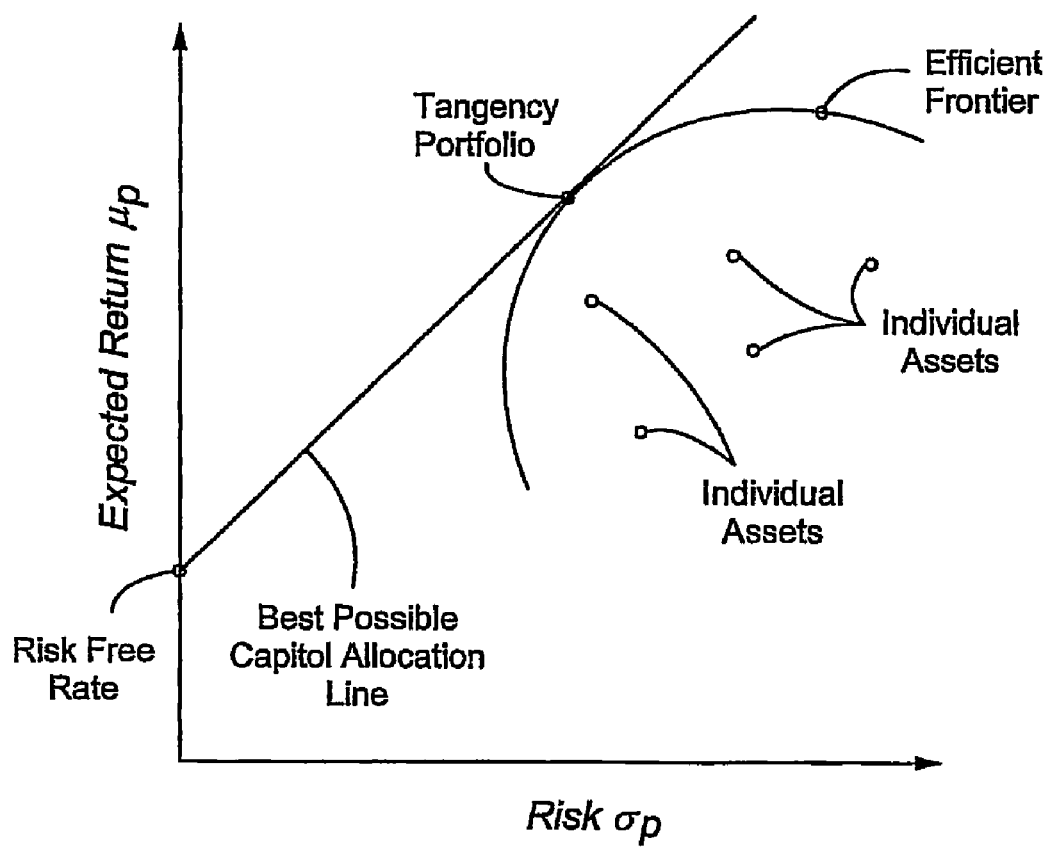
FIG. 1 is a prior art depiction of the relationships among efficient frontier, capital market line, and tangency portfolio.
Figure 2:
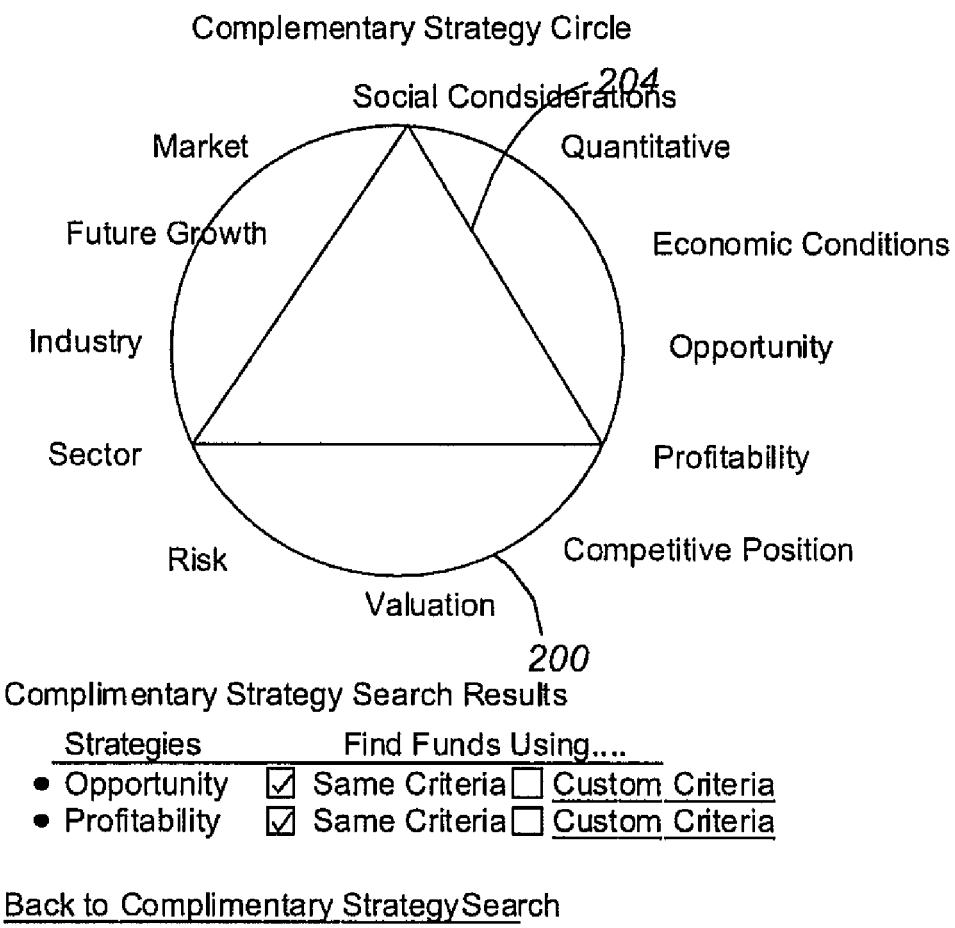
FIG. 2 is a screenshot depicting the complementary strategy circle according to an embodiment of the present invention.

In one configuration, the SBI system recognizes the following investment strategies: social considerations, quantitative, economic conditions, opportunity, profitability, competitive position, valuation, risk, sector, industry, future growth, and market conditions. FIG. 2 relationally depicts the various complementary and uncomplimentary investment strategies. The circle 200 is organized such that investment strategies in close proximity are the most similar or uncomplimentary while those further around the circle are most dissimilar or complementary. An optimal portfolio is a combination of the most dissimilar strategies and, thus, the triangle 204, indicating the strategies to be included in a selected portfolio, is diversified.

The SBI system categorizes investment managers and/or securities based on the way they analyze, buy, and sell assets and liabilities regardless of the name used to reference the investment manager's process. As will be appreciated, the SBI system can be applied to any asset or liability class for which managers make investment decisions based on differing investment strategies. Since the SBI system is based on manager input regarding the specific way in which asset management decisions are made, asset classes that can be characterized by the SBI system include, but are not limited to, mutual funds, Separately Managed Accounts or SMA's, separate accounts, hedge funds, company stocks, bonds, real estate, venture capital, commodity funds, private equity, energy funds, precious metals, international stocks, and international bonds. Although the discussion of the SBI system presented below specifically refers to equities, it is to be understood that the SBI system is equally applicable to non-equity asset classes, such as those listed above.

The individual manager investment strategy information, also referred to as a strategy outline, is collected in a database, which forms the basis of the SBI system. The strategy outline is generally comprised of self-selected (or manager selected) primary and secondary investment strategies. Within each strategy there will both quantitative and qualitative strategy elements which further describe the way a manager goes about analyzing, buying, and selling assets. The strategy outline for a given manager may include strategy elements from investment strategies other than the strategy elements of the primary and secondary strategies. The manager is free to select as many or as few strategy elements as is needed to describe the investment process. Within the primary and secondary investment strategies, the manager can rank the relative importance of the strategy elements selected.

Strategy outlines of managers are maintained by the SBI system for use by third parties, such as investment consultants, investment managers, and financial advisors. Portions of the strategy outline are made public while other portions are not. The manager corresponding to a selected strategy outline is expected to adhere to this strategy outline when making investment decisions. The manager is tracked over time to ensure that the stated strategy is being pursued. The strategy outline can allow for a simple as well as a granular categorization of managers. The level of categorization detail will be up to the person using the SBI system.

The strategy outline is used to form managers into SBI peer groups, which are used for performance evaluation. In SBI peer groups, managers are generally grouped by their stated primary and/or secondary investment strategies and/or strategy elements. Peers having the same primary strategy form the broadest grouping of managers. Within this broad group of strategies, secondary strategies can be used to further segregate managers. The SBI peer group is flexible, allowing advisors and consultants to sort managers based upon primary and secondary strategies along with specific strategy elements of interest.

Performance and consistency measures are based on peer group membership. The SBI performance measure indicates the security's performance relative to the performances of the other members of the security's SBI peer group. The security's publicly reported performance rating and can be based on risk-adjusted returns relative to the other equities within the security's SBI peer group. Beyond this publicly reported performance rating, the user can choose the type of performance measurement, including raw returns, risk adjusted returns, and characteristic adjusted returns. The consistency measure, or SBI strategy consistency rating, is a quantitative indication or rating of the degree to which the selected manager adheres to his or her primary and/or secondary strategy. The SBI performance measure and strategy consistency rating are preferably determined on a 1-5 scale, with a rating of "5" being highest and the rating being reflected by a number of diamonds (or other character) corresponding to the numerical rating, e.g., a rating of three corresponds to three diamonds. The strategy outline is used to create a portfolio of complementary strategy managers. The user will be able to specify the criteria used for identifying complementary strategy managers.

The strategy consistency measure is updated periodically and can be based on both quantitative and qualitative measures. These measures may include the existence of constraints, the number of elements used by the manager, the degree of strategy fit, the correlation with strategy indices, the number of own strategy stocks held by the manager, the extent of characteristic drift, the correlation with characteristic indices, the strategy tracking measure, and interviews with the manager. The list of measures included my change over time.

The strategy database can be merged with performance and holdings data of third party databases to provide manager selection functionality. The user is able to specify the criteria for the selection process. The method for selecting complementary strategy managers is based on an algorithm involving risk and alpha characteristics and other desired portfolio features.

The SBI system can be made available to users as a web-based computer platform. It can take the form of a standalone product or as the engine driving a private label system.

Figure 3:
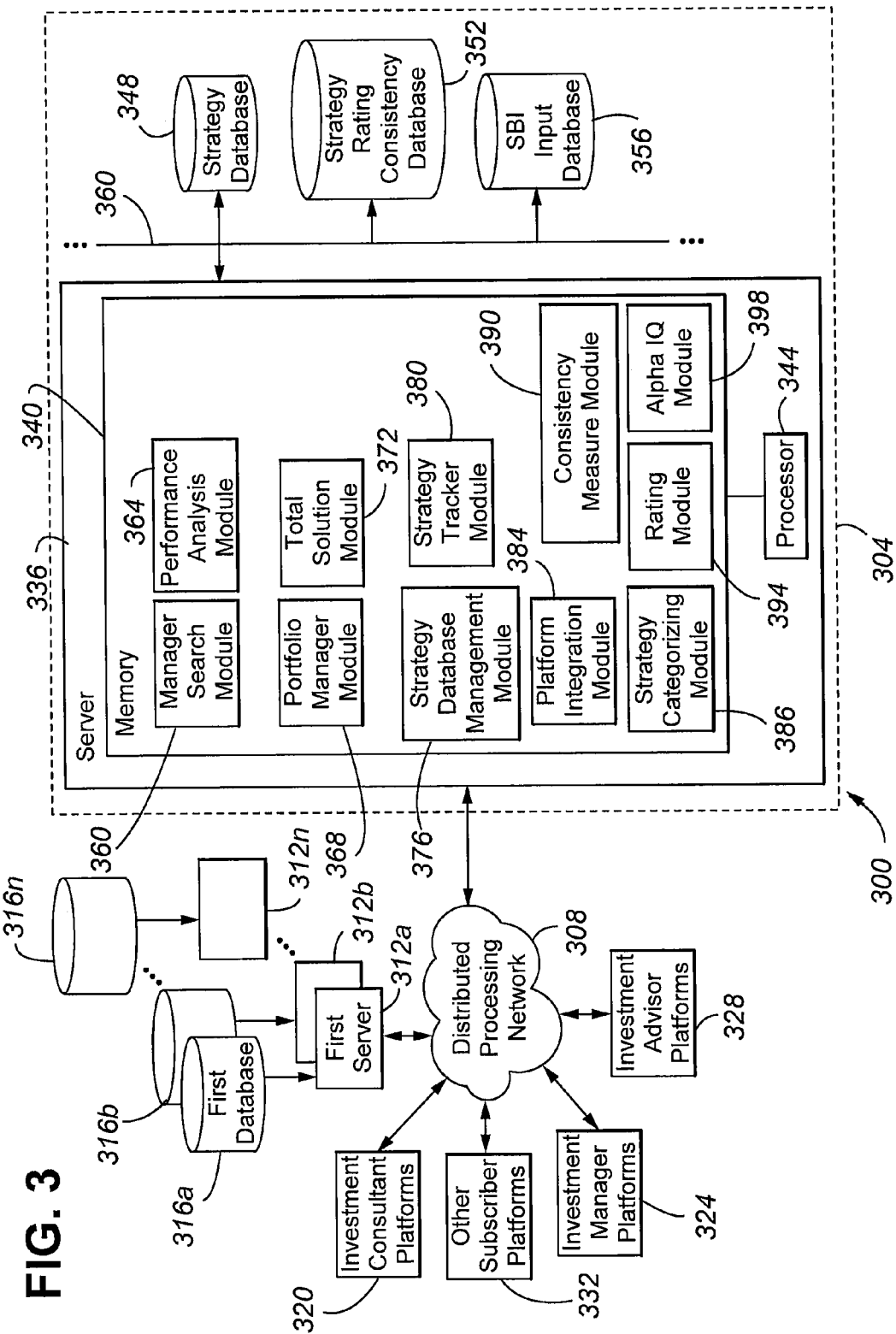
FIG. 3 is a block diagram depicting an architecture according to an embodiment of the present invention.

FIG. 3 is an embodiment of the SBI system.

The SBI system 300 comprises an enterprise network 304 in communication, via a distributed processing network 308 (e.g., a Wide Area Network (WAN) such as the Internet), with a plurality of first, second, . . . nth servers 312a-n and associated third party databases 316a-n and third party computer platforms, namely investment consultant computer platforms 320, investment manager computer platforms 324, investment advisor computer platforms 328, and other subscriber computer platforms 332. The various computer platforms and servers are preferably configured in a client-server configuration, though a peer-to-peer network configuration may also be used.

The SBI system 300 includes a software-controlled server 336 comprising a memory 340 and processor 344, a strategy database 348, a strategy rating consistency database 352, and an SBI input database 356, all interconnected by a Local Area Network (LAN) 360. The memory 340 includes a number of modules, including a find fund module 360, performance analysis module 364, portfolio manager module 368, total solution module 372, strategy database management module 376, strategy tracker module 380, and computer platform integration module 384.

The strategy database 348 contains information regarding securities and/or managers. The information includes data descriptors of the primary and secondary strategies of the identified security and/or manager. In one configuration, the data structures for each record include a security (e.g., fund) identifier, an identifier of the primary strategy, an identifier for the secondary strategy, and for each of the identified primary and secondary strategies, one or more component strategy elements for the respective strategy. The component strategy elements may be qualitative or quantitative in nature. The strategy elements can be ranked in the order of their importance to the manager. In one configuration, at least some of this information is received from security managers. An online questionnaire or survey is provided to the managers for completion. The questionnaire or survey provides the managers considerable latitude in describing their specific investment strategies, generally covers investment strategies and strategy elements and immediately informs the manager of the self-described primary and secondary investment strategies. Using just one login, the manager submits separate strategy descriptions for each fund managed.

The strategy rating consistency database 352 contains information regarding securities and/or managers. The information preferably includes a security identifier and, for each security identifier, a consistency rating.

The SBI input database 356 merges investment strategy information in the strategy and strategy rating consistency databases 348 and 352 with third party provided performance and holdings data, such as those in third party databases 316a-n. Examples of third party-maintained information include publicly available fund prospectuses, federal and state government regulatory and compliance filings (e.g., filings with the Securities and Exchange Commission), posted web content, historical security transaction records, performance information, holdings information, holdings, manager information, contact information and the like. Each record in the database 356 includes an security identifier, basic security information (e.g., security name, address, and contact information, assets under management, years in existence, investor/investment qualifications, holdings, availability of the fund and the like), manager information (e.g., manager name(s), years managing the fund, total years as an investment manager, and the like), primary strategy identifier, primary strategy elements (the relative importance of which may be ranked relative to one another), secondary strategy identifier, secondary strategy elements (the relative importance of which may be ranked relative to one another), strategy consistency rating, historical performance information, Earnings Per Share, EPS growth, SBI performance measure, growth of a selected investment since inception compared to a selected group of securities such as an index (e.g., Dow Jones index and S&P index), market capitalization, Price-to-Book or P/B ratio, Price per Share or P/S, net asset value, return over a selected period, Price/Earnings or P/E ratio, Standard Deviation or S/D, and portfolio characteristic tiles, such as market capitalization tilt, P/E tilt, EPS growth tilt, and P/B tilt), risk measures (e.g., alpha, beta, standard deviation, Sharpe ratio, alpha, volatility measures, and tilt alpha), (current) expense ratio(s), (current) holding(s), (current) sector weightings, quartile ranking relative to the security's SBI peer group membership, and SBI peer group membership identifier (i.e., identifier of SBI peer group of which the identified security is a member).

As will be appreciated, there may be a separate SBI input database for each asset class and for each type of investment vehicle within an asset class. For example, within securities, there may a separate database for mutual funds, separately managed accounts, and hedge funds.

The fund find module 360 is an online tool that allows subscribers to search for managers and securities within a particular investment strategy and for managers and securities with complementary investment strategies. When searching for a manager or security within a particular investment strategy, the subscriber has the flexibility in the search criteria used, including investment strategy, ratings, investment performance, risk measures, and portfolio characteristics. The underlying algorithm is a simple search that identifies all managers or securities meeting the criteria specified by the subscriber.

Figure 4:
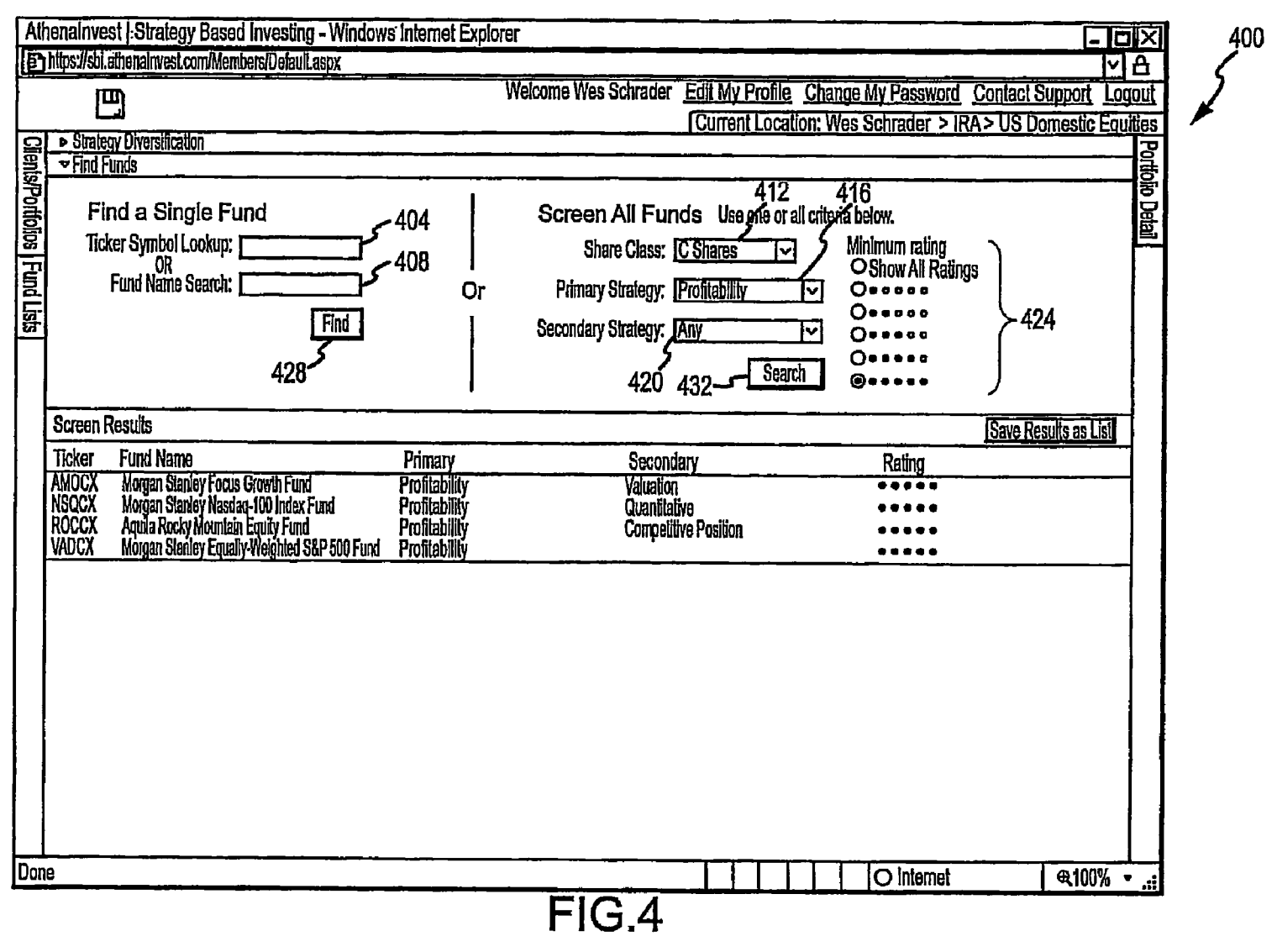
Figure 5:
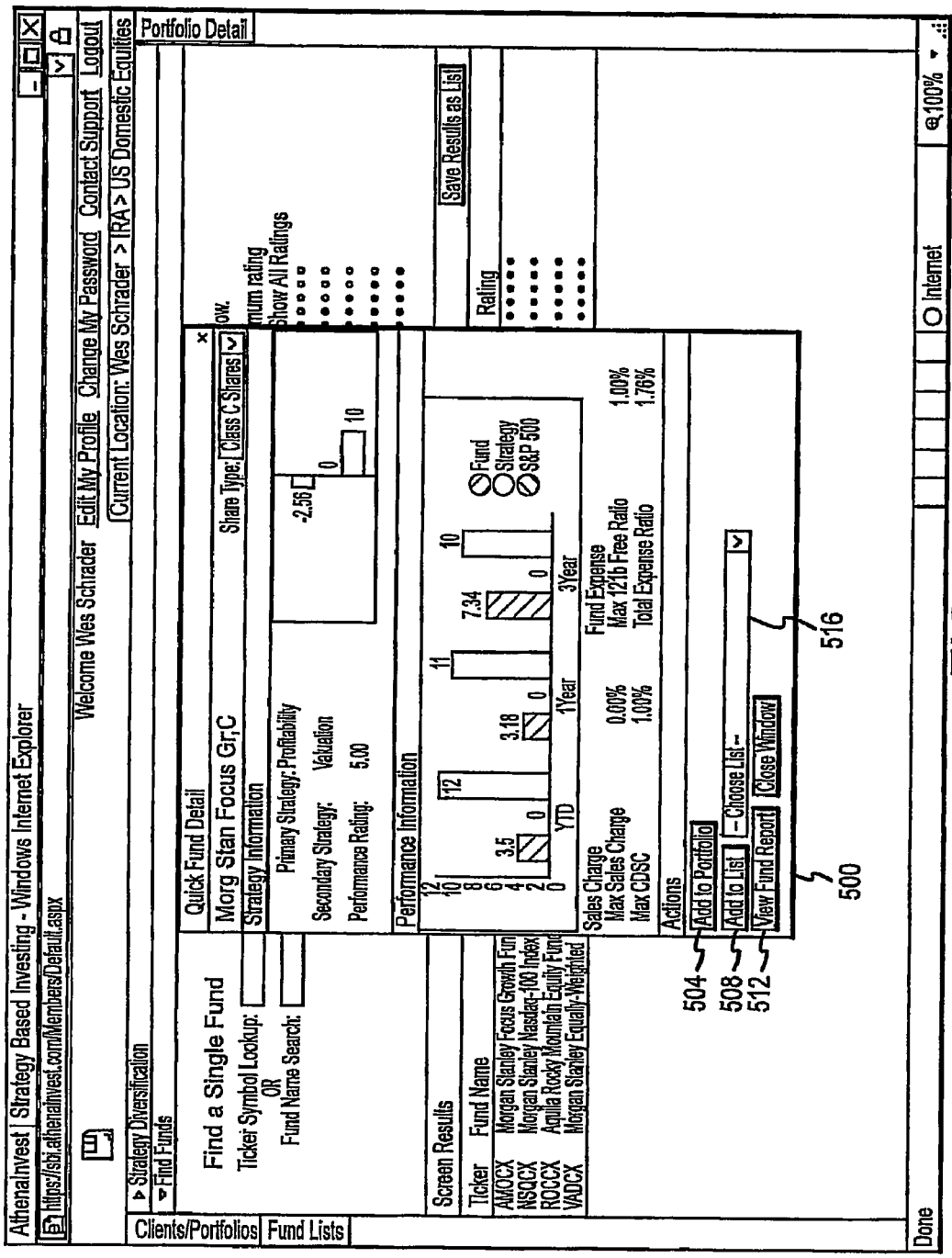
FIG. 5 is a screenshot according to an embodiment.

An exemplary fund find interface is depicted in FIGS. 4-5. The display 400 includes a number of fields, including ticker symbol lookup 404, fund name search 408, share class 412 (which has a drop down menu providing as options A class, B class, C class, I class, and R class shares, no class, and other), primary (investment) strategy 416 (which has a drop down menu providing the investment strategies as options), secondary (investment) strategy 420 (which has a drop down menu providing the investment strategies as options), and minimum fund or diamond rating 424. As will be appreciated, other search criteria can be employed including any of the manager and/or security data descriptors noted above. The fields 404 and 408 are associated with a find icon 428, while the remaining fields are associated with a search icon 432. When either icon is selected, a search is performed over the associated fields. In the example shown, a search has been performed over fields 412, 416, 420, and 424, and the results are depicted in the lower half of the display. The search results can be saved as a list by selecting "Save Results as List".

With reference to FIG. 5, the subscriber, by clicking on one of the listed funds (which in this case is Morgan Stanley Focus Growth, class C shares), can cause the manager search module 360 to display the fly-out quick fund detail window 500. The window 500 includes a description of the located security and provides the subscriber with options, including add to portfolio 504, add to list 508, and view fund report 512. To add the security to a list, the subscriber must first select a list to which it is to be added. This is done by completing the field 516. The detail window about a fund can also appear by selecting an icon representing the fund in any user display. For example, selecting any of the listed funds in FIG. 6 will cause a detail window about the selected fund to appear.

In one configuration, once a manager and/or security has been selected, the subscriber can identify the best complementary investment strategy and managers/securities for inclusion in the portfolio. The subscriber can use a number of search criteria, including the desired number of complementary investment strategies and any of the data descriptors noted above such as return, risk and resulting portfolio characteristics. If the number of complementary investment strategies and search criteria is changed, the complementary investment strategy circle is recalculated using the optimization equation.

The performance analysis module 364 is an online tool that provides subscribers with performance data, such as returns, holdings, performance (e.g., diamond) ratings, and characteristic tilts, for managers and securities. The module analyzes performance based on the manager's self-selected SBI peer group. Performance can be measured in terms of a number of portfolio risk characteristics, investment strategies, and strategy elements and can be ranked relative to other managers within the SBI peer group.

The portfolio manager module 368 is an online tool that allows subscribers to track a selected portfolio's performance in terms of returns, holdings, and characteristic tilts. It provides an overall picture of the portfolio as well as in combination with other asset classes held by the selected client investor.

There are several types of selected portfolios. One type of portfolio is the current portfolio of a selected client investor. A second type of portfolio is the target portfolio. The target portfolio corresponds to the tangency portfolio, which is a function of the expected return and risk. A third type of portfolio is the "what if" portfolio, which is a hypothetical or planned portfolio created by the subscriber. Typically, the "what if" portfolio is a modified version of the subscriber's current portfolio.

The total solution module 372 is an online tool that selects automatically managers and securities based on subscriber-defined investment criteria, including the data descriptors noted above, and provides a complete portfolio solution for the investor. The manager module 368 provides a specific set of manager recommendations based on the search criteria specified by the investor. By way of example, the manager module 368 receives inputted parameters from the subscriber and selects, from the set of managers and/or securities satisfying the search criteria, a subset of recommended managers and/or securities for consideration by the subscriber. The recommendations, for instance, can be based on relative values of one or more selected parameters inputted by the subscriber and can be transmitted to the subscriber by the order in which the search results are listed.

The strategy database management module 376 determines, for a selected security or manager, primary and secondary investment strategies and component strategy elements and creates and updates records in the strategy database 348.

The strategy tracker module 380 determines the strategy tracking indices for selected securities and managers and creates and updates records in the strategy rating consistency database 352. The assets being invested in by the security or manager (e.g., stocks when an security fund) are categorized by the type of strategy manager most frequently holding the asset. Over time, the type of assets held by the manager are compared to the assets held by the typical manager within the investment strategy, and a strategy tracking index is created based on this comparison. Following this index will allow for tracking fund strategy consistency over time.

The computer platform integration module 384 consolidates selected information in the first, second, ... nth databases 316a-n with information in the strategy and rating consistency databases 348 and 352 to create and update composite records in the SBI input database 356 and provides subscriber access to the SBI input database 356 and controls operation of the other logic modules 360, 364, 368, 372, 376, and 380. The integration module 384 provides a seamless link between the enterprise network 304 and the third party computer platforms 320, 324, 328, and 332.

The collective operation of the various modules will now be discussed with reference to FIGS. 6-14.

Figure 6:
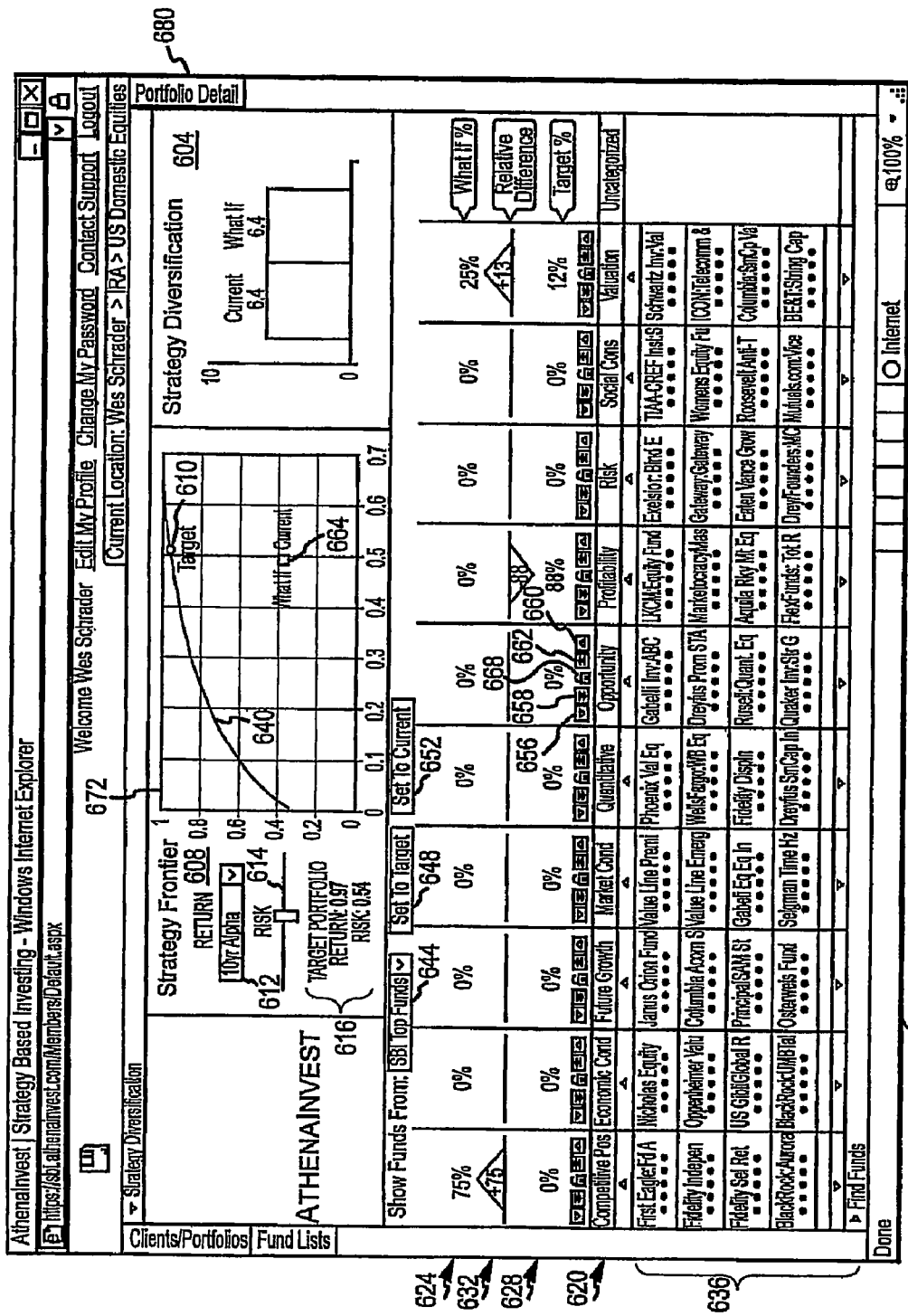
FIG. 6 is a screenshot according to an embodiment.

FIG. 6 is a master or top level screen display 600 for the SBI system. The display 600 provides a variety of information to the subscriber. This information includes strategy diversification 604, which, on a scale of 10 (with 10 being the highest level of diversification), shows the diversification ratings of the current and "what if" portfolios (both of which have a common rating of 6.4); the strategy frontier 608, which shows the target or tangency outline 610 for the selected return and risk, the selected return 612, current risk (slider) setting 614, the target portfolio return and risk settings 616, each investment strategy 620, and, for each investment strategy, the weighting in the "what if" and target portfolios 624 and 628, respectively, the relative difference 632 between the weightings, and listings 636 of the selected securities for each investment strategy.

The strategy frontier (i.e. efficient frontier) curve 640 is a function of the (relative) relative return selected in box 612 and (relative) risk setting 614. The relative return on the vertical or Y-axis of the frontier curve 640 captures the lowest (0) to highest (1) expected returns possible when forming strategy-based portfolios. The relative return is based on the particular return estimates chosen and the strategy quadratic optimization algorithm. Relative risk on the horizontal or X-axis of the frontier curve 640 captures the range of lowest (0) to highest (1) portfolio deviations when forming strategy-based portfolios. The relative risk is based on the historical strategy standard deviations and correlations. Thus, changes in the relative return and risk settings will typically change the shape and/or position of the strategy frontier curve 640, position of the target portfolio 610, and the weightings of the target portfolio. The strategy diversification values indicate that the current and "what if" portfolios are not well diversified. A diversification value of 9 or higher is considered to be well diversified. Strategy diversification is determined using the concept of complementary investment strategies discussed with reference to FIG. 2.

Figure 13:
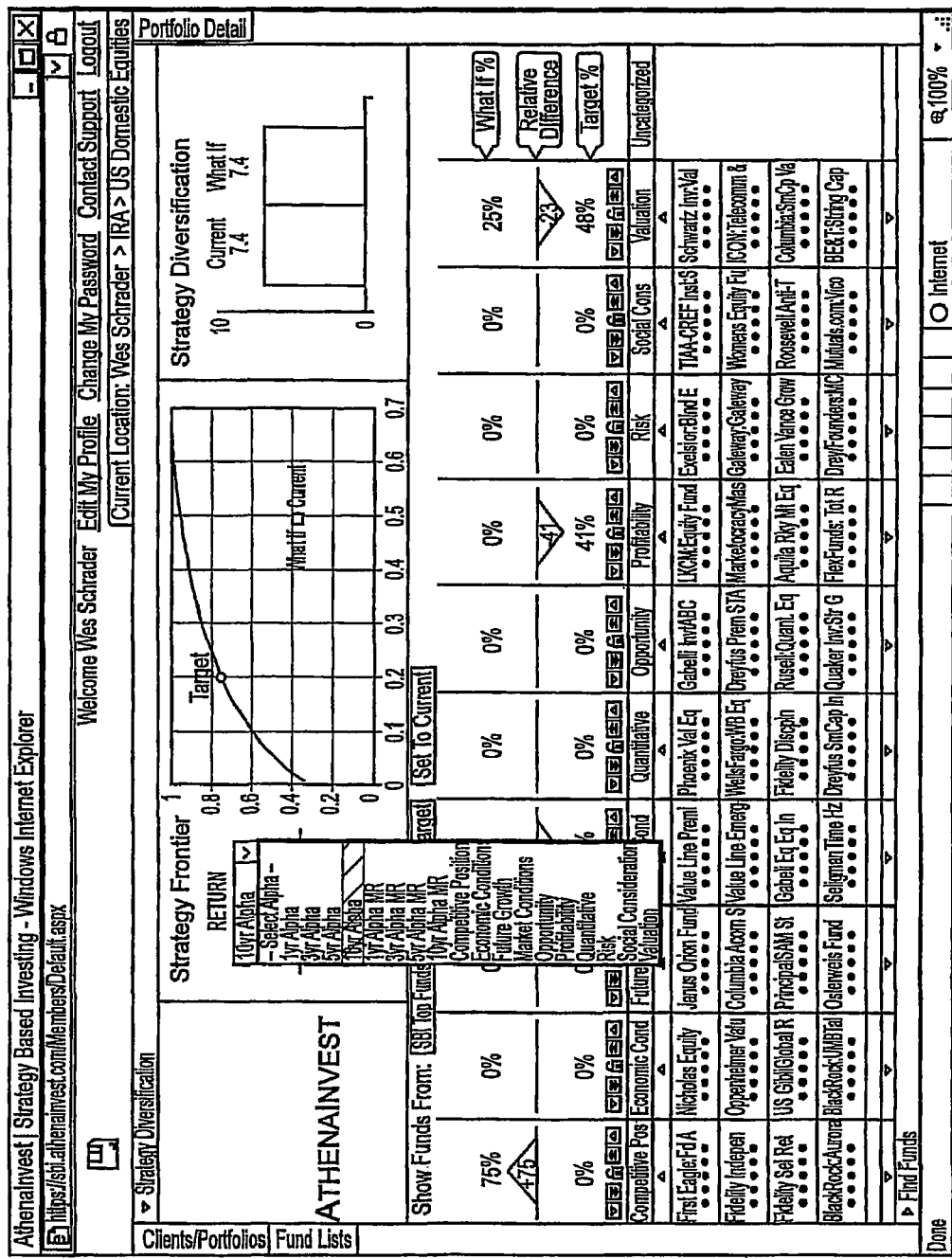
FIG. 13 is a screenshot according to an embodiment.

FIG. 13 is a screen shot 1300 showing the various options available to the subscriber as the relative return. The options are 1-year alpha, 3-year alpha, 5-year alpha, 10-year alpha, 1-year alpha MR, 3-year alpha MR, 5-year alpha MR, 10-year alpha MR, competitive position, economic considerations, future growth, market conditions, opportunity, profitability, quantitative, risk, social considerations, and valuation. The first group of options, namely 1-year alpha, 3-year alpha, 5-year alpha, 10-year alpha, contains historical returns based on the average performance of funds within each category. In the case of US equity open end funds, the returns are obtained from Lipper and are net of fund management fees and 12B-1 expenses, but are not net of any load, sales, wrap, or additional outside management fees. In the case of equity funds, 1, 3, 5, and 10 year estimates are provided. The next group, namely 1, 3, 5, and 10 year Mean Reversion (MR) estimates, are based on the historical returns, with the highest and lowest returns swapped, the next highest and lowest swapped, and so forth. In other words, the MR return estimates are obtained by assuming that the best performing strategy over a time period will become the worst performing over the next time period by the same amount of the previously worst performing. The final group of options are investment strategies and mirror the investment strategies associated with each column listed in the lower portion of display 600. The selection of an anchor investment strategy forces the chosen strategy into the target portfolio and adds other strategies based on risk reduction considerations only. For example, if competitive position is selected, then every target portfolio will contain competitive position (with the possible exception of the zero relative risk portfolio) along with those strategies that best complement competitive position with respect to risk reduction. As the risk slider is increased, the competitive position allocation approaches and ultimately reaches 100%. The selected return estimates become the basis for all strategy frontier, diversification, and allocation calculations.

Returning to FIG. 6, the display 600 further includes a fund selection box 644, which provides the criteria for the funds in the listings 636 and which has, as options, SBI top equities in each investment strategy (as shown), current portfolio equities, "what if" selected equities, and a pre-existing or pre-selected list of equities. The set to target icon 648 causes the "what if" row 624 to be the same as the target row 628, and the set to current icon 652 causes the "what if" row 624 to return to the weightings and holdings of the current portfolio. As the weightings and/or equity holdings in each investment strategy column change, the "what if" row settings change in a corresponding manner. Lists of equities include quick watch funds (which are specified by the subscriber as equities whose performance is to be monitored) and other lists selected by subscriber. The subscriber can configure as many equity listings as he or she desires. The funds listed in the lower half of the display 600 are the funds in each strategy with the highest Diamond Rating. This rating captures the degree to which the fund manager is strategy consistent and best idea concentrated with ♦♦♦♦♦ (5 Diamond) being the best and ♦ (1 diamond) being the worst. Research shows that strategy consistent/best idea concentrated managers have outperform. A fund's Diamond Rating is based on several objective measures of strategy consistency/best idea concentration and does not contain any individual fund return performance measures. Thus, if past performance is important in selecting funds, the Diamond Ratings will have to be supplemented in the fund selection process.

In one configuration, the Diamond Ratings (DRs) are determined by the performance analysis module 364 as a function of at least two components. The first rating component quantifies how strategy consistent is the security (e.g., fund) or manager. The first rating component captures the extent to which a security or manager is consistently pursuing a strategy. The second rating component quantifies how concentrated is the portfolio on best ideas. The second rating component may be determined over any time horizon or interval. The DR thus provides users with guidance in identifying successful, active securities or managers in a selected primary strategy or selected primary and secondary strategy pairing.

The first rating component can be measured in several ways including the percent of own strategy stocks held by the manager, the number of own strategy elements contained in the manager's strategy outline, or the percent of own strategy elements relative to the total number of elements contained in the strategy outline. As of result of being strategy consistent, the manager's portfolio will move about the equity universe as the manager responds to changing economic and market conditions. This is quite different than the conventional wisdom which states a manager must remain in a specific style box and thus remain in a specific region of the equity universe and avoid drifting to other regions.

The second rating component or dimension can be measured in a number of ways. Generally, the first rating component measures a degree to which the security (e.g., fund) or manager has placed active stock bets or the degree to which the security or manager has concentrated his or her assets under management in securities from a small number of issuers. Index funds, in contrast, are considered not to be placing active stock bets as they hold securities from a large number of issuers. The second rating component can be a function of a number of measures, including R squared of the manager's returns with the appropriate index, style drift, tracking error, information ratio, sector bets, beta, active share, and other measures of a degree of deviation or difference of a manager's security holdings from an investment index comprised of a broad, representative set of the securities from which the manager selects, and combinations thereof. While conventional wisdom is that larger deviations from an index represent higher risk and lower probable investment performance, it has been discovered that smaller deviations from an index typically represent higher risk and a lower probable investment performance. For example, it has been discovered that larger tracking errors generally equate to better manager and security (e.g., fund) performance.

The DR score is a function of the first and second rating components, which may be equally or unequally weighted when combined to determine the DR. The weighting may be static or dynamic depending on selected factors. Exemplary factors used to weight dynamically the first and second rating components include reliability and predictive ability, and combinations thereof.

As noted, the performance analysis module can determine the DRs peer group-by-peer group, or stated another way, the DRs can be determined for a primary strategy and/or secondary strategy. The Rating is determined by ranking the manager, within the manager's peer group, on each of the two dimensions described above. The highest Diamond Rating is assigned to those managers who rank highest on each of the dimensions. The Diamond Rating is reduced as each of the two dimension measures decline, with the lowest rating assigned to those managers who rank lowest on the two dimensions.

For a given strategy peer group, the highest, or DR5, rating is assigned to those peers (e.g., funds) that rank most strategy consistent and most best idea concentrated within their strategy peer group, DR4 to the next highest group, and so forth. Alternatively, an average of the DR scores can be determined, and the degree of deviation from the average DR score used to determine the DR rating. Normally, a DR 3 rating reflects the average DR score.

DR rating and strategy performance are typically unrelated. It is possible to have a successful active manager pursuing a poorly performing strategy and vice versa. Thus, it can be important to strategy optimize and select carefully from among DR5 securities (e.g., funds) within each strategy when constructing a portfolio.

The DR rating system is contrary to conventional wisdom. Currently, there are a number of services that categorize funds based on the characteristics of the most recently reported fund holdings. This does not mean that the manager is staying in that particular box over time and, if they are not, they are thus not box constrained. The inventors have determined that many managers exhibit considerable box drift even though they are at the time being categorized in a particular box. Most managers determined to be the most successful (DR5) managers are generally among such drifting managers.

The DR rating system may be applied not only to managers and funds but also to other asset classes.

In each investment strategy column in FIG. 6, a number of strategy control icons are presented to change the weightings in the "what if" row 624. The single down arrow 656 decreases the "what if" portfolio weighting in the corresponding column by 1% and the double down arrow 658 by 5%, the single up arrow 660 increases the weighting by 1%, and the double up arrow 662 by 5%. As a change is made in one column, the change is propagated to the weightings in the other (unlocked) columns and the position of the "what if" portfolio icon 664 changes, as appropriate. Adjusting the strategy control icons moves the "what if" or planned portfolio in a desired direction, typically closer to the target portfolio. Changing strategy allocations only affects the "what if" portfolio and not the current portfolio. Once the strategy allocation process is completed, specific fund allocations can be adjusted using the portfolio detail fly-out (FIG. 7).

The pad lock icon 668 shown between the pairs of arrows in each column permits the subscriber to prevent propagation of portfolio weightings. When the pad lock icon is shown as being an open or unlocked pad lock, this feature is not in effect, and changes are propagated freely as noted above. When the pad lock icon is shown as being closed or a locked pad lock, the percentage allocation or weighting in that column remains unchanged in response to changes in another column's allocation percentage. There must be at least two unlocked, positive allocation strategies for the allocation algorithm to operate properly.

The strategy frontier plot 672 shows the relative positions of the "what if" and current portfolios, the target portfolio 664, and the strategy frontier curve 640. The position of the current portfolio is fixed. The position of the target portfolio 610 and position and shape of the strategy frontier curve 640 can be changed by altering the return 612 and risk setting 614. The position of the "what if" portfolio 664 is changed by manipulation of the strategy control icons. Because no changes have been made to the current portfolio, the display 600 shows the positions of the "what if" and current portfolio as being identical. The positioning of the "what if" and current portfolios well below the strategy frontier curve 640 indicates that the portfolios are strategically not well diversified. A position closer to the curve 640 and more preferably closer to the target indicates that the portfolios are strategically well diversified. The downwardly facing arrows between the "what if" and target allocation rows 624 and 628 show that the percent by which the percentage allocations of the "what if" portfolio differ from the recommended target portfolio.

Figure 7:
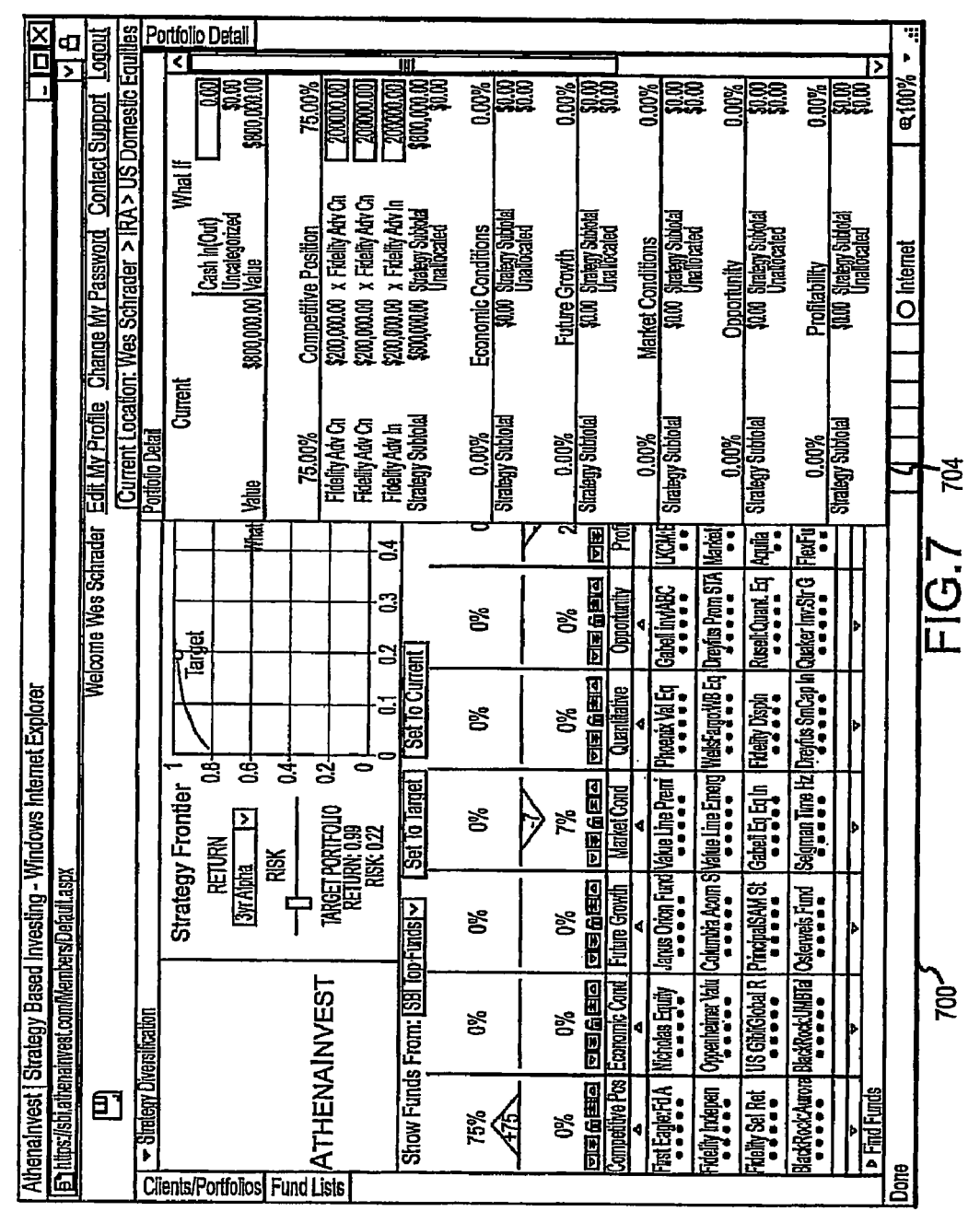

FIG. 7 depicts a screen shot 700 of the prior display when the cursor is moved to the portfolio detail tab 680 at the right margin of the display 600. A fly-out display 704 appears showing the security holdings of the current and "what if" portfolios, with the equities subdivided based on investment strategy category. A fund is eliminated by clicking on the x in front of the fund. The resulting cash inflow is added to the unallocated amount for that strategy. A fund is added from the funds listed at the bottom of the application by clicking on it and then clicking on "Add to Portfolio" at the bottom of the quick fund detail window. The fund is added with a zero money balance. At the top right of the fly-out, the subscriber then types in the cash in or out of the portfolio. If the subscriber were to click elsewhere in the fly-out, the "what if" total is updated. One-by-one, the subscriber increases or decreases the amount invested in each fund by typing in a new amount in the box to the right of each fund. If the subscriber were to click elsewhere in the fly-out, the totals are updated. This process is continued in this manner until the unallocated amounts are close to zero for each strategy as well as for the uncategorized funds.

Figure 8:
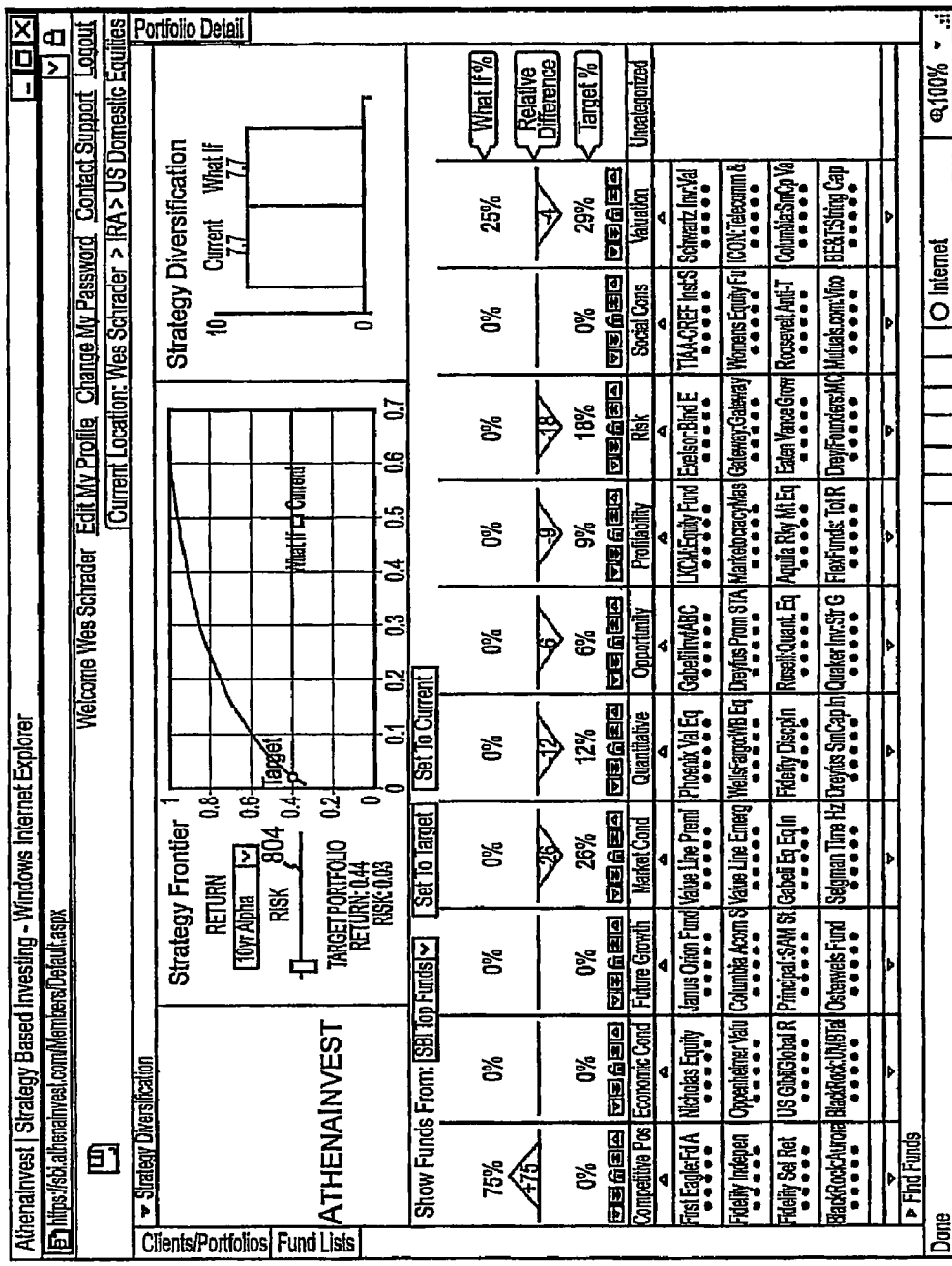
FIG. 8 is a screenshot according to an embodiment.

FIG. 8 is a screen shot 800 differing from FIG. 6 in that the risk settings are different. FIG. 6 has a risk setting 614 equal to 0.54 while FIG. 8 has a risk setting 804 of 0.03. As can be seen by comparing the strategy frontiers of FIGS. 6 and 8, the positions and weightings of the target have changed.

Figure 9:
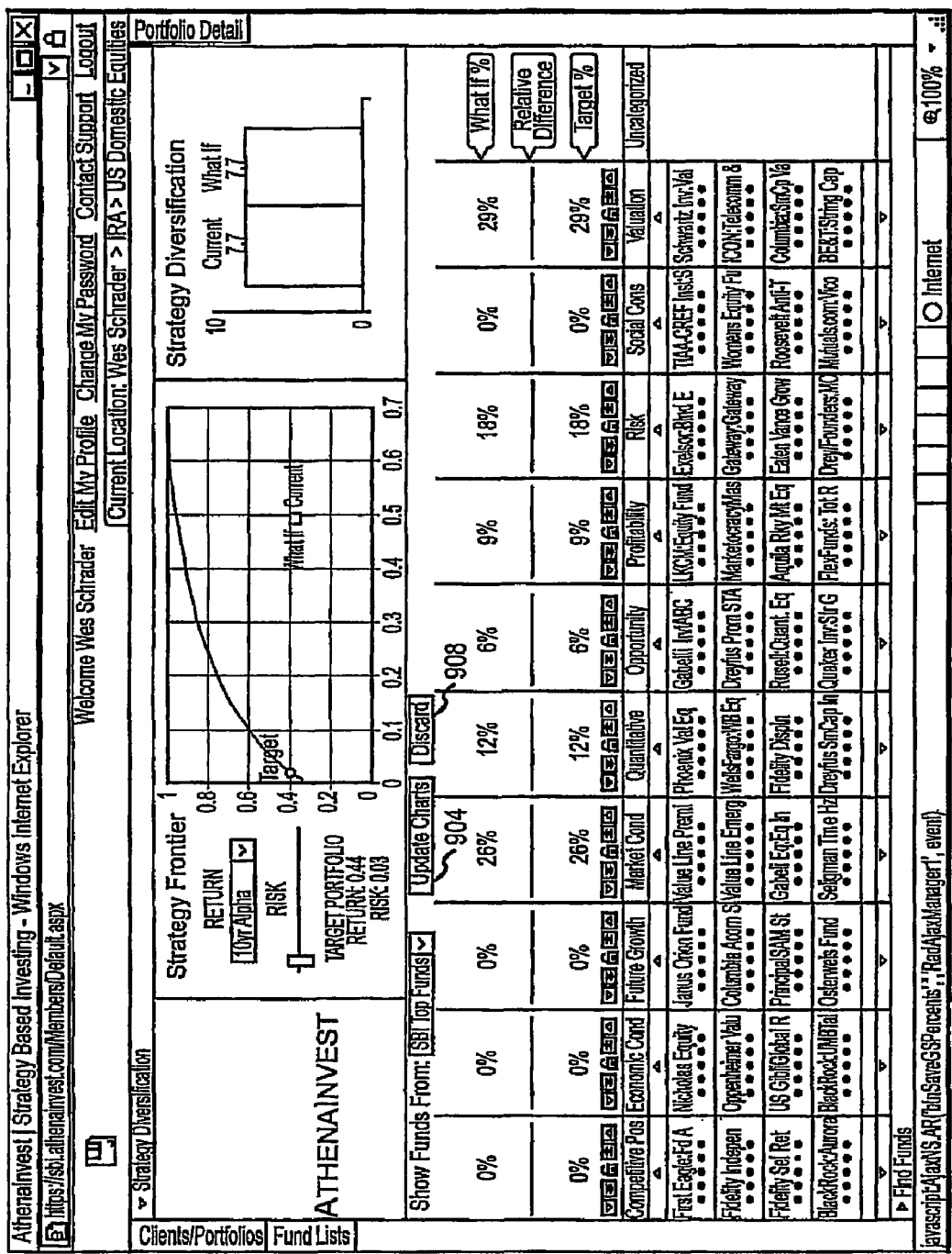
FIG. 9 is a screenshot according to an embodiment.

FIG. 9 is a screen shot 900 differing from FIG. 6 in that changes have been made to the information shown in the lower half of the screen shot 900 and two new icons have appeared the update chart icon 904 and discard icon 908. If selected, the former icon 904 updates the displayed strategy frontier to reflect the changes and the latter icon 908 does not update the displayed strategy frontier but rather discards all changes since the previous update.

Figure 10:
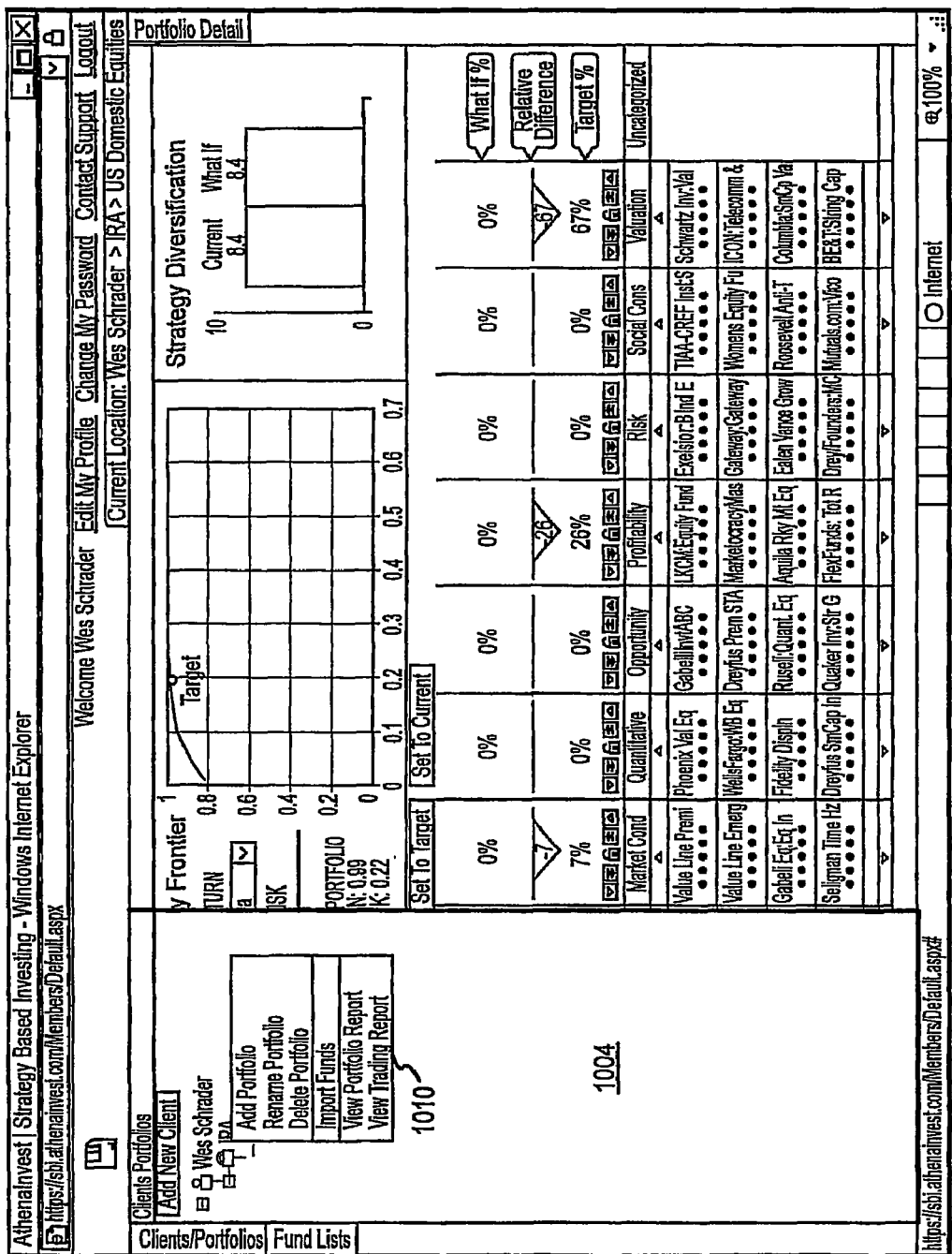
FIG. 10 is a screenshot according to an embodiment.

FIG. 10 is a screen shot 1000 differing from FIG. 6 in that the cursor has been positioned over the clients/portfolios tab on the left side of the display 600. The drop down display 1004 appears, which lists the subscriber's clients and, for each client, a listing of portfolios or portfolio segments for that client. In the example of FIG. 10, the client is "Wes Schrader" and the portfolio segment for that client is "IRA". The relationship between the client and portfolio(s) is shown by a hierarchical tree structure. More than two levels of hierarchy are possible, such as, for instance, where a displayed portfolio has sub-portfolios or portfolio segments, and the displayed sub-portfolios include component stock holdings. The subscriber has further selected "IRA", which causes a further drop down display 1010 to appear. That display permits the subscriber to add a portfolio for the listed client, rename the selected portfolio of the client, delete the listed portfolio of the client, import funds, and the amount invested in each into the selected portfolio, view a portfolio report for the selected portfolio, and view a trading report for the selected client. As shown in FIG. 10, a new client file can be created by clicking on the "Add New Client" icon. When the icon is selected, a fly-out display is provided requesting the client and portfolio names. Additionally, the subscriber can import a list of funds, without amounts invested, as a fund list by moving the cursor over the "Fund List" tab 1014. The fund list function allows importing of the subscriber's preselected set of funds, whether preferred by the subscriber or the subscriber's firm, or funds of interest to the investor.

A portfolio report provides a summary of the portfolio in terms of strategies, allocations, consistency ratings, market cap and PE tilts, and risk. Combining this report with individual Fund Reports produces a comprehensive client report. The report includes all necessary disclosures which can be modified in order to meet the specific compliance requirements of your firm.

A sample trading report is shown in FIG. 12. This report should only be generated after the strategy diversification and fund allocation process is completed. It summarizes fund changes between the current and "what if" portfolios. The report includes the comparative weightings of the current and "what if" portfolios and provides the difference or change between the portfolio weightings.

Figure 11:
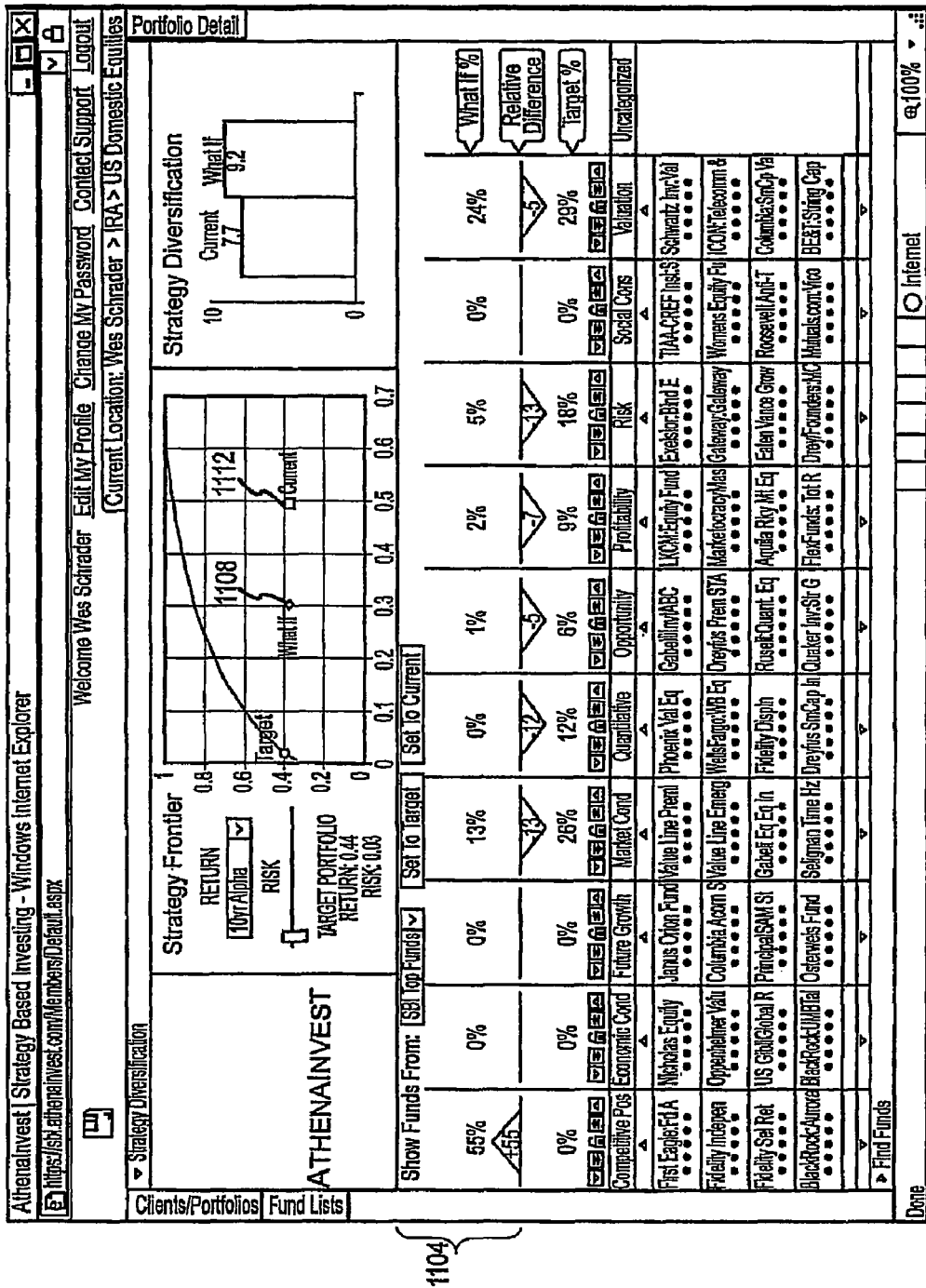
FIG. 11 is a screenshot according to an embodiment.

FIG. 11 is a screen shot 1100 that differs from the display 600 of FIG. 6 in that changes have been made to the "what if" row 1104 and the "update charts" icon 904 selected. The strategy frontier graph has been refreshed to show a "what if" portfolio icon 1108 reflecting the changes and a current portfolio icon 1112 reflecting the weightings of the current portfolio. The position of the target icon remains unchanged as no changes have been made to the return and risk profile.

Figure 14:
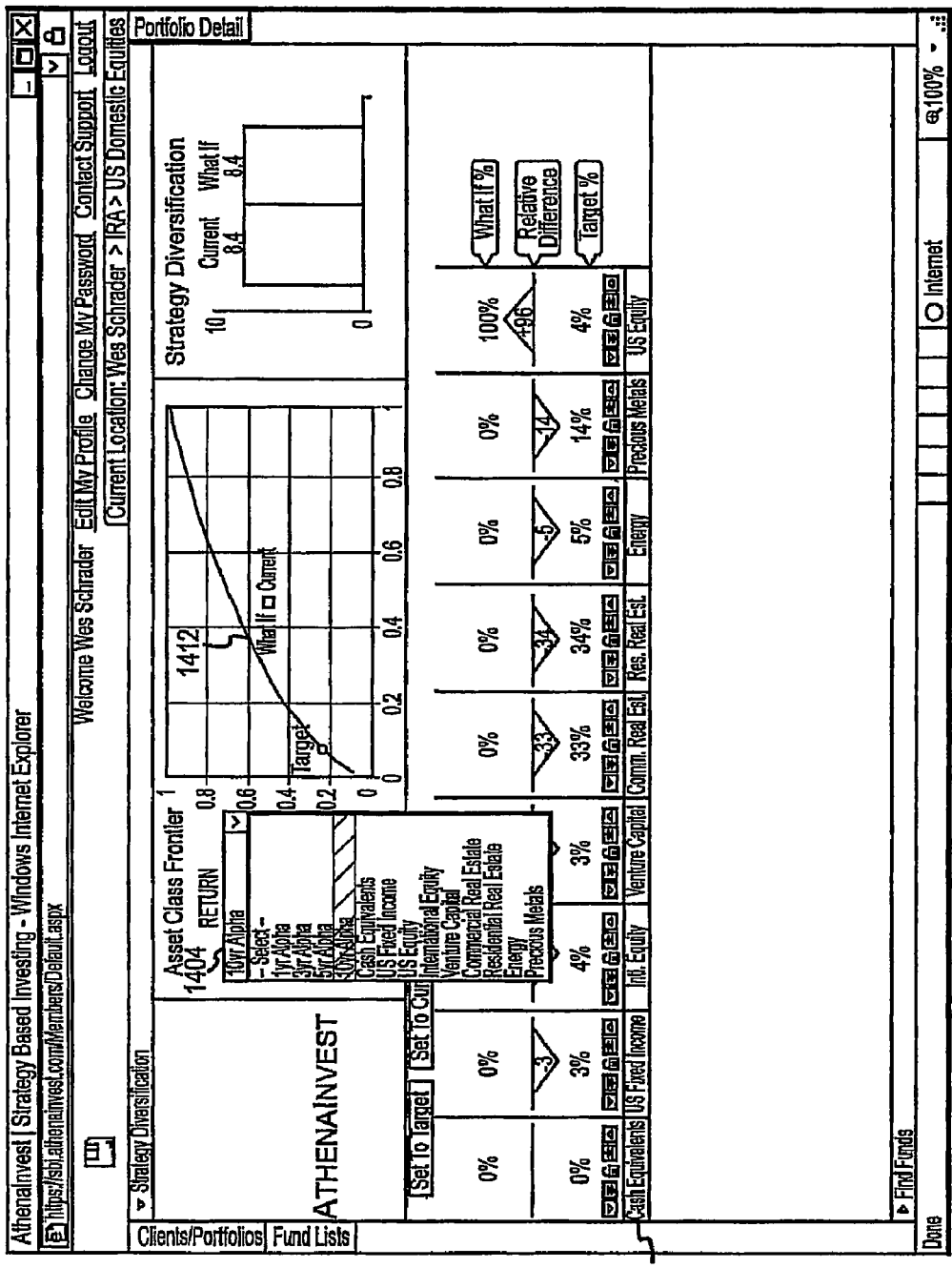
FIG. 14 is a screenshot according to an embodiment.

FIG. 14 is a screenshot 1400 depicting the option of setting asset class allocation profile. The drop down menu 1404 associated with return has changed from the set of selections shown in FIG. 13 to the following set of selections: 1-year alpha, 3-year alpha, 5-year alpha, 10-year alpha, cash equivalents, US fixed income, US equity, international equity, venture capital, commercial real estate, residential real estate, energy, and precious metals. Additionally, the strategy frontier label has changed to asset class frontier, and the column associations have changed to mirror the listed asset categories 1408, namely cash equivalents, US fixed income, US equity, international equity, venture capital, commercial real estate, residential real estate, energy, and precious metals. Each asset class is associated with a corresponding relative return of which the target profile and asset class frontier curve 1412 are functions. Screenshot 1400 appears when the subscriber selects a client's (multi-asset class) portfolio generally while screenshot 600 appears when the subscriber selects a US equity sub-portfolio or portfolio segment of the subscriber. The asset class totals are entered into a portfolio detail fly-out (FIG. 7) in the box to the right of each current asset class. The "what if" allocations can then be changed as desired. The allocation totals are used for input into the sub portfolio allocation process. In this manner, the subscriber is able to work in multiple asset types or only one asset type.

Figure 22A:
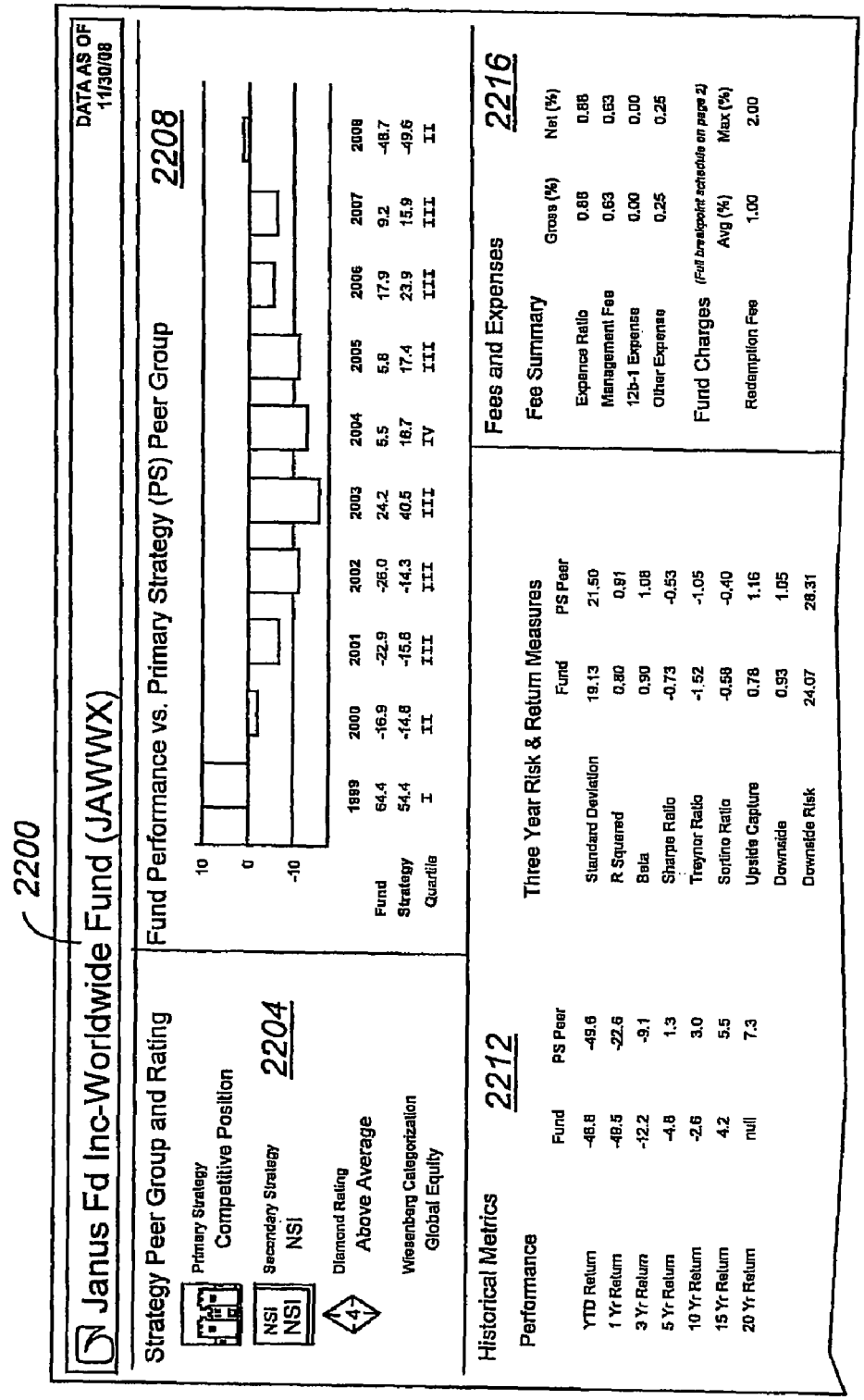
FIGS. 22A and B are a split screenshot according to an embodiment.

FIGS. 22A and B are a split screen shot according to a particular graphical user interface configuration. The display includes in box 2200 an identification of the fund family and family member (Janus Fund Inc. and Worldwide Fund (JAWWX respectively), box 2204 the primary strategy (competitive position), secondary strategy ("NSI" Or "Not Strategy Identified"), diamond rating ("4" or above average), and a Wiesenberg categorization ("Global Equity"), box 2208 a time indexed bar graph showing fund performance versus primary strategy peer group, box 2212 historical metric (annual return and three year risk and return measures (e.g., standard deviation, R-squared, beta, Sharpe ratio, Treynor ratio, Sortino ratio, upside capture, downside capture, and downside risk)), box 2216 fees and expenses, box 2220 portfolio holdings (strategy profile, diamond rating profile, sector weightings, and top ten holdings), and box 2224 portfolio metrics.

The operation of the SBI system 300 will now be described with reference to FIGS. 15-19.

Figure 15:
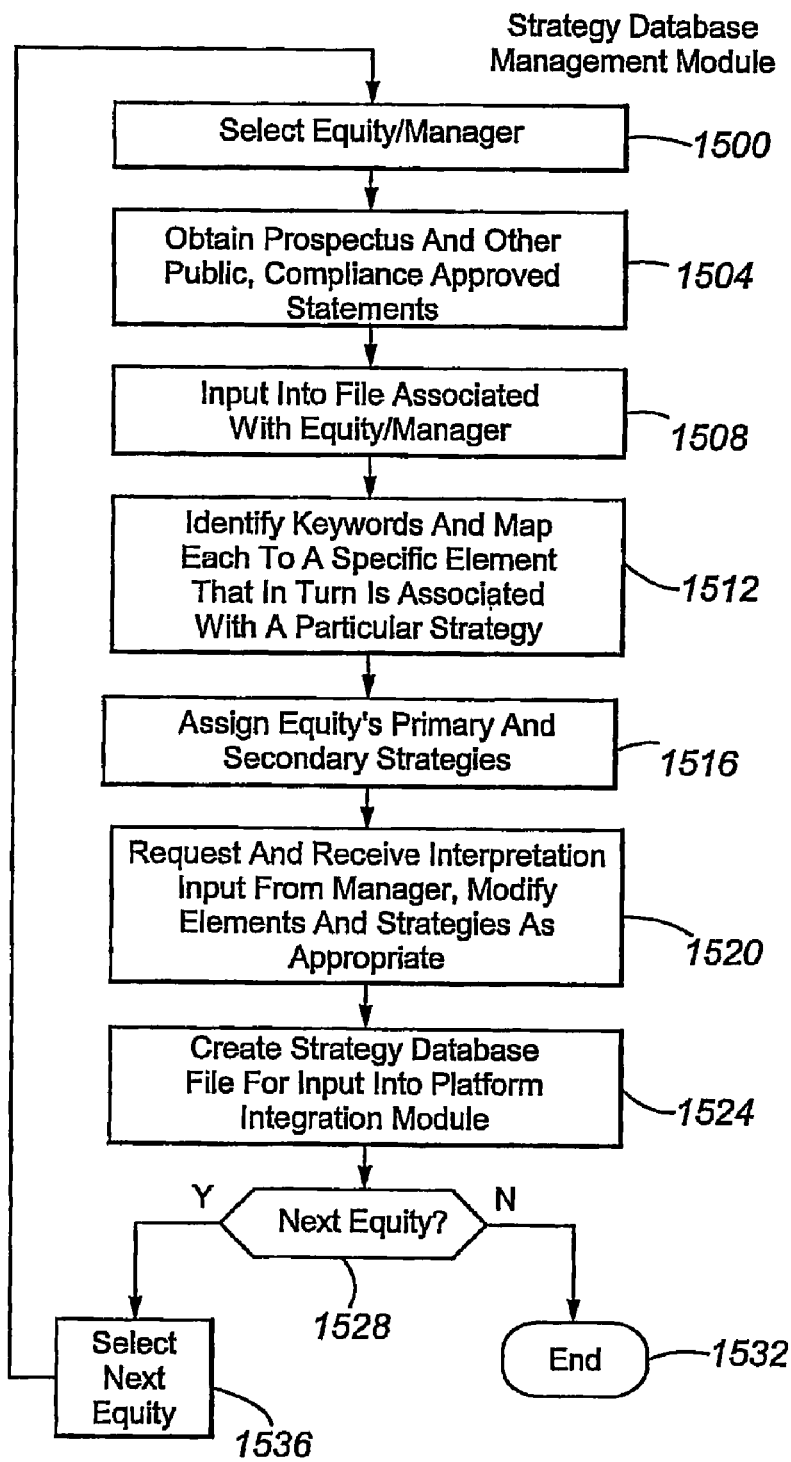
FIG. 15 is a flowchart according to an embodiment.

Referring to FIG. 15, the strategy database management module 376 in box 1500 selects a security and/or manager.

In box 1504, the module 376 obtains the prospectus and other public compliance approved statements, such as from one or more of the first, second, . . . nth databases 316a-n. The statements are parsed and keywords located.

In box 1508, the located information is inputted into a temporary file or record associated with the selected security and/or manager.

In box 1512 which may be performed as part of box 1508, the identified keywords are mapped, each to a specific strategy element that, in turn, is associated with a particular investment strategy.

In box 1516, the module 376 assigns the selected security's/manager's primary and secondary investment strategies and populates appropriate fields in the data record.

In box 1520, the module 376 requests and receives interpretation input from the selected manager, modifies the strategy elements, and investment strategies, as appropriate. Preferably, the manager-selected primary and secondary investment strategies and strategy elements take precedence over conflicting information in the record. Boxes 1516 and 1520 may be performed in the reverse order.

In box 1524, the module 376 creates a file or record in the strategy database 348 for input into the computer platform integration module 384.

In decision diamond 1528, the module 376 determines whether there is a next security/manager to be processed. If not, the module 376 terminates operation in oval 1532. If so, the module 376 selects the next security/manager in step 1536 and returns to and repeats box 1500.

Figure 16:
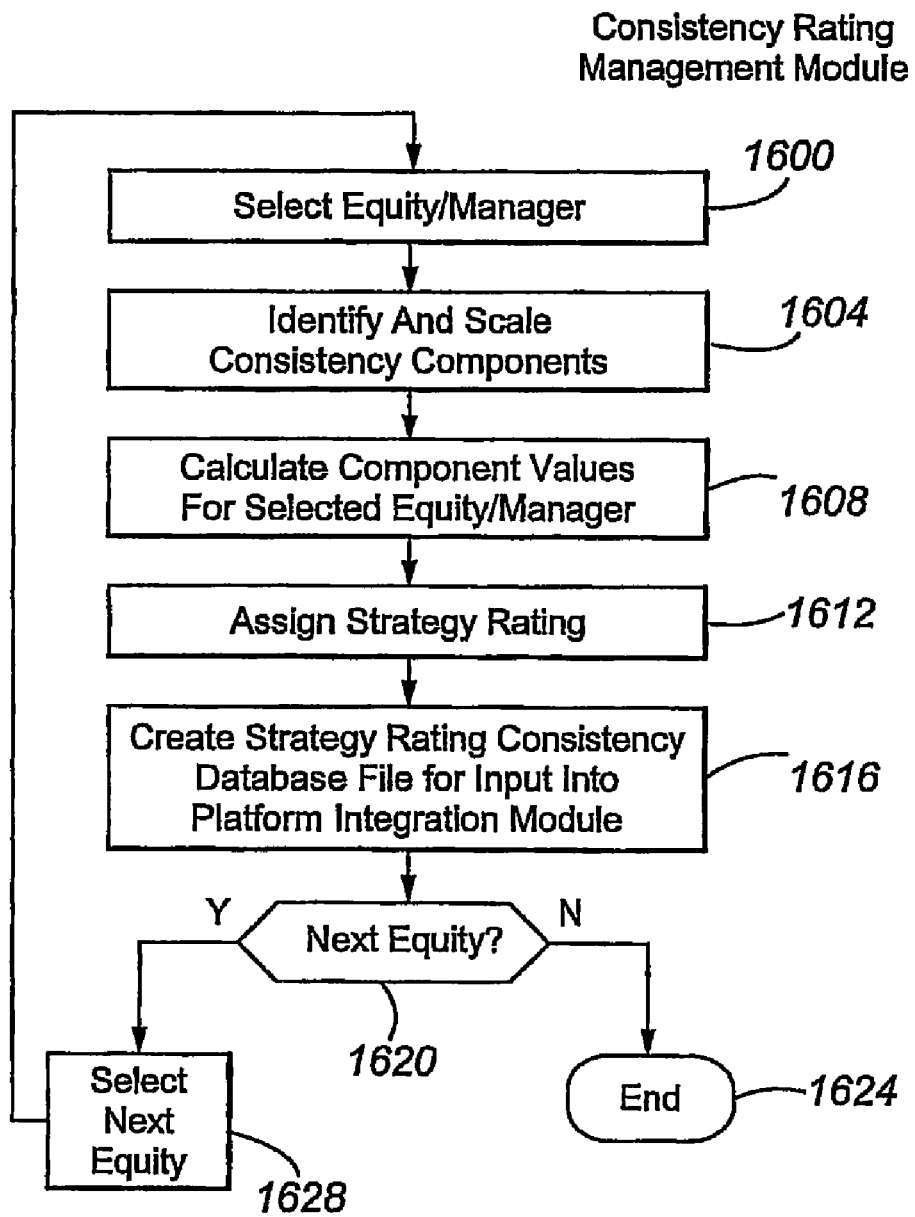
FIG. 16 is a flowchart according to an embodiment.

Referring now to FIG. 16, the strategy consistency module 380 selects an security/manager in box 1600.

In box 1604, the module 380 identifies and scales consistency components and, in box 1608, calculates component values for the selected security/manager. As noted, the consistency components include (a) a correlation of selected security returns with strategy investment index returns, (b) a correlation of selected security returns with characteristic indices, (c) a computation of quantitative portfolio characteristics identified as being associated with the particular investment strategy; and (d) information received from the selected manager(s).

In box 1612, the module 380, based on the components, assigns a strategy category.

In box 1616, the module 380 creates a strategy rating consistency database file for input into the computer platform integration module 384.

In decision diamond 1620, the module 380 determines if there is a next security/manager. If not, the module terminates in oval 1624. If so, the module, in box 1528, selects the next security/manager and returns to and repeats box 1600.

Figure 17:
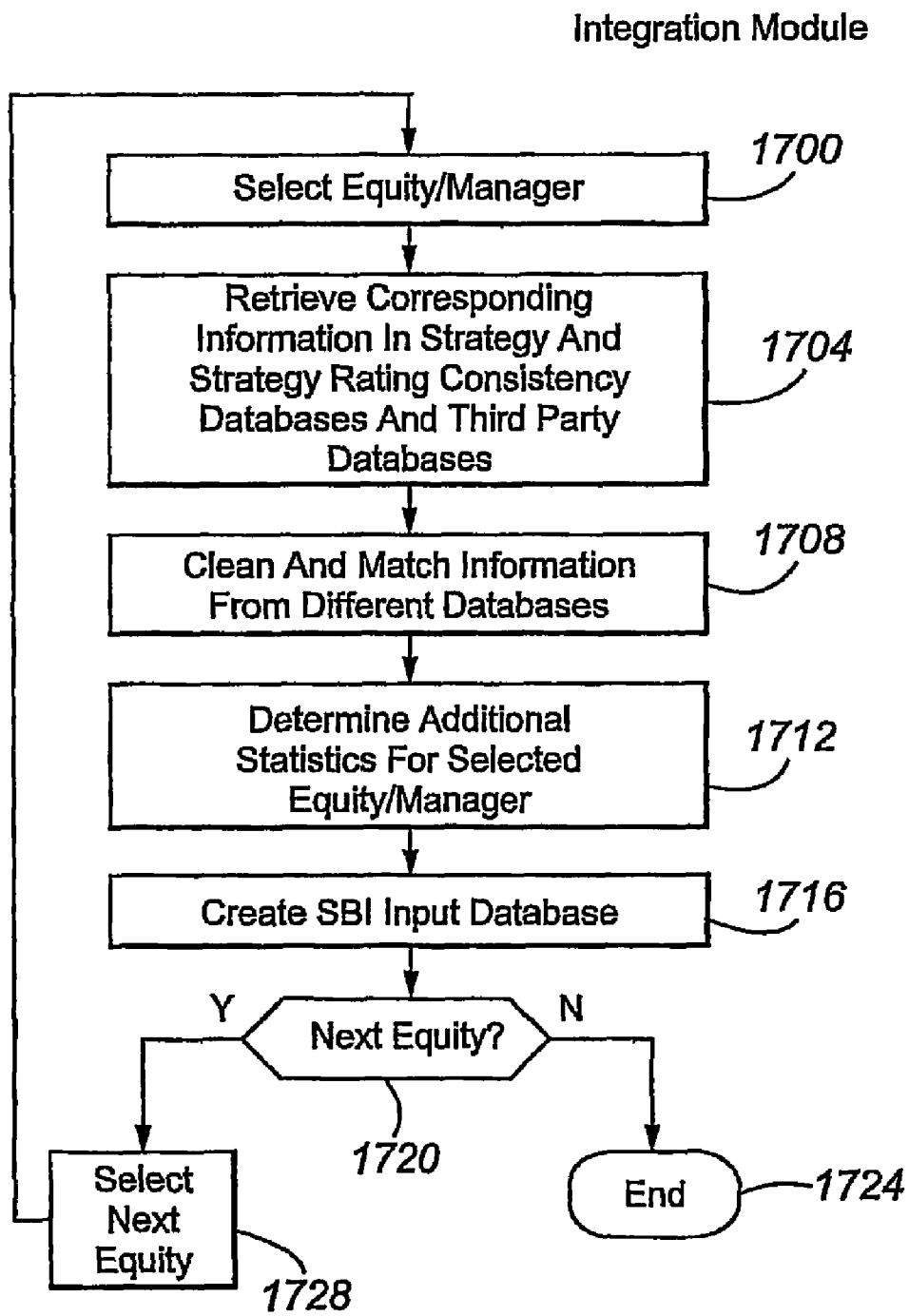
FIG. 17 is a flowchart according to an embodiment.

Referring to FIG. 17, the operation of the computer platform integration module 384 will now be discussed.

In box 1700, the module 384 selects a security/manager.

In box 1704, the module 384 retrieves, for the selected security/manager, corresponding records in the strategy and strategy rating consistency databases 348 and 352 and the first, second, . . . nth databases 316a-n.

In box 1708, the module 384 cleans and matches information in the retrieved records. As will be appreciated, the data records can have differing formats, syntax, grammars, and/or be expressed in differing languages. The module 384 converts the data records into a common form of expression.

In box 1712, the module 384 determines, from the information, additional statistics for the selected security/manager.

In box 1716, the module 384 creates a record in the SBI input database 356.

In box 1720, the module 384 determines whether there is a next security/manager to be processed. If not, the module 384 terminates operation in oval 1724. If so, the module 384 selects the next security/manager in box 1728 and returns to and repeats box 1700.

Figure 18:
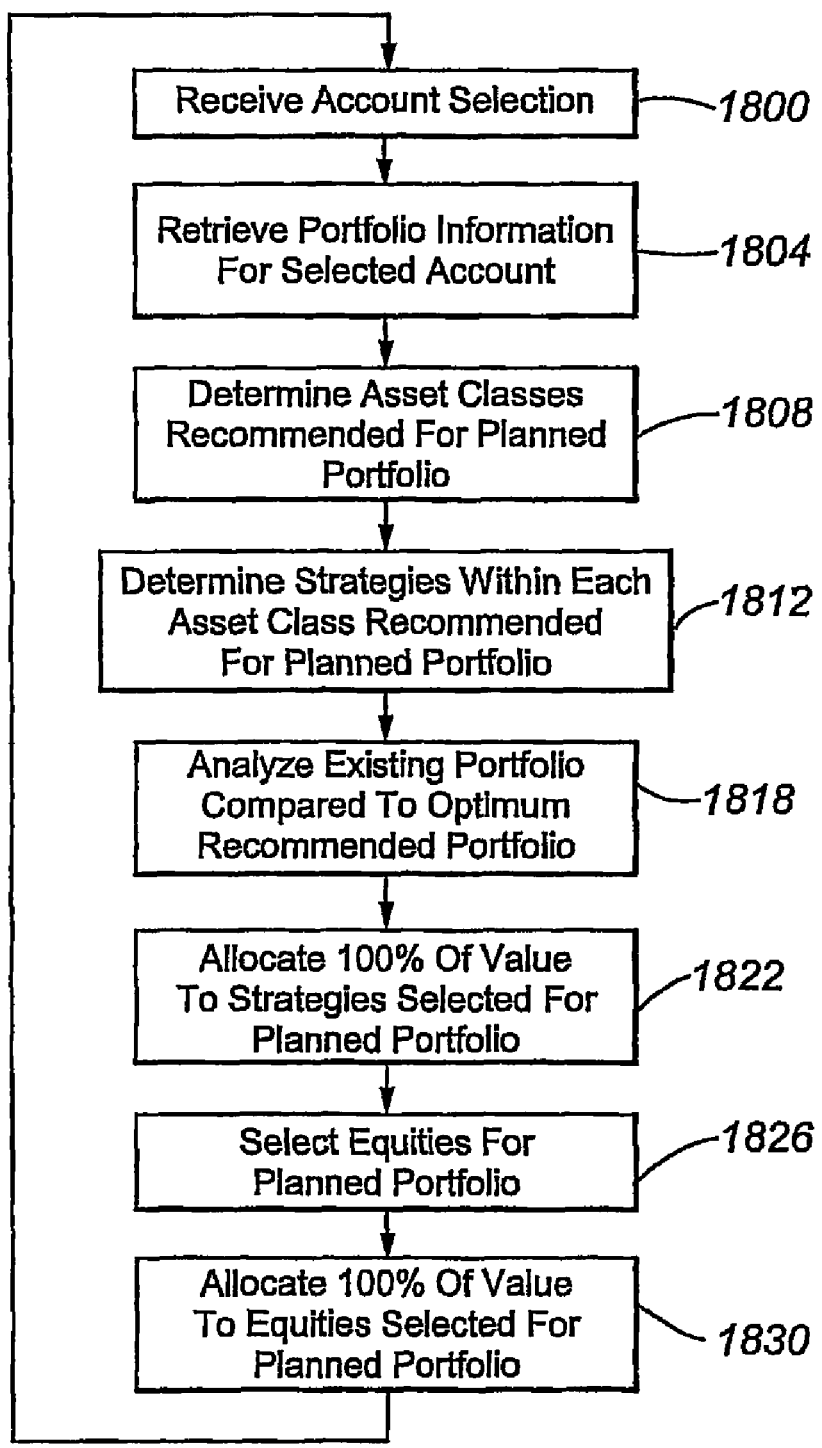
FIG. 18 is a flowchart according to an embodiment.

The overall operation of the SBI system 300 will now be discussed with reference to FIG. 18.

In box 1800, the SBI system 300 receives, from a subscriber, an account selection. The account can be the actual number or a sub-component of the account, such as information associated with a current portfolio or portion thereof. This operation may be performed by accessing an existing account, creating a new account, or importing an account into the SBI system 300. User interfaces useful in this operation include FIG. 10. The output of this operation includes the current portfolio information.

In box 1804, the SBI system 300 retrieves portfolio information for the selected account.

In box 1808, the system 300 determines an asset class or type recommended for the portfolio. The subscriber provides an asset class alpha (or relative return) and an anchor asset class (e.g., cash equivalents, US fixed income, US equity, international equity, venture capital, commercial real estate, residential real estate, energy, and precious metals), and a beta or risk value from the risk setting icon. User interfaces supported in this operation include FIGS. 2, 4, 5, 8, 9, 11, 13, and 14. Outputs of this operation include recommended asset classes and asset class allocations percentages or weightings.

In box 1812, the SBI system 300 determines the investment strategies within each asset class recommended for the portfolio. Inputs for this operation include the investment strategy alpha (or relative return), anchor investment strategy, and beta value. Features supporting this operation include limiting security selection by a preconfigured security list, limiting security selection by selected subscriber security searches, and preselected screening or filtering criteria. Outputs of this operation include recommended investment strategies and allocation percentages.

In box 1818, the SBI system 300 analyzes the portfolio information compared to the optimum, recommended, or target portfolio. Inputs for this operation include recommended investment strategies and allocation percentages and the (current) portfolio information. Outputs of this operation include portfolio attribution, portfolio hypothetical performance, and portfolio comparison.

In box 1822, the system 300 allocates one hundred percent of the account value to strategies selected for the planned portfolio. Inputs for this operation include recommended investment strategies and allocation percentages. Outputs for this operation include selected strategies, allocation percentages, and portfolio attribution.

In box 1826, the system 300 selects securities for the planned portfolio. Inputs for this operation include subscriber selected strategies and allocation percentages. User interfaces for this operation include security/manager screening, quick results, and security/manager details. The "quick results" option permits the list of funds to be limited by a saved user list ("limit by list" sub-option), a selected named screen ("limit by named screen" sub-option), and top five securities per investment strategy with no filtering ("view" sub-option). Outputs for this operation include a selected security/manager.

In box 1830, the system 300 allocates one hundred percent of the account value to securities selected for the planned portfolio. Input for this operation includes selected securities managers. The output of this operation is the planned portfolio security/holdings and weightings. Report outputs of this operation include investment roadmap report, portfolio hypothetical performance, and portfolio comparison.

Figure 19:
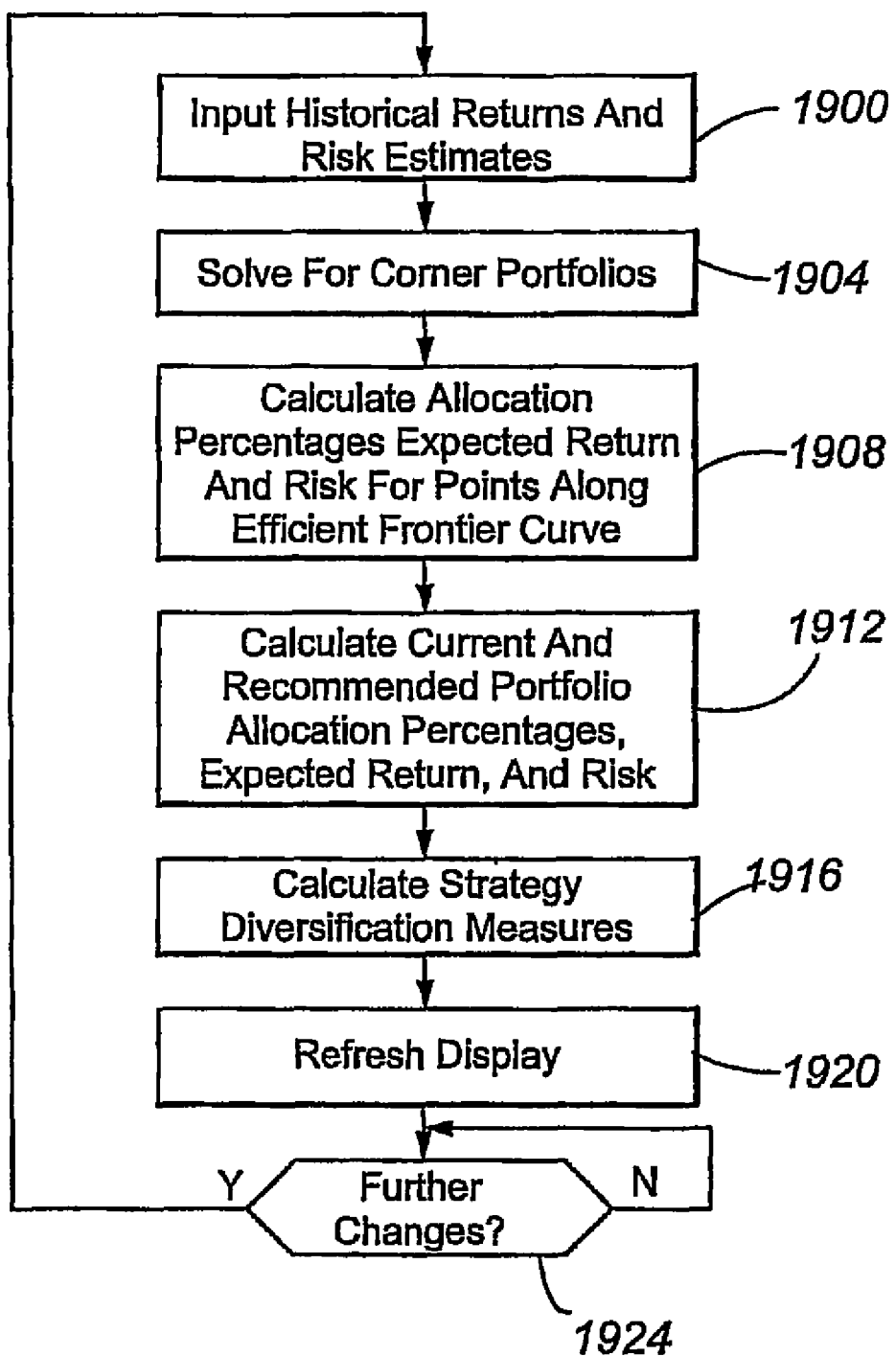
FIG. 19 is a flowchart according to an embodiment.

FIG. 19 depicts the algorithm used to configure the strategy frontier section 608, strategy diversification section 604, allocation percentages, by investment strategy, in the "what if" and target rows 624 and 628 of display 600 (FIG. 6).

In box 1900, for the inputted relative return and risk setting historical returns and risk estimates are obtained by the SBI system 300.

In box 1904, the system 300 solves for the corner portfolios using a suitable algorithm, such as the Elton & Grubber single index algorithm. As will be appreciated, the corner portfolios refer to those efficient frontier portfolios in which a new strategy enters and a current strategy exits.

In box 1908, the system 300 calculates the allocation percentages for each investment strategy, the expected return, and risk for points along the strategy frontier curve.

In box 1912, the system 300 calculates the allocation percentages for each investment strategy, the expected return, and risk for the current and "what if" or planned portfolios.

In box 1916, the system 300 calculates the strategy diversification measures to be displayed in the strategy diversification section 604.

In box 1920, the system 300 refreshes the display in accordance with the determined parameters. As noted, when changes have been to the "what if" portfolio the subscriber needs to select update charts for the changes to be displayed on the frontier section 608. Changes to the relative return or risk settings cause the frontier section automatically to be refreshed.

In decision diamond 1924, the system 300 determines whether further changes have been received from the subscriber. If not, the system, at a periodic interval, repeats decision diamond 1924. If so, the system 300 returns to and repeats box 1900.

Using the primary and secondary investment strategies and SBI peer groups, a variety of differing types of analysis and comparisons may be effected.

In a first example, investment strategy indices are created; that is, within each investment strategy an index, using a suitable weighting basis such as price or market value, is created. The resulting indices will be based on the funds/managers pursuing the specified strategy and can be created using fund returns as a whole or individual fund holdings returns. Multiple indices for each strategy will be created based on different levels of strategy consistency. By way of illustration, a competitive position index, a future growth index, and the like are created for an SBI peer group. The investment strategy index, in one technique, is done by combining the returns of the managers pursuing the selected investment strategy, or the members of the SBI peer group corresponding to the selected investment strategy, to yield a weighted index. The returns may be for the managed assets or, when the managed assets are funds, for the individual holdings in each fund.

In a second example, a market "shelf space" module will be created that allows asset managers to analyze the current market wide fund offerings, as shown in the example of FIG. 20. The shelf space is organized by primary (vertical axis) and secondary (horizontal axis) strategies and can be sorted and displayed using many different fund measures, such as return profile 612, risk measure, and money flows. In the example of FIG. 20, the investment strategies are sorted from highest to lowest by three year risk adjusted returns and the display is the number of funds in each primary and secondary strategy combination.

In a third example, a return attribution module is created. This can allow for attribution of a fund's return performance based on the primary and secondary investment strategies being pursued, as well as the specific elements the manager does and does not focus on. This is different from the current approach of attributing returns to the characteristics (e.g. market cap, PE, sector, industry, etc) of the assets being held by the manager. An example of investment strategy return attribution is shown in FIG. 21. The fund return, 14.25%, is analyzed to determine the various contributors to the return. The universe return, 10.25%, is the average or weighted return for the SBI peer group for the primary investment strategy. The valuation index alpha is 1.23%. Subtracting the universe return and valuation index alpha from the fund's return yields the fund alpha of 2.77%. The contribution from each element associated with the selected fund is then determined. The element 1 return is 0.35% and element 2 return 0.76%. Subtracting these returns from the fund alpha yields an unexplained alpha of 1.13%. Unlike characteristic box approaches, this type of return attribution permits a selected fund's returns to be tracked relative to the other funds in the SBI peer group.

In a fourth example, a strategy consistency measure is created. This measure is commonly based on the holdings of a selected fund as compared to the average holdings of the other funds pursuing the primary or secondary investment strategy associated with the selected fund. This will provide an objective time-series measure of how consistently a manager is pursuing the fund's primary strategy. Investors and others will use this measure to detect strategy drift and the impact of hiring a new fund manager on strategy, among other things. As will be appreciated, the strategy consistency measure, which is an indication of how closely the selected fund or manager thereof follows the migration of the associated own strategy stock cluster. It has been observed, as a general rule, that the more closely an investor follows the own strategy cluster, the better the investor's performance.

In a fifth example, assets are categorized by the investment strategies of the managers that manage them.

In another embodiment, the memory 340 of the server 336 includes a strategy categorizing module 386. The strategy categorizing module 386 strategy categorizes the investments of managers and/or equity funds. In one configuration, the strategy categorizing module categorizes investments across the managers and/or funds within a strategy based on the top investments. For example, the top stocks held by competitive position ("CP") funds are categorized as CP stocks. The primary advantage of this approach is that the collective investment skill of strategy managers is normally associated with a specific set of investments. For example, CP managers look for stocks of high quality companies that have a strong management team, a defensible market position, are innovative, and are able to adapt to changing market conditions. Thus, CP stocks are those judged by CP fund managers as best at meeting these criteria. This process provides a unique insight into a strategy's investment process as well as a view into how a strategy's favorite investments change over time. Specifically, strategy categorizing stocks makes possible new individual stock investment products as well as a range of fund analytic tools, ranging from strategy profile comparisons to strategy consistency measures to strategy based performance attribution. Although the following discussion is made with reference to equities such as stocks, it is to be appreciated that the various embodiments herein apply to other investment types and classes, such as bonds, commodities, real estate, and the like.

Traditionally, active equity funds are categorized by the stocks they hold. For example, a fund, under the Morningstar™ categories, is categorized as small-cap value based on the fact it holds small-cap, low Price Earnings (PE) stocks. The strategy categorizing module 386 takes the opposite approach, categorizing investments, such as stocks, by the managers and/or funds that hold them. The strategy manager's investment skill is associated with the investments being held, thereby permitting one to discern the strategy manager's top investment picks. For example, CP categorized stocks are those that CP managers have collectively decided meet the CP criteria above.

This approach is superior to the traditional approach. The traditional approach is based on the supposition that managers pursuing the same strategy hold stocks with the same market-cap, PE characteristics. This supposition is not supported by the evidence. Strategy categorizing stocks provides further evidence that the traditional approach is inconsistent with the data. Strategy categorizing stocks can open up the possibility of individual equity portfolios that take advantage of strategy manager skill and makes possible a range of strategy based fund analytical tools.

Stocks are strategy categorized based on the portfolio weights (i.e. a stock weight of 0.032 means that 3.2% of the fund's portfolio is invested in the stock) within a strategy relative to the stock's holdings in other strategies. Each stock's weights (weights are used rather than dollar holdings to neutralize the effect of fund size) are summed across funds within each strategy to yield the stock's strategy weight for each strategy. Each stock's strategy weights are represented in percent. The weight sums are then scaled, or normalized, to add to 1.00 within each strategy, which means that the resulting scaled weights represent the average across fund stock weight within that strategy. As will be appreciated, other scaling systems may be employed. The rescaling produces the stock's "strategy profile." This rescaling neutralizes the effect of the varying number of funds across strategies. Finally, the stock is strategy categorized based on the largest percentage within its strategy profile.

Three stock strategy profiles are presented in Table 1 below. These strategy profiles are based on the relative importance of each stock within each strategy. For example, the strategy profile of Acuity Brands, Inc.™ is comprised 36.3% of opportunity strategy and 24.9% of valuation strategy, along with other less important strategies. Acuity Brands, Inc.™ is strategy categorized as "opportunity", since it represents the largest percentage in the strategy profile. As will be appreciated, each stock or other investment is deemed to have only one strategy. This, however, does not mean 36.3% of the dollars invested in Acuity Brands, Inc.™ come from opportunity funds, while 24.9% come from valuation funds. In fact, valuation funds had $91.7 million invested in Acuity Brands, Inc.™ in October 2007, while opportunity funds had only $4.0 million invested, because there are many more valuation funds than opportunity funds and the average valuation fund is larger than the average opportunity fund. Acuity Brands, Inc.™ is relatively more important to opportunity funds than to valuation funds and so it is categorized as an opportunity stock. The strategy profile and the resulting strategy categorization attempt to capture the relative bets placed by the different strategies in a stock. The supposition is that the higher is the stock's relative importance within a strategy, the more convincing is the investment case for the stock. This is a way to capture valuable information regarding the analytic conclusions and subsequent decisions made by strategy managers.

Creating investable stock based strategy indices (discussed below).

In combination with a stock's Diamond Rating$^{SM}$ category, calculating a stock's AlphaIQ (discussed below). Calculating a fund's AlphaIQ using stock holdings and the corresponding stock AlphaIQ (discussed below).

Creating and managing AlphaIQ stock portfolios (discussed below).

Calculating a fund's strategy profile using stock holdings and corresponding stock strategy (discussed below).

Comparing a fund's strategy profile to the strategy's average profile (discussed below). Creating a measure of strategy consistency (discussed below).

Figure 22B:
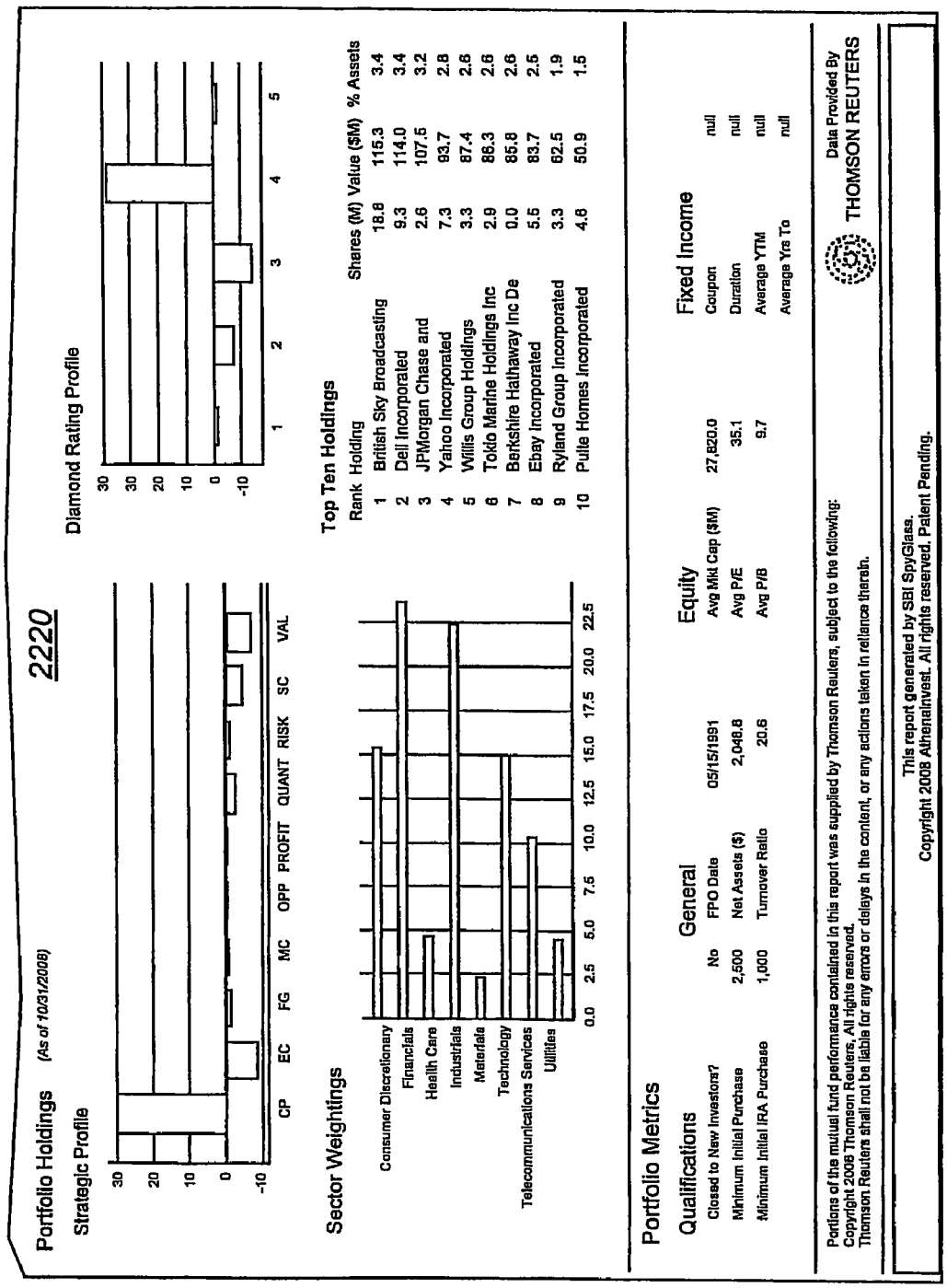
Figure 23A:
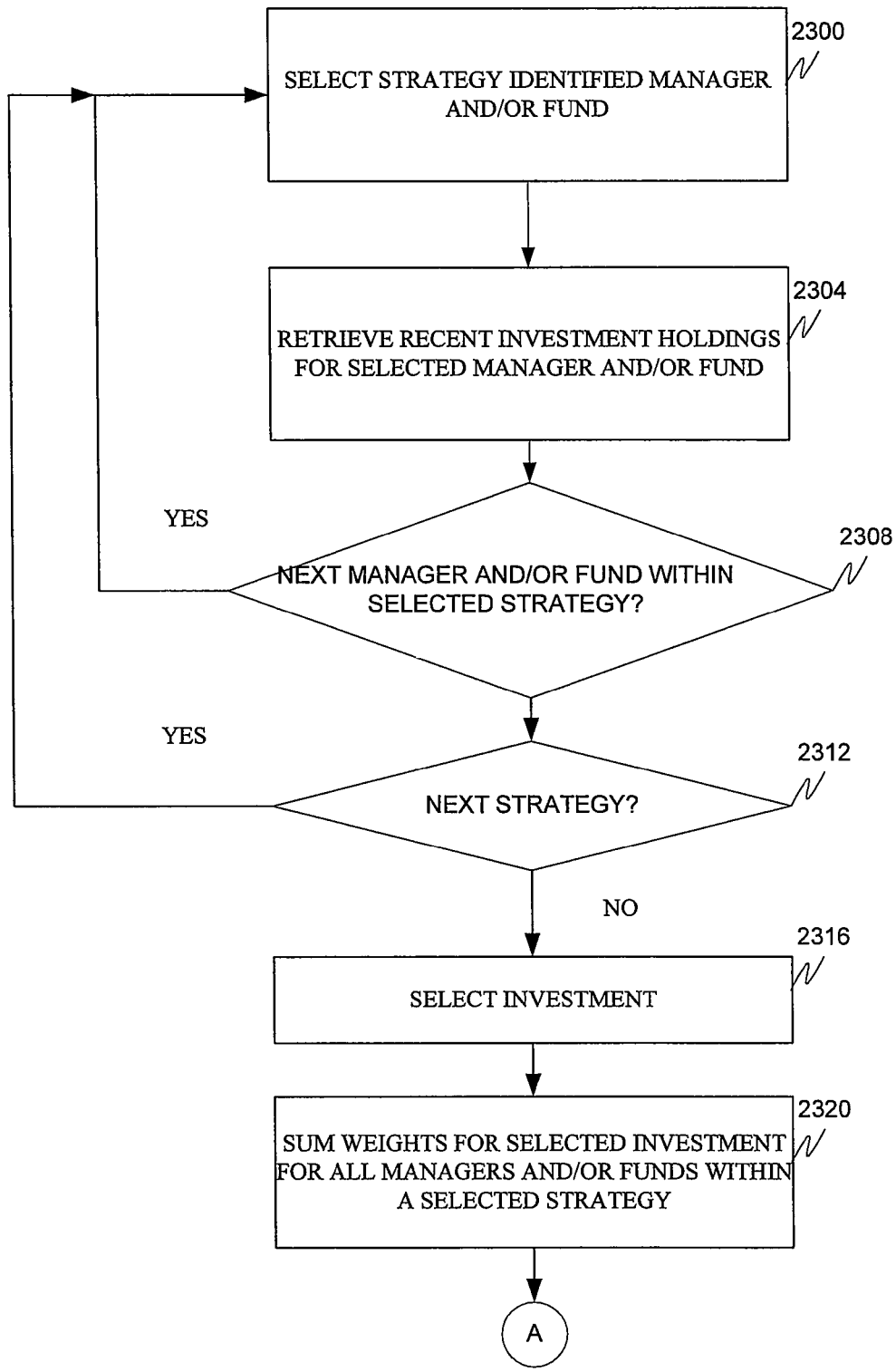
FIGS. 23A and B are collectively a flowchart according to an embodiment.
Figure 23B:
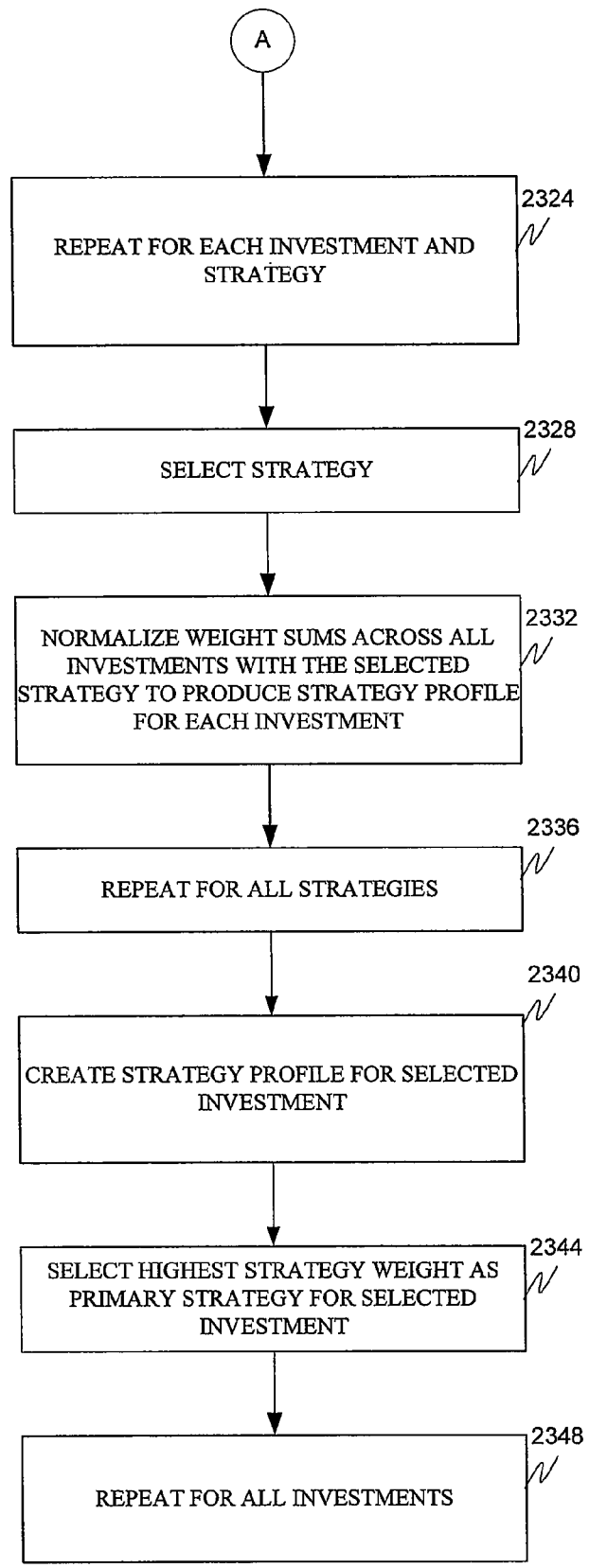

Referring to FIGS. 22A-B, the operation of the strategy categorizing module 386 will now be discussed.

In box 2300, the strategy categorizing module 386 selects a strategy identified manager and/or fund to be analyzed.

In box 2304, the module 386 retrieves, from any one of the strategy, strategy rating consistency, and SBI input databases 348, 352, and 356, recent investment holdings for the selected manager and/or fund. The holdings include weighting values for each investment managed by the selected manager or held by the selected fund, as appropriate.

In decision diamond 2308, the module 386 determines whether there is a next manager and/or fund within the selected strategy. If so, the module 386 returns to and repeats the foregoing steps. If not, the module 386 proceeds to decision diamond 2312.

In decision diamond 2312, the module 386 determines whether there is a next strategy. If so, the module 386 returns to and repeats the foregoing steps. If not, the module 386 proceeds to box 2316 Through the above steps, investments are assembled for all managers and/or funds over all strategies.

In box 2320, the module 386 sums the portfolio weights of the selected investment for all managers and/or funds within a selected strategy. In other words, if a selected investment (e.g., stock) has a first weight in a first portfolio of a first manager and/or fund and a second weight in a second portfolio of a second manager and/or fund and if the first manager and/or fund and second manager and/or fund follow a com-

TABLE 1

Stock Strategy Profiles as of October 2007

| Stock | Strategy | CP | EC | FG | MC | Opp | Prof | Quant | Risk | SC | Val |
|---|---|---|---|---|---|---|---|---|---|---|---|
| Acuity Brands Inc | Opportunity | 17.3% | 0.0% | 7.4% | 0.0% | 36.3% | 0.0% | 14.1% | 0.0% | 0.0% | 24.9% |
| Cameron International Corp | Economic Conditions | 12.4% | 70.2% | 11.1% | 0.0% | 0.0% | 0.0% | 0.0% | 0.0% | 0.0% | 6.2% |
| Pepsico Inc | Social Considerations | 13.8% | 6.0% | 16.7% | 11.5% | 5.2% | 14.2% | 10.4% | 0.0% | 20.7% | 1.5% |

Strategy Profiles determined as described above. Competitive Position (CP), Economic Conditions (EC), Future Growth (FG), Market Conditions (MC), Opportunity (Opp), Profitability (Prof), Quantitative (Quant), Risk (Risk), Social Considerations (SC), and Valuation (Val).

Stocks can move from strategy to strategy as a function of time. For example, during a first time period a first stock can be a competitive position strategy stock and during a second different time the first stock can become a future growth stock. Managers, in pursuing a particular strategy, find a changing mix of stocks attractive over time. As another indication of how managers alter their stock preferences over time, roughly 67% of the stocks are categorized in two or more strategies during the sample period, with the average stock categorized in three different strategies.

Strategy categorizing stocks allows for the creation of stock portfolios which take advantage of fund manager skill and makes possible a number of fund analytical tools. Some of these possibilities include:

mon primary selected strategy, the module 386 would sum the first and second weights to produce a total weight for the primary selected strategy.

Box 2324 causes steps 2316 and 2320 to be repeated for each investment and strategy. At this point in the analysis, the module 386 has produced, for each investment, strategy weight totals for each strategy holding that investment.

In box 2328, a strategy is selected, and, in box 2332, for each of the investments held by the managers and/or funds following the selected strategy the cumulative weight is scaled so that the cumulative weights of all investments held by managers and/or funds following the selected strategy sum to selected value, which is typically 1.00 or 100%. As will be appreciated, other scaling systems may be employed. The result of this step is an adjusted, or resealed, cumulative strategy weight for each investment held by managers and/or funds following the selected strategy.

In box 2336, the module 386 repeats box 2328 for all strategies.

Figure 24:
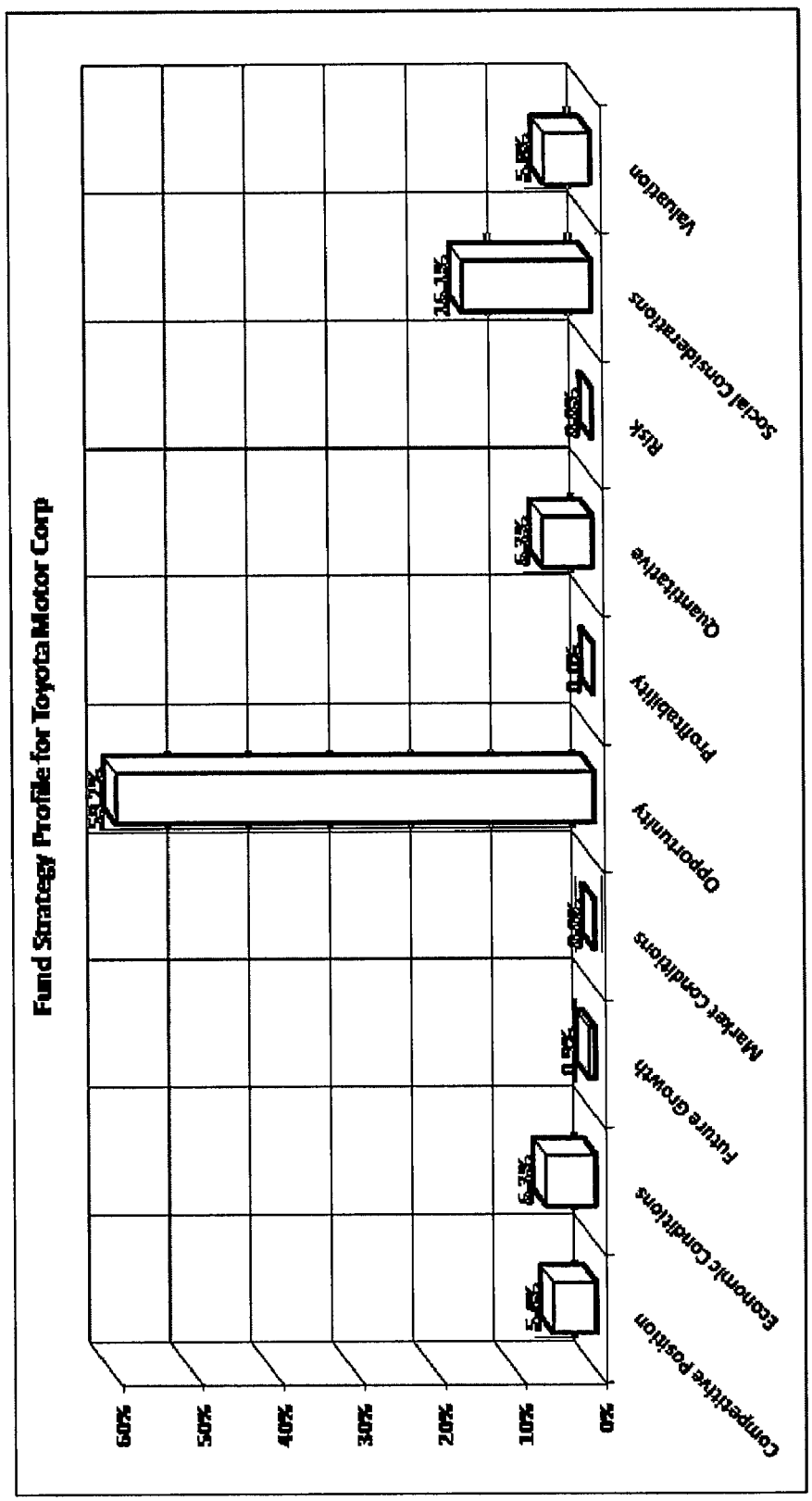
FIG. 24 is a graph plotting portfolio holding (percent) by strategy.

In box 2340, the module 386 creates a strategy profile for each selected investment. An example of the output of box 2340 is shown in FIG. 24 for the stock of Toyota Motor Corporation™. The vertical axis is rescaled cumulative strategy weight (%) and the horizontal axis represents the strategy of the various managers and funds holding the stock. As can be seen from FIG. 24, the sum of all of the percentages is 100%.

In box 2344, the module 386 selects the highest strategy weight as the primary strategy for the selected investment. As noted, each investment is, at any point in time, deemed to follow only one strategy. As manager and/or fund holdings change temporally, the primary strategy for a given investment can also change.

In box 2348, box 2340 is repeated for all investments.

This stock strategy categorization procedure was applied on a monthly basis from January 1997 through September 2008 to all strategy identified active US equity mutual funds with less than $1b in assets under management. Larger funds were excluded because studies have shown that performance declines with fund size and the additional stocks selected by larger funds may be driven more by diversification considerations rather than by strongly held investment beliefs. The application of this procedure resulted in 397,364 stock/month strategy categorizations, an average of 2,818 stocks per month. Table 2 below provides summary statistics for this sample.

TABLE 2

Stock Strategy Categorization Statistics

| Strategy | % of Funds | % of Stocks | Months in Strategy | |
|---|---|---|---|---|
| | | | Average | Maximum |
| Competitive Position | 35.0% | 30.1% | 20 | 134 |
| Economic Conditions | 3.0% | 6.0% | 11 | 133 |
| Future Growth | 23.4% | 16.4% | 18 | 129 |
| Market Conditions | 0.7% | 2.6% | 8 | 93 |
| Opportunity | 1.9% | 4.0% | 12 | 97 |
| Profitability | 2.4% | 3.5% | 11 | 110 |
| Quantitative | 3.6% | 8.1% | 16 | 136 |
| Risk | 0.6% | 1.7% | 11 | 110 |
| Social Considerations | 1.8% | 3.0% | 13 | 98 |
| Valuation | 27.5% | 24.6% | 28 | 136 |
| Average | | | 15 | 118 |

In another embodiment, the memory 340 of the server 336 includes a consistency measure module 390. The consistency measure module 390 measures strategy consistency. This measure is based on the notion that fund managers, who manage equity portfolios over varying economic and market conditions, develop specialized investment management skills. These specialized skills yield the best results when applied to the strategy stocks in which the manager's peer group specializes; that is, a competitive position manager is most successful when analyzing, buying, and selling competitive position stocks. Based on this notion, strategy consistency is generally measured as the percent of primary strategy stocks (or own strategy stocks) held by the manager and/or fund (i.e., competitive position stocks as the percent of all stocks held). Indeed, based on monthly January 1997 through June 2009 empirical tests, the higher is the percentage of strategy stocks, the higher is a fund's return within the strategy peer group. So strategy consistency is a feature of how a manager goes about identifying best ideas.

Figure 25:
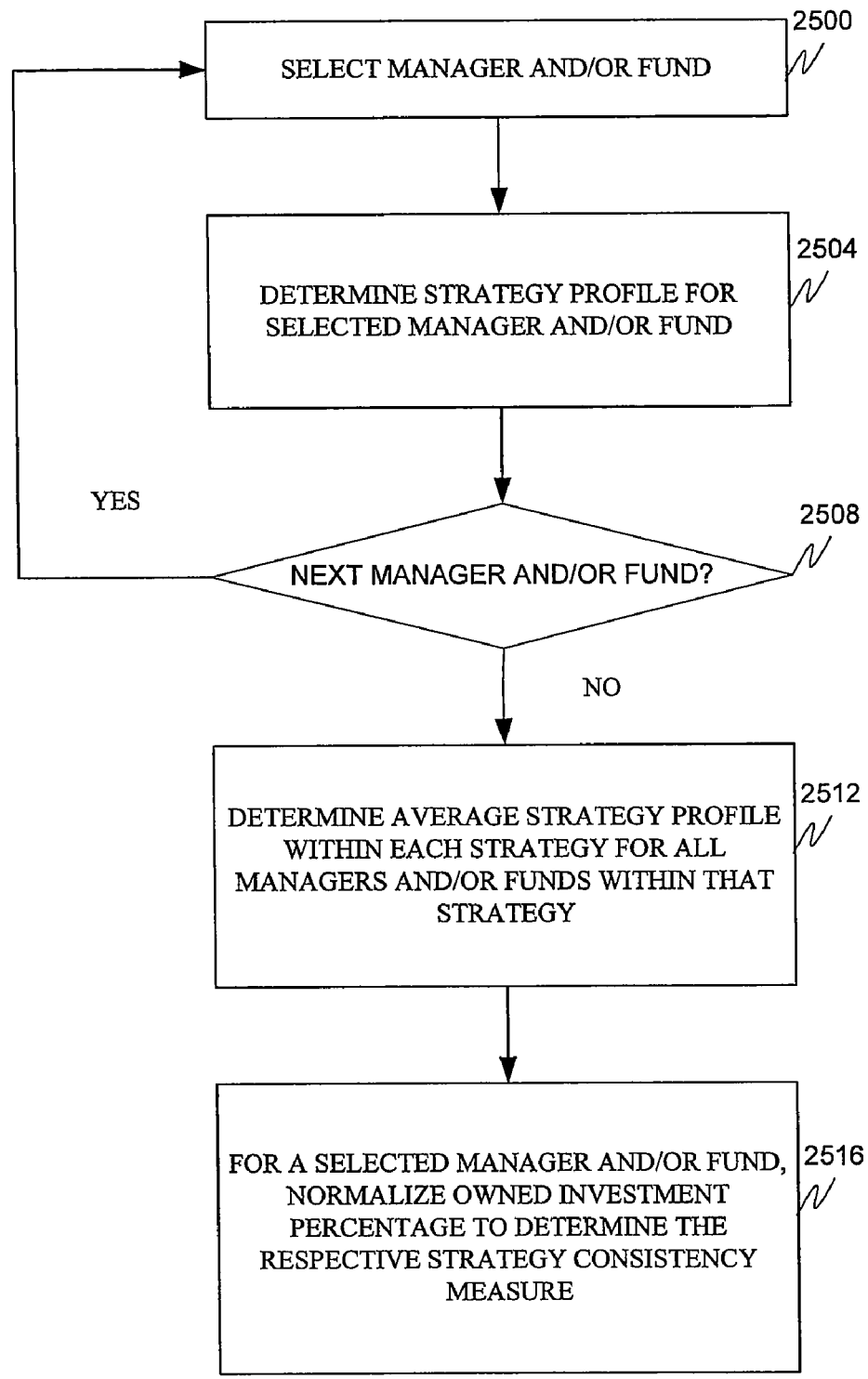
FIG. 25 is a flowchart according to an embodiment.

Referring to FIG. 25, an operation of the consistency measure module 390 will be discussed.

Figure 26:
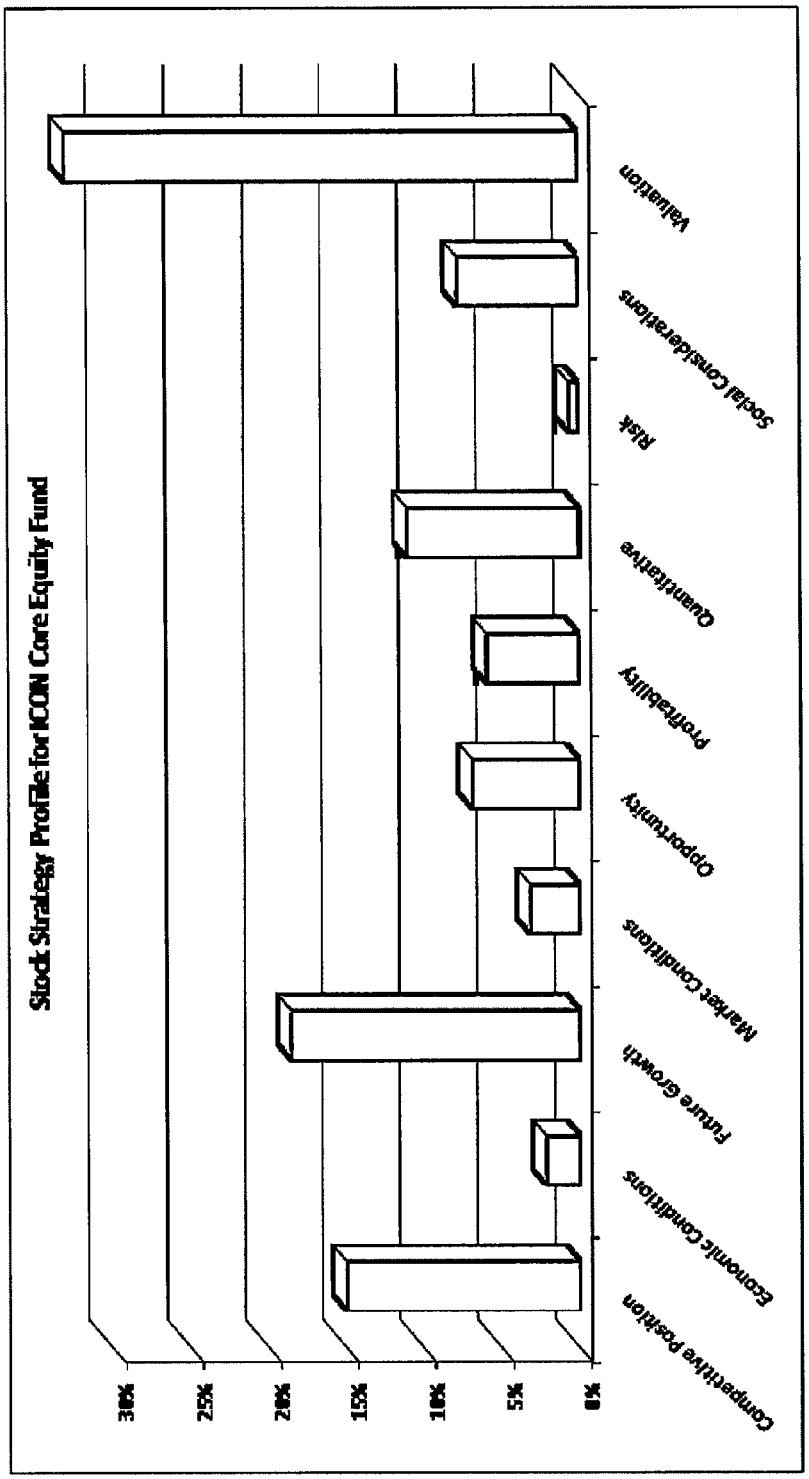
FIG. 26 is a graph plotting portfolio holding (percent) by strategy.

In box 2500, the module 390 selects a manager and/or fund and, in box 2504, determines, from any one of the strategy, strategy rating consistency, and SBI input databases 348, 352, and 356, the strategy profile for the selected manager and/or fund. The strategy profile for a manager or fund provides, by strategy, the relative weights by strategy of stock holdings. In other words, for a selected manager and/or fund the cumulative portfolio weight is determined for stocks of a first strategy, the cumulative portfolio weight is determined for stocks of a second strategy, and so on until a cumulative portfolio weight has been assigned to each strategy. As an example shown in FIG. 26, a strategy profile for ICON Core Equity Fund™, a valuation fund, is a portfolio of 14% competitive position stocks, 2% economic conditions, 19% future growth, 3% market conditions, 6% opportunity, 5% profitability, 10% quantitative, 1% risk, 6% social considerations, and 34% valuation. Decision diamond 2508 ensures that boxes 2500 and 2504 are repeated for all managers and/or funds.

In box 2512, the module 390 determines the average strategy profile within each strategy for all managers and/or funds within that strategy. For all of the managers and/or funds having a common primary strategy, the cumulative weights, by strategy, of their strategy profiles are determined to determine an average portfolio weight for that holding. For example, first and second funds are the only funds having a common primary strategy. The first and second funds have 25% and 35% stock, respectively, in that strategy. An average of the two values is 30%. The standard deviation is further determined to provide the range of portfolio weights in the primary strategy. In the example, the standard deviation is ±5%.

Figure 27:
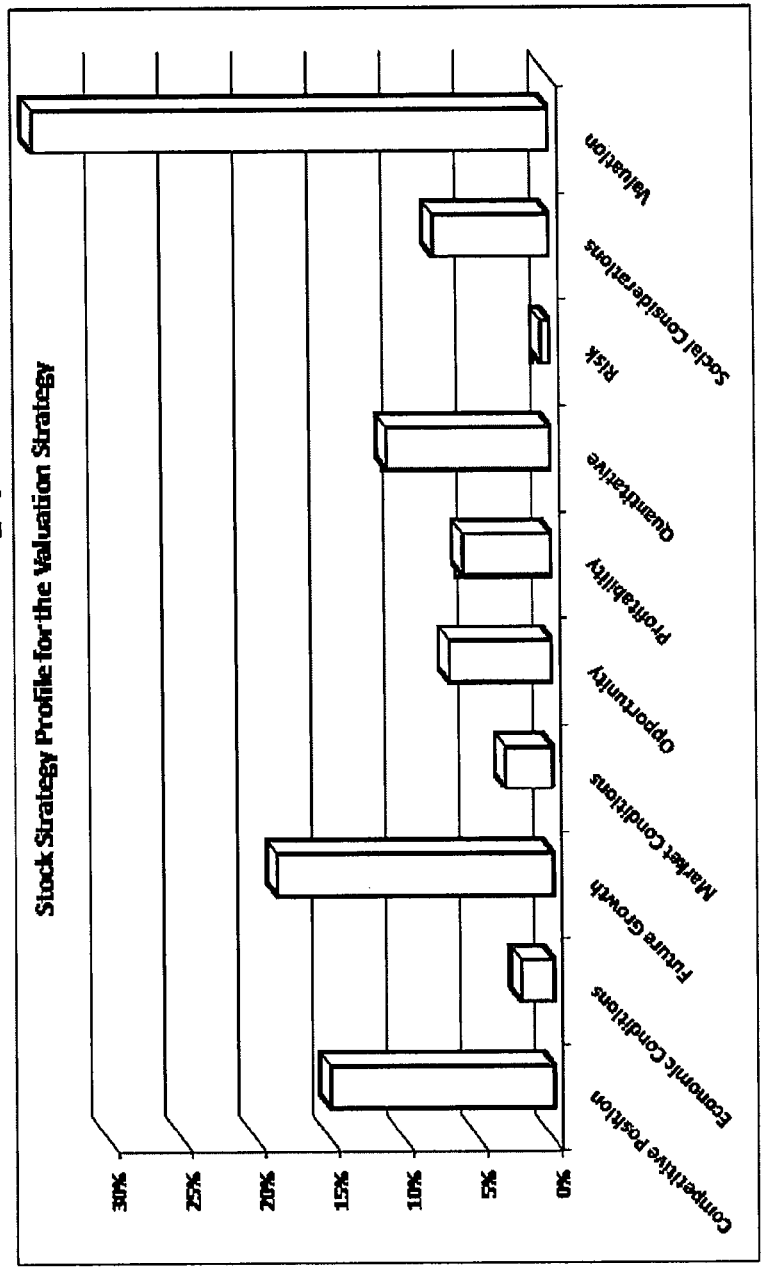
FIG. 27 is a graph plotting portfolio holding (percent) by strategy.
Figure 28A:
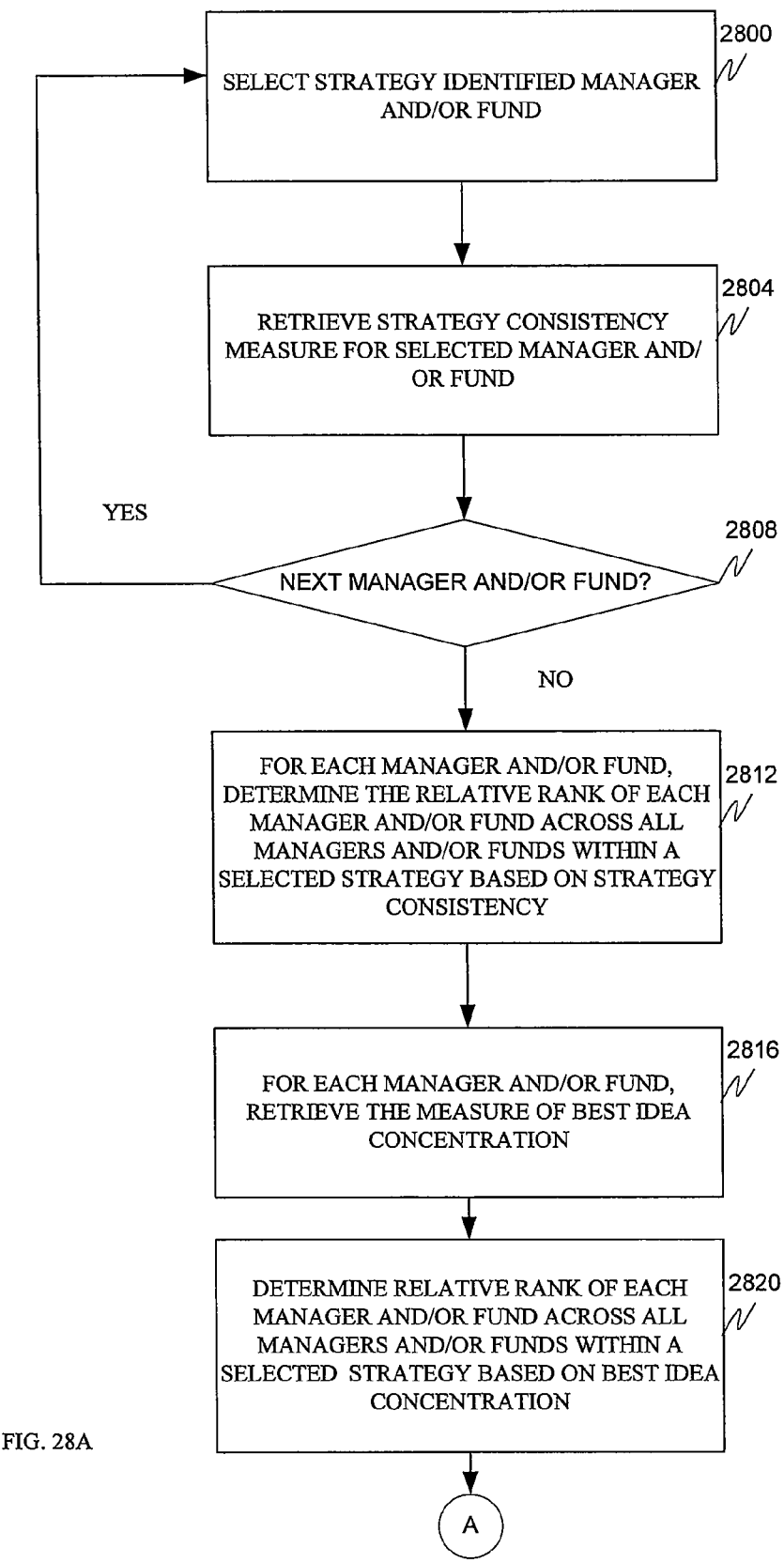
FIGS. 28A and B are collectively a flowchart according to an embodiment.
Figure 28B:
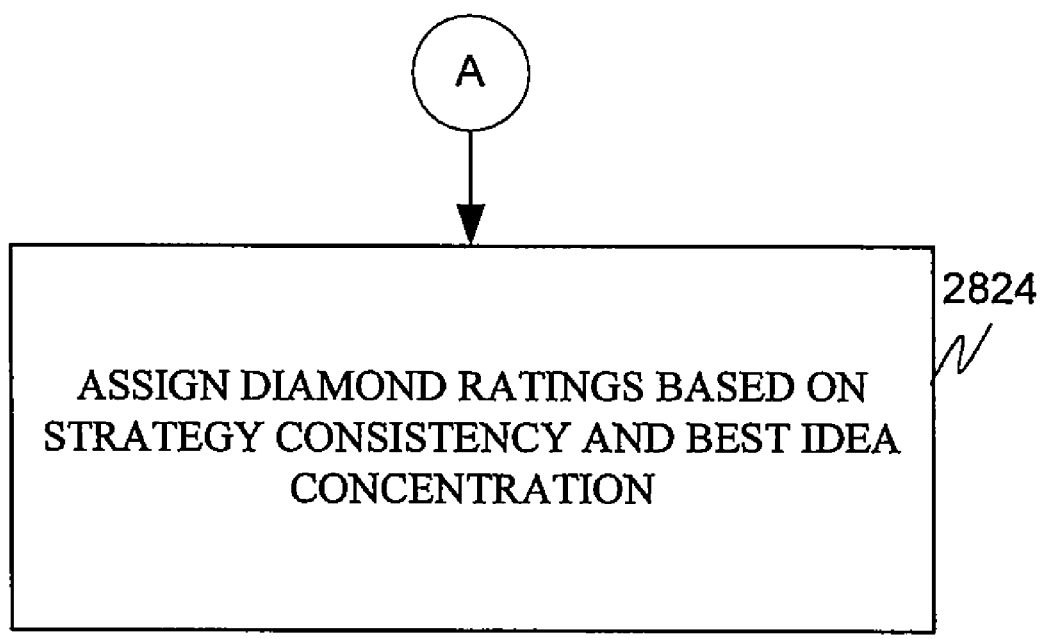

FIG. 27 illustrates an exemplary output of box 2512. As can be seen from FIG. 27, a strategy profile for an "average" fund in the valuation strategy has 14% competitive position stocks, 2% economic conditions stocks, 17% future growth stocks, 3% market conditions stocks, 6% opportunity stocks, 5% profitability stocks, 10% quantitative stocks, 1% risk stocks, 7% social considerations stocks, and, finally, 35% valuation stocks.

In box 2516, for a selected manager and/or fund the owned investment holding percentage in the primary strategy is normalized, or rescaled, to determine the respective strategy consistency measure. In other words, the portfolio holding within the primary strategy of the selected manager is adjusted or scaled relative to a scale in which the average primary strategy portfolio weight of the managers and/or funds within a common primary strategy plus the standard deviation is set at 1.00 or 100%. As will be appreciated, other scaling systems may be employed. In the example above, the average of the two values is 30%, which is adjusted to 35% by the standard deviation. The 35% is adjusted to 100%, causing the second fund to have a strategy consistency measure of 1.00 or 100% and the first fund of 0.715 or 71.5%.

Another embodiment depicts an alternative algorithm used by the performance analysis module 364 to determine the diamond ratings.

In box 2800, the performance analysis module 364 selects a strategy identified manager and/or fund. In box 2804, the module 364 retrieves, from any one of the strategy, strategy rating consistency, and SBI input databases 348, 352, and 356, the strategy consistency measure for the selected manager and/or fund. Decision diamond 2808 repeats boxes 2800 and 2804 until all managers and/or funds have been processed.

Figure 29:
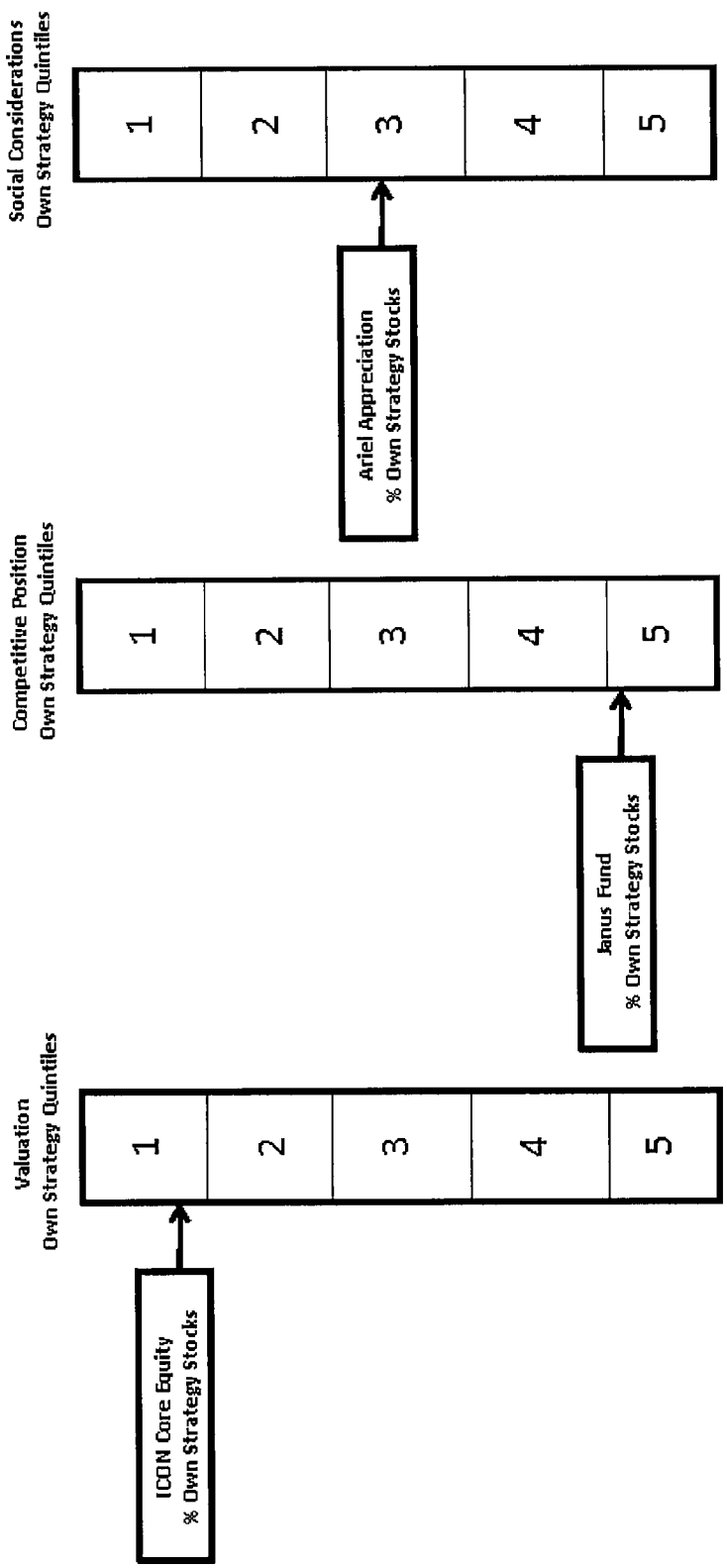
FIG. 29 depicts ranking according to an embodiment.

In box 2812, the module 364, for each manager and/or fund, determines the (preferably quintile) rank of each manager and/or fund relative to all other managers and/or funds within a selected strategy based on strategy consistency. This step may be performed by any ranking algorithm, with quintile ranking being preferred. FIG. 29 depicts an example of this process. Three funds in three different primary strategies are depicted, namely ICON Core Equity™ (a valuation strategy fund), Janus Fund™ (a competitive position fund), and Ariel Appreciation™ (a social consideration fund). Each of the funds is quintile ranked, based on its respective strategy consistency measure (or the percent of its own strategy stocks), within its strategy. ICON Core Equity™ is in the first quintile of valuation funds, Janus Fund™ is in the fifth quintile of competitive position funds, and Ariel Appreciation™ is in the third quintile of social consideration funds.

In box 2816, the module 364 retrieves, for each manager and/or fund, the respective measure of best idea concentration. Best idea concentration can be determined by any suitable measure. As and in addition to those mentioned above, nonlimiting examples include R squared, number of stocks in a portfolio, active share, tracking error, and combinations thereof.

Figure 30:
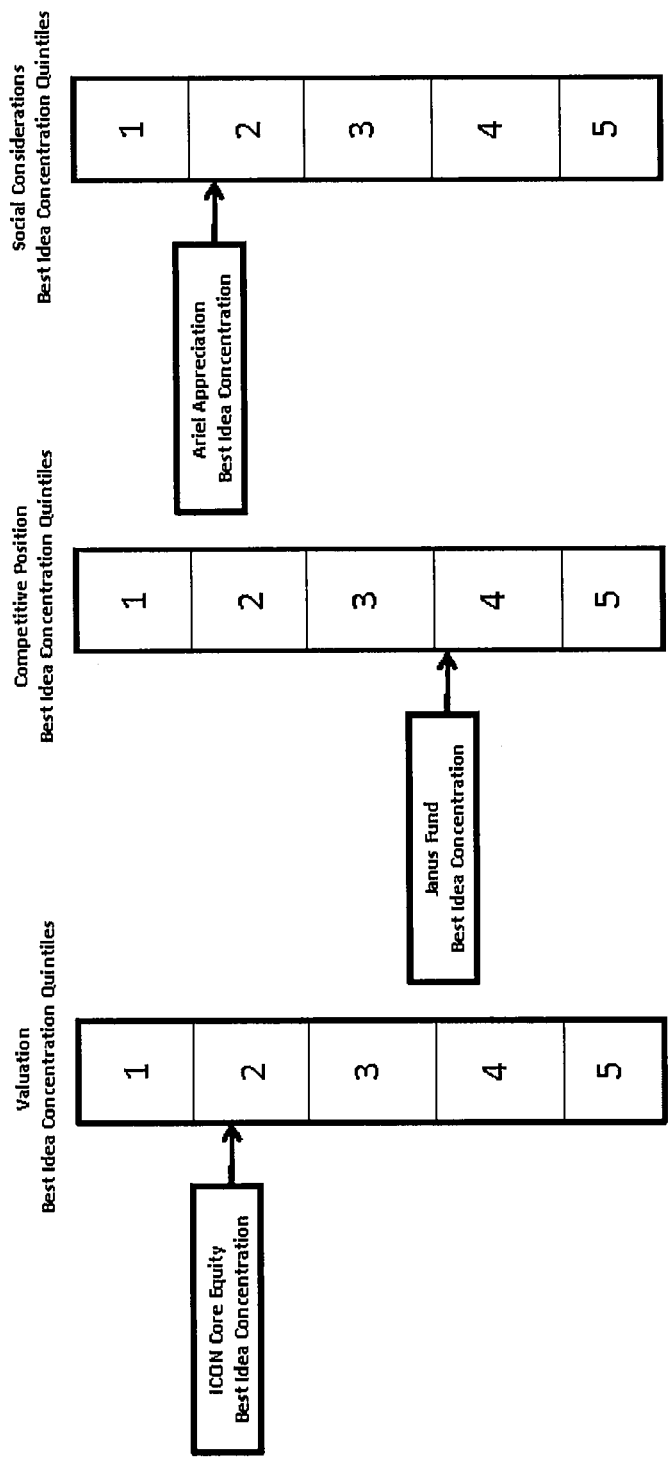
FIG. 30 depicts ranking according to an embodiment.

In box 2820, the module 364 determines, based on best idea concentration, the relative (preferably quintile) rank of each manager and/or fund across all managers and funds within a selected strategy. As noted, this step may be performed by any ranking algorithm, with quintile ranking being preferred. This process is illustrated in FIG. 30. Three funds in three different primary strategies are depicted, namely ICON Core Equity™, Janus Fund™, and Ariel Appreciation™. Each of the funds is quintile ranked, based on its respective best idea concentration, within its strategy. ICON Core Equity™ is in the second quintile of valuation funds, Janus Fund™ is in the fourth quintile of competitive position funds, and Ariel Appreciation™ is in the second quintile of social consideration funds.

Figure 31:
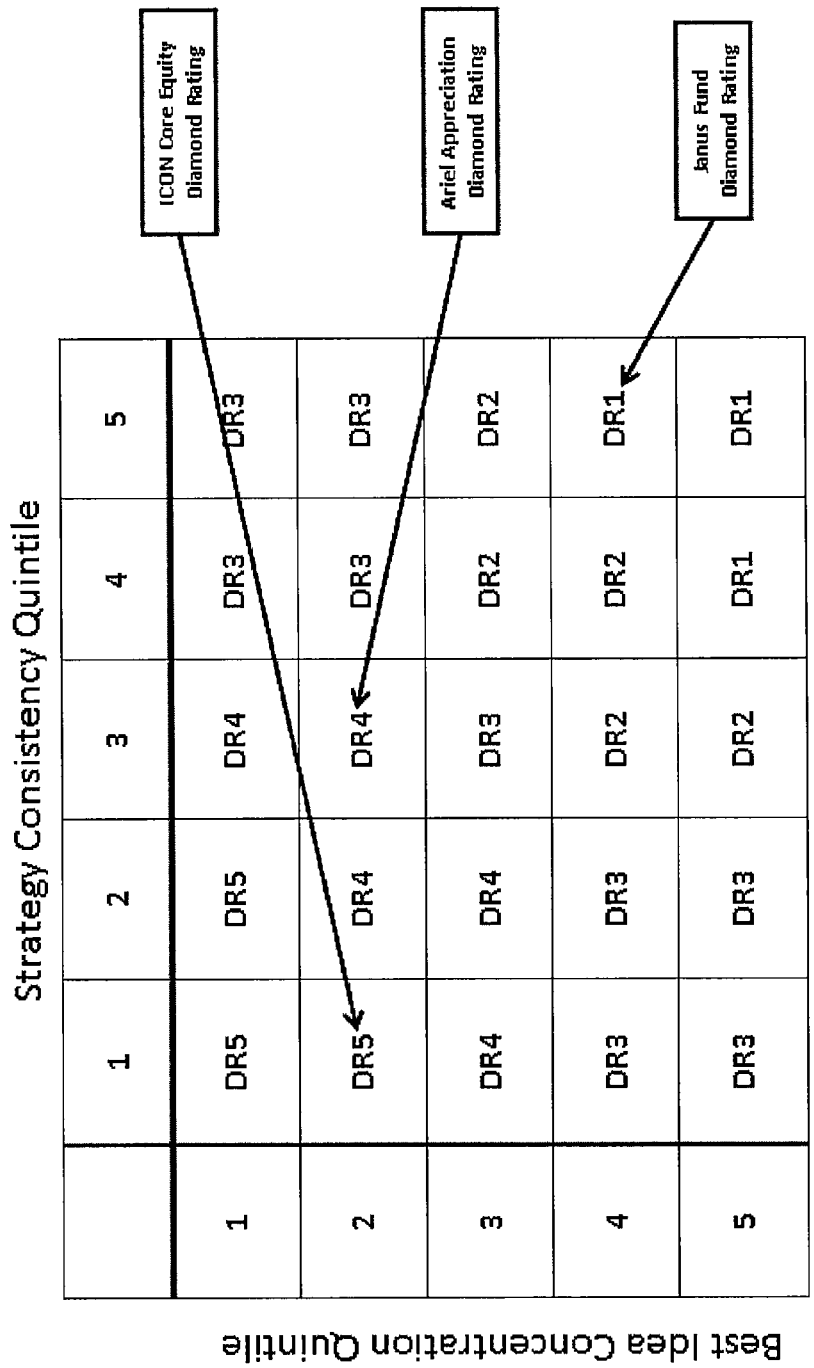
FIG. 31 depicts a diamond rating assignment technique according to an embodiment.

In box 2824, the module 364 assigns diamond ratings to each manager and/or fund based on the combination of strategy consistency and best idea concentration. This step may be performed by any ranking algorithm, with quintile ranking being preferred. In other words, the top (or first) quintile is DR5, the next (or second) quintile is DR4, and so on. This process is illustrated in FIG. 31. FIG. 31 depicts a grid having best idea concentration quintile on the vertical axis and strategy consistency measure quintile on the horizontal axis. As will be appreciated, the grid is for all managers and/or funds over all strategies. Alternatively, a respective grid can be done for each strategy. As shown in FIG. 31, ICON Core Equity™ is assigned a DR5 (or highest) rating, Janus Fund™ a DR1 (or lowest) rating, and Ariel Appreciation™ a DR4 rating.

Figure 32A:
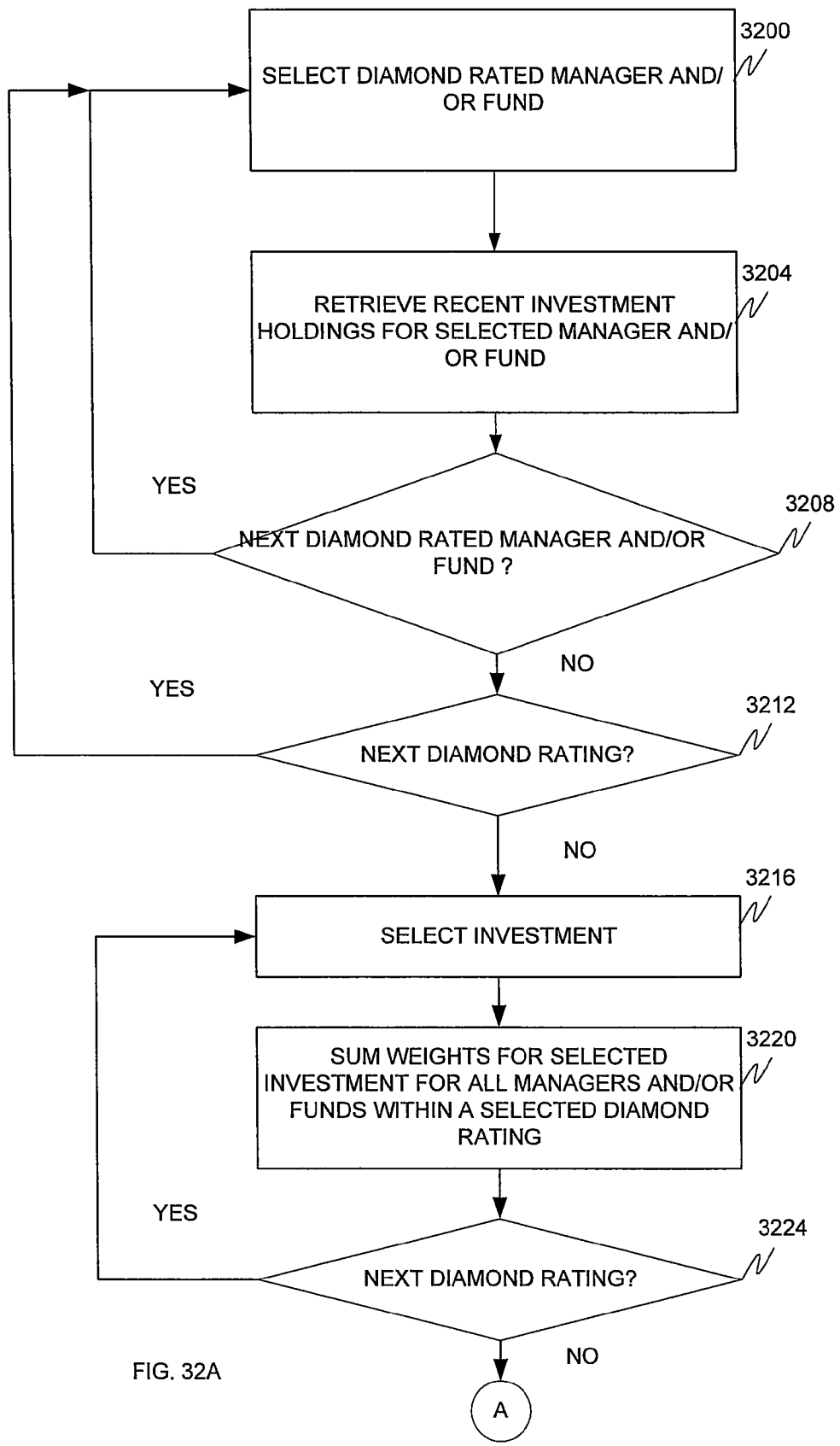
FIGS. 32A and B depict, collectively, an algorithm according to an embodiment.
Figure 32B:
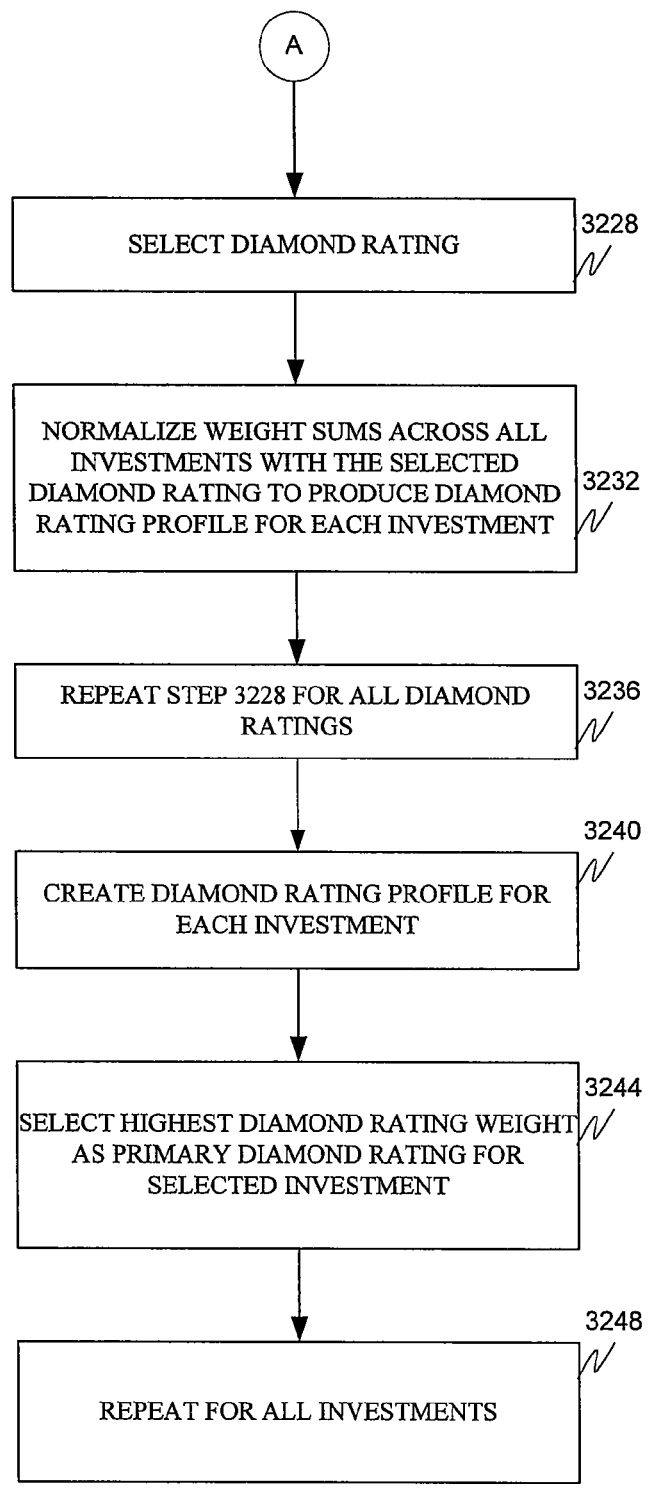

In another embodiment, FIG. 32 depicts the operation of a rating module 394, which assigns a diamond rating to an investment. As noted above, Diamond Rating (DR) 5 funds are those that are most strategy consistent and most highly concentrated in best ideas, while DR1 funds are the poorest on both of these aspects. DR2, DR3, and DR4 funds fall somewhere in between these two extremes.

In box 3200, the rating module 394 selects a diamond rated manager and/or fund to be analyzed.

In box 3204, the module 394 retrieves, from any one of the strategy, strategy rating consistency, and SBI input databases 348, 352, and 356, recent investment holdings for the selected diamond rated manager and/or fund. The holdings include weighting values for each investment managed by the selected manager or held by the selected fund, as appropriate.

In decision diamond 3208, the module 394 determines whether there is a next manager and/or fund within the selected diamond rating. If so, the module 386 returns to and repeats the foregoing steps. If not, the module 386 proceeds to decision diamond 3212.

In decision diamond 3212, the module 394 determines whether there is a next diamond rating. If so, the module 394 returns to and repeats the foregoing steps. If not, the module 394 proceeds to step 3216. Through the above steps, investments are assembled for all managers and/or funds and all diamond ratings.

In box 3220, the module 386 sums the portfolio weights of the selected investment for all managers and/or funds within a selected diamond rating. In other words, if a selected investment (e.g., stock) has a first weight in a first portfolio of a first manager and/or fund and a second weight in a second portfolio of a second manager and/or fund and if the first manager and/or fund and second manager and/or fund have a common diamond rating, the module 386 would sum the first and second weights to produce a total diamond rating weight for the selected diamond rating.

Box 3224 causes boxes 3216 and 3220 to be repeated for each investment and diamond rating. At this point in the analysis, the module 394 has produced, for each investment, diamond rating weight totals for each strategy holding that investment.

In box 3228, a diamond rating is selected, and, in box 3232, for each of the investments held by the managers and/or funds having the selected diamond rating the cumulative diamond rating weight is rescaled so that the cumulative diamond rating weights of all investments held by managers and/or funds having the selected diamond rating sum to selected value, which is typically 1.00 or 100%. As will be appreciated, other scaling systems may be employed. The result of this step is an adjusted, or rescaled, cumulative diamond rating weight for each investment held by managers and/or funds having the selected diamond rating.

In box 3236, the module 394 repeats box 3228 for all diamond ratings.

Figure 33:
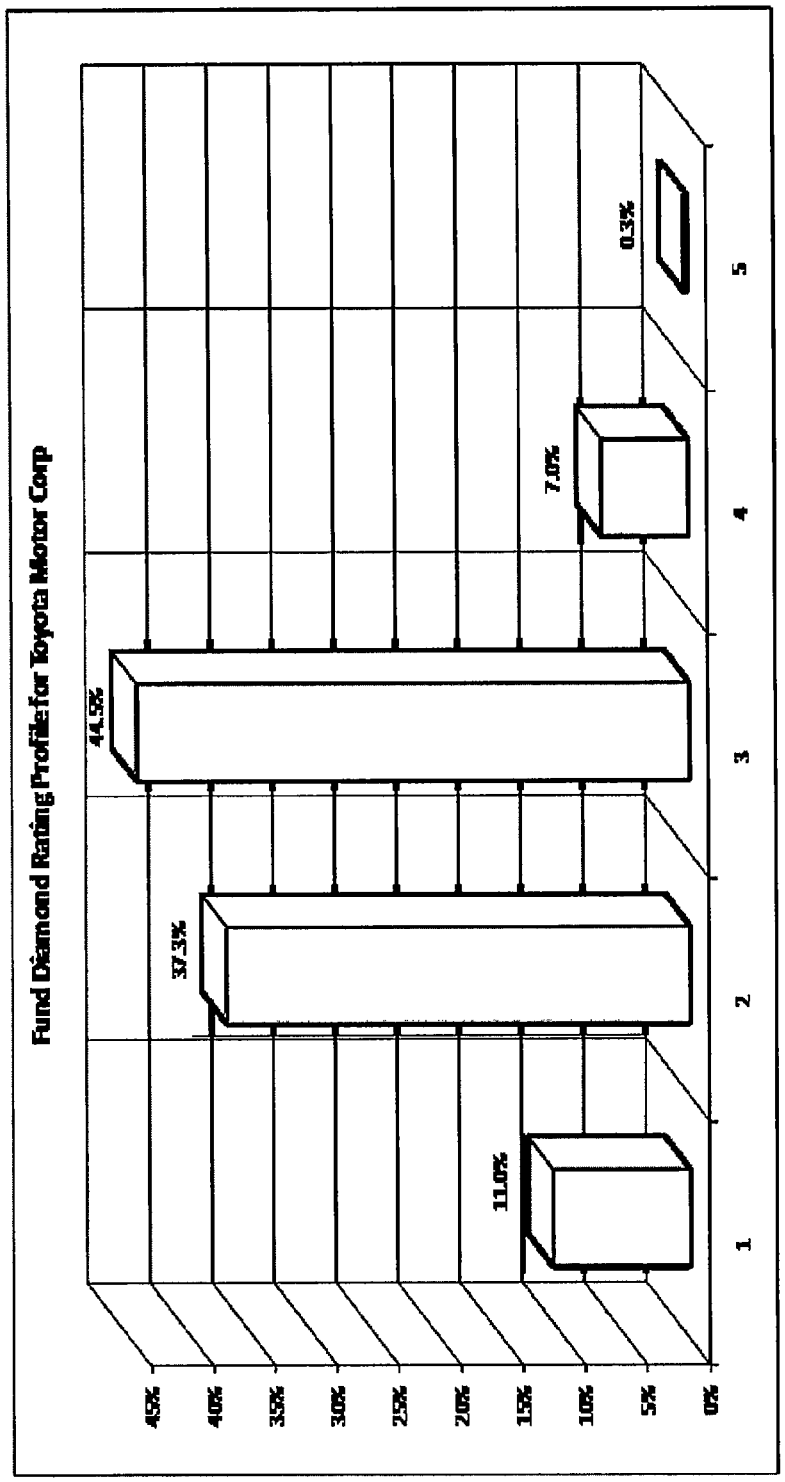
FIG. 33 is a graph plotting portfolio holding (percent) by diamond rating.

In box 3240, the module 394 creates a diamond rating profile for each selected investment. An example of the output of box 3240 is shown in FIG. 33 for the stock of Toyota Motor Corporation™. The vertical axis is portfolio weight (%) and the horizontal axis represents the diamond rating of the various managers and funds holding the stock. As can be seen from FIG. 33, the sum of all of the percentages is 100%.

In box 3244, the module 386 selects the highest diamond rating weight as the primary diamond rating for the selected investment. As noted, each investment is, at any point in time, deemed to have only one diamond rating. As manager and/or fund holdings change temporally, the assigned diamond rating for a given investment can also change.

In box 3248, box 3240 is repeated for all investments.

Figure 34:
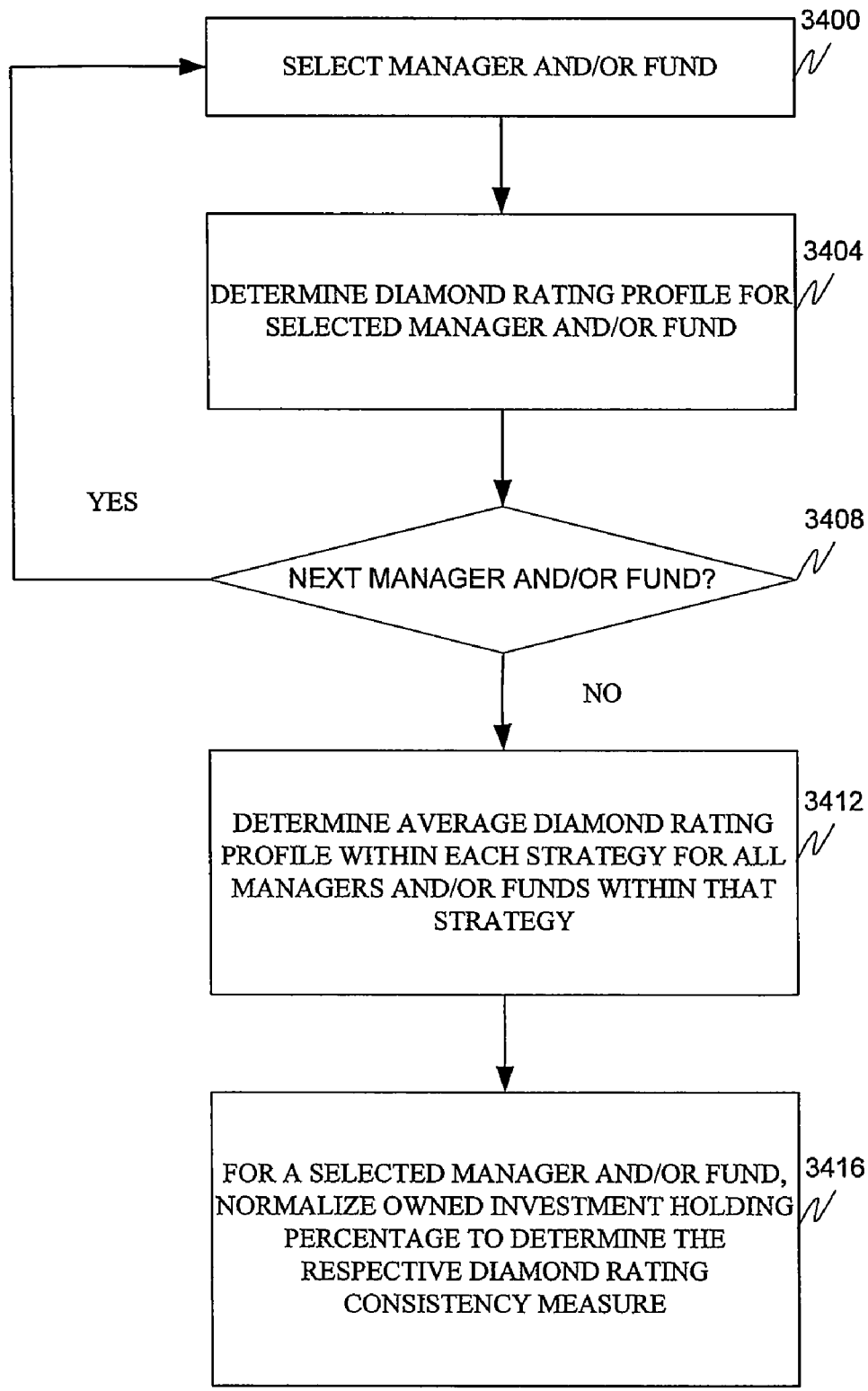
FIG. 34 is a flowchart according to an embodiment.

Referring to FIG. 34, an operation of the consistency measure module 390 will be discussed.

Figure 35:
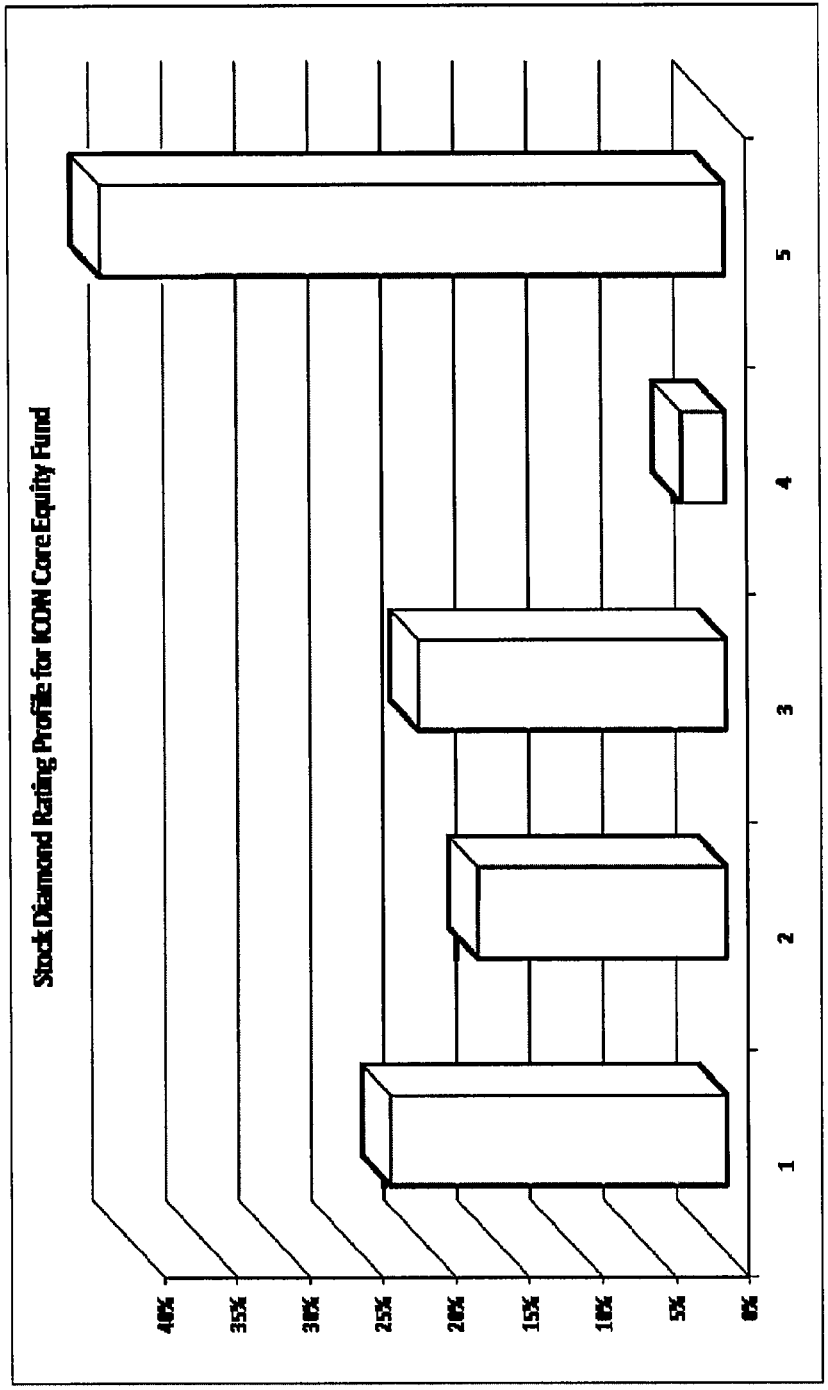
FIG. 35 is a graph plotting portfolio holding (percent) by diamond rating.

In box 3400, the module 390 selects a manager and/or fund and, in box 3404, determines the diamond rating profile for the selected manager and/or fund. The diamond rating profile for a manager or fund provides, by diamond rating, the relative weights of stock holdings. In other words, for a selected manager and/or fund the cumulative portfolio weight is determined for stocks of a first diamond rating, the cumulative portfolio weight is determined for stocks of a second diamond rating, and so on until a cumulative portfolio weight has been assigned to each strategy. As an example shown in FIG. 35, a strategy profile for ICON Core Equity Fund™ is a portfolio of 22% DR1 stocks, 15% DR2 stocks, 19% DR3 stocks, 2% DR4 stocks, and 42% DR5 stocks. Decision diamond 3408 ensures that boxes 3400 and 3404 are repeated for all managers and/or funds.

In box 3412, the module 390 determines the average diamond rating profile within each strategy for all managers and/or funds within that strategy. For all of the managers and/or funds having a common primary strategy, the cumulative diamond rating weights, by diamond rating, of their diamond rating profiles are determined to determine an average diamond rating weight for that investment. For example, first and second funds are the only funds having a common primary strategy. The first and second funds have 25% and 35%, respectively, in DR5 stocks. An average of the two values is 30%. The standard deviation is further determined to provide the range of portfolio weights in the DR5 stocks. In the example, the standard deviation is ±5%.

Figure 36:
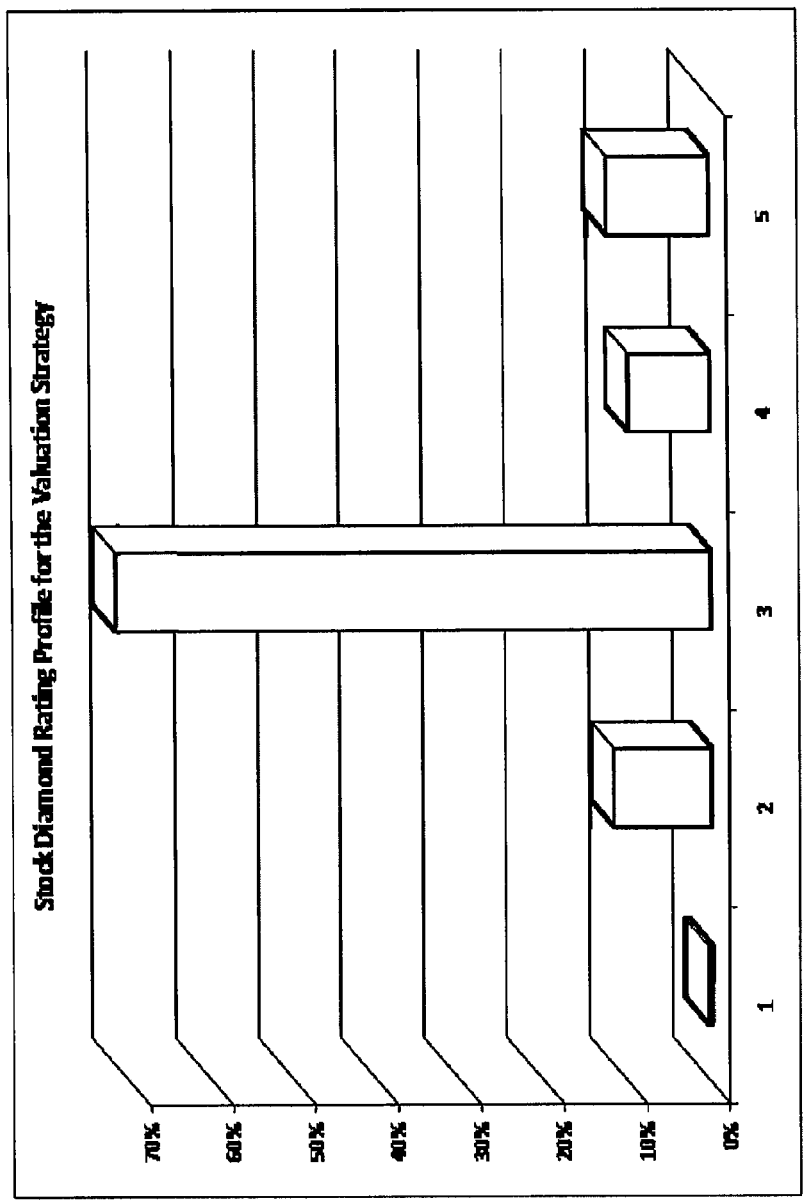
FIG. 36 is a graph plotting portfolio holding (percent) by diamond rating.

FIG. 36 illustrates an exemplary output of box 3412. As can be seen from FIG. 36, a stock diamond rating profile for an "average" fund in a selected strategy has 1% DR1 stocks, 10% DR2 stocks, 70% DR3 stocks, 9% DR4 stocks, and, finally, 10% DR5 stocks.

In box 3416, for a selected manager and/or fund the owned investment diamond rating percentage is normalized to determine the respective diamond rating consistency measure. In other words, the portfolio holding within a selected diamond rating of the selected manager and/or fund is adjusted, or resealed, relative to a scale in which the average diamond rating weight for the selected diamond rating in the average strategy diamond rating profile plus the standard deviation is set at 1.00 or 100%. As will be appreciated, other scaling systems may be employed. In the example above, the average of the two values is 30%, which is adjusted to 35% by the standard deviation. The 35% is adjusted to 100%, causing the second fund to have a DR5 diamond rating consistency measure for of 1.00 or 100% and the first fund of 0.715 or 71.5%.

In another embodiment, an AlphaIQ module 398 determines an AlphaIQ stock performance measure. Once the best funds have been identified based on diamond ratings, fund holdings can then be used to assign an AlphaIQ to each of the stocks held by a manager and/or fund. In one configuration, AlphaIQ commonly ranges from 0 to 100 with 100 assigned to the stock most held by top funds based on diamond rating and strategy performance. As will be appreciated, other rating systems may be employed.

Figure 37:
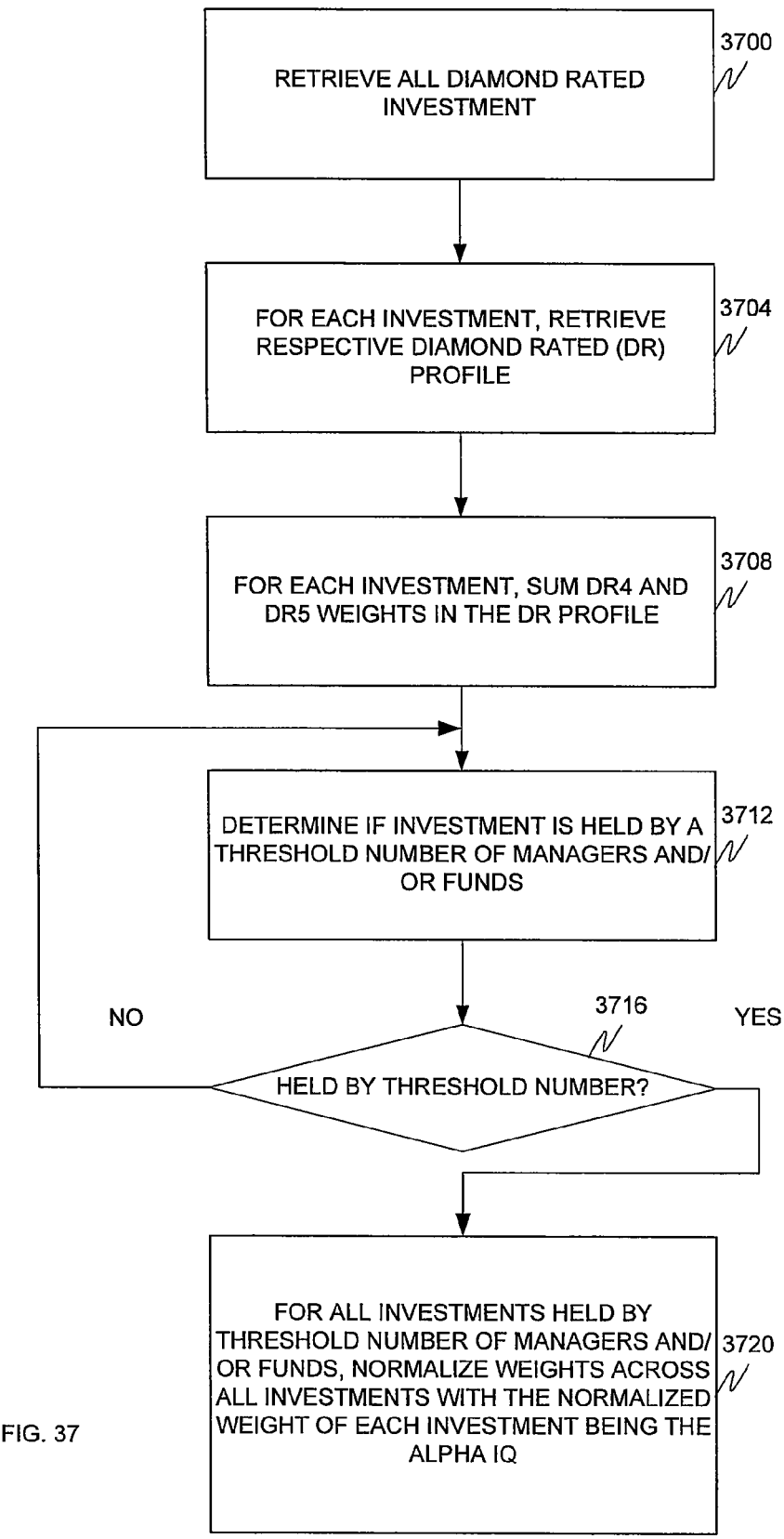
FIG. 37 is a flowchart according to an embodiment.

Referring to FIG. 37, the module 398, in box 3700, retrieves all diamond rated investments.

The module 398, in box 3704, retrieves, for each investment, a respective diamond rating profile.

In box 3708, the module 398, for each investment, sums DR4 and DR5 weights in the diamond rating profile.

In box 3712, the module 398 determines whether the investment is held by a threshold number of managers and/or funds. When the investment is not held by the threshold number, the module 398 returns to and repeats box 3712 for another investment. When the investment is held by the threshold number, the module 398 proceeds to box 3720.

Figure 38:
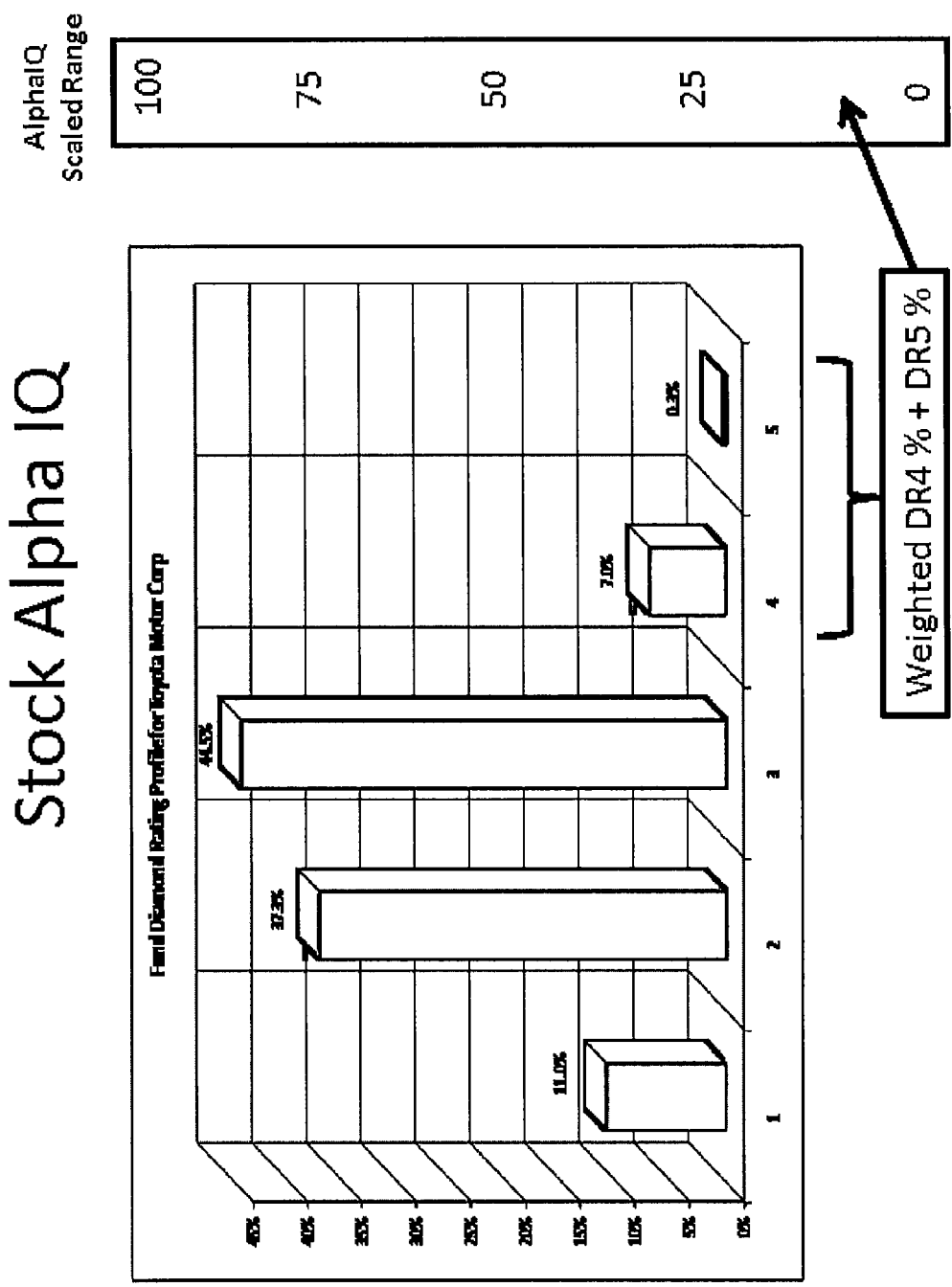
FIG. 38 depicts an alpha IQ assignment technique according to an embodiment.

In box 3720, the module 398, for all investments held by the threshold number of managers and/or funds, normalizes the weights across all investments with the normalized (or scaled) weight of each investment being the alpha IQ. As will be appreciated, other scaling systems may be employed. FIG. 38 depicts an example of this computation for the stock of Toyota Motor Corporation™. The DR4 and DR5 portfolio weightings total 7.3%, which is then adjusted to a scale of 0 to 100, with 100 corresponding to the highest DR4 and DR5 portfolio rating of any investment.

The exemplary systems and methods of this invention are described in relation to financial analysis and planning systems. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a common platform, or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, differing sets of investment strategies are used for differing types of assets or securities. As will be appreciated, the particular set or suite of investment strategies employed by a manager depends on the type of asset or security. An investment strategy used for mutual funds frequently differs, for instance, from that employed for a hedge fund. To accommodate this variation in investment strategies, the invention can use an asset or security-type identifier to indicate the particular set or suite of investment strategies applicable in any given application or otherwise to be presented to a user. This identifier can further be used to categorize assets or securities in the data structures and in assigning assets and securities to peer groups.

In another alternative embodiment, the systems and methods of this invention are implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory.

Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) accessing, by a processor, a computer readable media to retrieve information regarding a plurality of managers and/or funds following a plurality of different strategies; and
   (b) assigning, by a processor executable strategy categorizing module, a first strategy to a selected investment by:
      bi) determining, by the processor executable strategy categorizing module, a total weight of a selected investment in the portfolios of the plurality of managers and/or funds following a selected strategy;
      (bii) determining, by the processor executable strategy categorizing module and from the total weight of the selected investment, a strategy weight for the selected investment in the selected strategy;
      (biii) repeating, by the processor executable strategy categorizing module, sub-steps (bi) and (bii) to assign a strategy weight to the selected investment in a plurality of other strategies; and
      (biv) assigning as the strategy of the selected investment, by the processor executable strategy categorizing module, the strategy of the highest strategy weight, wherein the assigned strategy is the first strategy.

2. The method of claim 1, further comprising performing at least one of step (b) or step (c), where step (c) comprises:
   (c) assigning, by a processor executable consistency measure module, a strategy consistency measure to a selected manager and/or fund.

3. The method of claim 2, wherein sub-step (c) comprises the sub-steps:
   (ci) determining, by the processor executable consistency measure module, a strategy profile for the selected manager and/or fund following a second strategy;
   (cii) determining, by the processor executable consistency measure module, an average strategy profile for a plurality of managers and/or funds within a selected strategy, the plurality of managers and/or funds within the selected strategy comprising the selected manager and/or fund; and
   (ciii) adjusting, by the processor executable consistency measure module, a total portfolio weight of investments in the second strategy to a selected scale to provide the strategy consistency measure.

4. The method of claim 1, further comprising performing at least one of steps (b), (c), (d), (e), (f) or (g), where steps (f) and (g) comprise:
   (f) assigning, by a processor executable consistency measure module, a diamond rating consistency measure to a selected manager and/or fund; and,
   (g) assigning, by a processor executable rating module, a first diamond rating to a selected investment based upon diamond rating profiles of a set of the managers and/or funds holding the selected investment.

5. The method of claim 4, wherein sub-step (f) comprises the sub-steps:
   (fi) determining, by the processor executable consistency measure module, a diamond rating profile for the selected manager and/or fund having a second diamond rating;
   (fii) determining, by the processor executable consistency measure module, an average diamond rating profile for a plurality of managers and/or funds, the plurality of managers and/or funds comprising the selected manager and/or fund; and
   (fiii) adjusting, by the processor executable consistency measure module, a total portfolio weight of investments having the second diamond rating to a selected scale to provide the diamond rating consistency measure.

6. The method of claim 4, wherein sub-step (g) comprises the following sub-steps:
   (gi) determining, by the processor executable rating module, a total weight of a selected investment in the portfolios of the plurality of managers and/or funds having a selected diamond rating;
   (gii) determining, by the process executable rating module and from the total weight of the selected investment, a diamond rating weight for the selected investment in the selected strategy;
   (giii) repeating, by the processor executable rating module, sub-steps (gi) and (gii) to assign a diamond rating weight to the selected investment in a plurality of other strategies; and
   (giv) assigning as the diamond rating of the selected investment, by the processor executable rating module, the diamond rating of the highest diamond rating weight, wherein the assigned diamond rating is the first diamond rating.

7. The method of claim 1, further comprising performing at least one of steps (b), (c) or (d), where step (d) comprises:
   (d) assigning, by a processor executable performance analysis module, to a selected manager and/or fund, and based on a strategy consistency measure and best idea concentration, a diamond rating.

8. The method of claim 7, wherein sub-step (d) comprises the sub-steps:
   (di) determining, by the performance analysis module and based on a respective strategy consistency measure, a first relative rank of each of a plurality of managers and/or funds following a selected strategy;
   (dii) determining, by the performance analysis module and based on a best idea concentration, a second relative rank of each of the plurality of managers and/or funds following the selected strategy; and
   (diii) assigning a respective diamond rating to each of the plurality of managers and/or funds based on the corresponding strategy consistency measure and best idea concentration.

9. The method of claim 1, further comprising performing at least one of steps (b), (c), (d) or (e), where step (e) comprises:
   (e) assigning, by a processor executable AlphaIQ module, an AlphaIQ to a selected investment.

10. The method of claim 9, wherein sub-step (e) comprises the sub-steps:
    (ei) summing, by the processor executable AlphaIQ module and for each of a plurality of investments, weights of investments having a selected diamond rating to provide a total diamond rating weight;
    (eii) determine, by the processor executable AlphaIQ module, whether a selected one of the investments is held by a threshold number of managers and/or funds; and
    (eiii) when the selected investment is held by the threshold number of managers and/or funds, adjusting the corresponding total diamond rating weight to yield the AlphaIQ of the selected investment.

11. A non-transitory computer readable medium storing instructions which when executed by a processor perform the steps of:
    (a) accessing, by a processor, a computer readable media to retrieve information regarding a plurality of managers and/or funds following a plurality of different strategies; and (b) assigning, by a processor executable strategy categorizing module, a first strategy to a selected investment by:
  (bi) determining, by the processor executable strategy categorizing module, a total weight of a selected investment in the portfolios of the plurality of managers and/or funds following a selected strategy;
  (bii) determining, by the processor executable strategy categorizing module and from the total weight of the selected investment, a strategy weight for the selected investment in the selected strategy;
  (biii) repeating, by the processor executable strategy categorizing module, sub-steps (bi) and (bii) to assign a strategy weight to the selected investment in a plurality of other strategies; and
  (biv) assigning as the strategy of the selected investment, by the processor executable strategy categorizing module, the strategy of the highest strategy weight, wherein the assigned strategy is the first strategy.

12. The non-transitory computer readable medium of claim 11, further comprising performing at least one of step (b) or step (c), where step (c) comprises:
  (c) assigning, by a processor executable consistency measure module, a strategy consistency measure to a selected manager and/or fund.

13. The non-transitory computer readable medium of claim 12, further comprising performing at least one of steps (b), (c) or (d), where step (d) comprises:
  (d) assigning, by a processor executable performance analysis module, to a selected manager and/or fund, and based on a strategy consistency measure and best idea concentration, a diamond rating.

14. The non-transitory computer readable medium of claim 13, further comprising performing at least one of steps (b), (c), (d) or (e), where step (e) comprises:
  (e) assigning, by a processor executable AlphaIQ module, an AlphaIQ to a selected investment.

15. The non-transitory computer readable medium of claim 14, further comprising performing at least one of steps (b), (c), (d), (e), (f) or (g), where steps (f) and (g) comprise:
  (f) assigning, by a processor executable consistency measure module, a diamond rating consistency measure to a selected manager and/or fund; and,
  (g) assigning, by a processor executable rating module, a first diamond rating to a selected investment based upon diamond rating profiles of a set of the managers and/or funds holding the selected investment.

16. A system, comprising:
  an input for receiving requests and information, regarding a plurality of managers and/or funds following a plurality of different strategies, responsive to the requests;
  an output for providing processed information responsive to the requests; a processor; and
  a storage device, wherein the processor is configured to execute the following modules stored on the storage device:
  (a) a strategy categorizing module to assign a first strategy to a selected investment based upon strategy profiles of a set of the managers and/or funds holding the selected investment, wherein the strategy categorizing module performs the following operations:
    (ai) determining a total weight of a selected investment in the portfolios of the plurality of managers and/or funds following a selected strategy;
    (aii) determining, from the total weight of the selected investment, a strategy weight for the selected investment in the selected strategy;
    (aiii) repeating the above operations to assign a strategy weight to the selected investment in a plurality of other strategies; and
    (aiv) assigning as the strategy of the selected investment the strategy of the highest strategy weight, wherein the assigned strategy is the first strategy;
  (b) a consistency measure module to assign a strategy consistency measure to a selected manager and/or fund; and
  (c) a performance analysis module to assign, to a selected manager and/or fund, and based on a strategy consistency measure and best idea concentration, a diamond rating.

17. The method of claim 16, wherein the processor stored on the storage device is further configured to execute a consistency measure module to assign a diamond rating consistency measure to a selected manager and/or fund.

18. The system of claim 16, wherein the processor is configured to execute at least one of the following modules also stored on the storage device:
  (d) a rating module to assign a first diamond rating to a selected investment based upon diamond rating profiles of a set of the managers and/or funds holding the selected investment;
  (e) a consistency measure module to assign a diamond rating consistency measure to a selected manager and/or fund; and
  (f) an AlphaIQ module to assign an AlphaIQ to a selected investment.

19. The system of claim 18, wherein the consistency measure module performs the following operations:
  (ei) determining a diamond rating profile for the selected manager and/or fund having a second diamond rating;
  (eii) determining an average diamond rating profile for a plurality of managers and/or funds, the plurality of managers and/or funds comprising the selected manager and/or fund; and
  adjusting a total portfolio weight of investments having the second diamond rating to a selected scale to provide the diamond rating consistency measure.

20. The system of claim 18, wherein the AlphaIQ module performs the following operations:
  (fi) summing, for each of a plurality of investments, weights of investments having a selected diamond rating to provide a total diamond rating weight;
  (fii) determining whether a selected one of the investments is held by a threshold number of managers and/or funds; and
  (fiii) when the selected investment is held by the threshold number of managers and/or funds, adjusting the corresponding total diamond rating weight to yield the AlphaIQ of the selected investment.

21. The system of claim 18, wherein the rating module performs the following operations:
  (di) determining a total weight of a selected investment in the portfolios of the plurality of managers and/or funds having a selected diamond rating;
  (dii) determining, from the total weight of the selected investment, a diamond rating weight for the selected investment in the selected strategy;
  (diii) repeating the above operations to assign a diamond rating weight to the selected investment in a plurality of other strategies; and
  (div) assigning as the diamond rating of the selected investment, the diamond rating of the highest diamond rating weight, wherein the assigned diamond rating is the first diamond rating.

22. The system of claim 16, wherein the consistency measure module performs the following operations:

(bi) determining, a strategy profile for the selected manager and/or fund following a second strategy;

(bii) determining an average strategy profile for a plurality of managers and/or funds within a selected strategy, the plurality of managers and/or funds within the selected strategy comprising the selected manager and/or fund; and (biii) adjusting a total portfolio weight of investments in the second strategy to a selected scale to provide the strategy consistency measure.

23. The system of claim 16, wherein the performance analysis module performs the following operations:

(ci) determining, based on a respective strategy consistency measure, a first relative rank of each of a plurality of managers and/or funds following a selected strategy;

(cii) determining, based on a best idea concentration, a second relative rank of each of the plurality of managers and/or funds following the selected strategy; and (ciii) assigning a respective diamond rating to each of the plurality of managers and/or funds based on the corresponding strategy consistency measure and best idea concentration.

* * * * *